United States Patent [19]

Carrasquillo

[11] Patent Number: 5,573,588
[45] Date of Patent: Nov. 12, 1996

[54] CONCRETES CONTAINING CLASS C FLY ASH THAT ARE STABLE IN SULPHATE ENVIRONMENTS

[75] Inventor: Ramon L. Carrasquillo, Austin, Tex.

[73] Assignee: Board of Regents, The University of Texas System, Austin, Tex.

[21] Appl. No.: 472,559

[22] Filed: Jun. 7, 1995

Related U.S. Application Data

[62] Division of Ser. No. 195,268, Feb. 14, 1994.
[51] Int. Cl.$^6$ .............................. C04B 7/04; C04B 7/13; C04B 28/04
[52] U.S. Cl. ..................... 106/705; 106/735; 106/736; 106/772; 106/709; 106/DIG. 1
[58] Field of Search ................................ 106/705, 713, 106/735, 736, 737, 738, 739, 772, 775, 788, 709, DIG. 1; 264/DIG. 49

[56] References Cited

U.S. PATENT DOCUMENTS

| | | | |
|---|---|---|---|
| 2,837,436 | 6/1958 | Chapman, Jr. et al. | 106/735 |
| 3,565,648 | 2/1971 | Mori et al. | 106/89 |
| 3,782,985 | 1/1974 | Gebhardt | 106/97 |
| 4,240,952 | 12/1980 | Hulbert et al. | 260/42.13 |
| 4,306,912 | 12/1981 | Forss | 106/709 |
| 4,419,136 | 12/1983 | Rice | 106/735 |
| 4,470,850 | 9/1984 | Bloss | 106/DIG. 1 |
| 4,715,896 | 12/1987 | Berry | 106/117 |
| 4,756,761 | 7/1988 | Philip et al. | 106/117 |

FOREIGN PATENT DOCUMENTS

| | | | |
|---|---|---|---|
| 0007872 | 2/1980 | European Pat. Off. | |
| 2801687 | 7/1979 | Germany . | |
| 859623 | 1/1961 | United Kingdom . | |
| 936078 | 9/1963 | United Kingdom | 106/705 |
| 940692 | 10/1963 | United Kingdom . | |

OTHER PUBLICATIONS

Kovach, R., "The Use of Thermal Power Station Pulverized Fuel Ash in the Manufacture of Cement in Hungary", Ankara Turkey Symposium, Nov. 1970.
Davis, R., et al., "Properties of Cements and Concretes Containing Fly Ash" *Journal of the American Concrete Institute*, vol. 33, May–Jun. 1937, pp. 577–612.
"Use of Fly Ash in Concrete", American Concrete Institute Committee 226 (1987)(no month).
Odler, I., "The Possibilities of Increasing SO$_3$ Content in Cement", Proceedings: Advances in Cement Manufacture and Use, Engineering Foundation Conferences, Jul. 1988, pp. 303–310.

(List continued on next page.)

*Primary Examiner*—Mark L. Bell
*Assistant Examiner*—Michael Marcheschi
*Attorney, Agent, or Firm*—Pravel, Hewitt, Kimball & Krieger

[57] ABSTRACT

Class C fly ash containing cementitious mixtures for producing concretes that are resistant to sulfate-containing environments. Class C fly ash is interground with portland cement clinker and gypsum to produce a cementitions mixture, which, when combined with water and an aggregate produces a hardened concrete that is resistant to sulfate environments. Alternatively, portland cement clinker and gypsum are first interground and the resultant mixture is admixed with Class C fly ash to produce a cementitious mixture. This cementitious mixture, in combination with water and an aggregate, produces a hardened concrete that has improved resistance to sulfate environments. In other aspects, a concrete that is stable in sulfate environments is produced by admixing portland cement, Class C fly ash and water containing a source of ions selected from the group consisting of sulfate and hydroxyl anions. The resultant concrete is capable of hardening in sulfate environments without the formation of such quantities of volume-expanding compositions in the hardened concrete as would cause the hardened concrete to undergo stress failure.

18 Claims, 49 Drawing Sheets

OTHER PUBLICATIONS

Hobbs, D. W., "The Influence of $SO_3$ Content on the Behavior of Portland Cement Mortars", World Cement, vol. 8, No. 3, 1977, pp. 75–85 (no month).

Mehta, P. K., "Investigations on Energy Saving Cement", World Cement Technology, 1980, pp. 166–177 (no month).

Tezuka, Y., et al, "Hydration Characteristics and Properties of Mixtures of Cement and High Content of Calcium Sulfate", Proceedings of the 8th International Conference on Cement Chemistry, vol. III, 1986, pp. 323–329 (no month).

Marusin, S. L., "Microstructure of Fly Ash Concrete, Part I: Effects of Calcium Sulfite and Calcium Sulfate" (date unknown).

Lea, F. M. Section on "Supersulfated Cement", The Chemistry of Cement and Concrete, Chemical Publishing Company, Inc., 1970, pp. 481–485 (no month).

Byfors, K., et al., "Durability of Concrete Made with Alkali Activated Slag", Fly Ash, Silica Fume, Slag and Natural Pozzolans in Concrete, American Concrete Institute, SP–114, 1989, pp. 1429–1466 (no month).

Van Aardt, J. H. P. and Visser, S., "Influence of Alkali on the Sulfate Resistance of Ordinary Portland Cement Mortars", Cement and Concrete Research, vol. 15, 1985, pp. 485–494 (no month).

Malone, P. G., Randall, C. A., and Kirkpatrick, T., "Potential Applications of Alkali–Activated Alumino–Silicate Binders in Military Operations", Miscellaneous Paper GL–85–15, Geotechnical Laboratory, Waterways Experiment Station, 1985, pp. 1–39 (no month).

Talling, B. and Brandstetr, J., "Present State and Future of Alkali–Activated Slag Concretes", Fly Ash, Silica Fume, Slag, and Natural Pozzolans in Concrete, American Concrete Institute, SP–114, 1989, pp. 1519–1545 (no month).

Kosmatka et al. "Design & Control of Concrete Mixtures" Thirteenth Edition, PCA, 1988. pp 1,64,68,69,70,71,72. (no month).

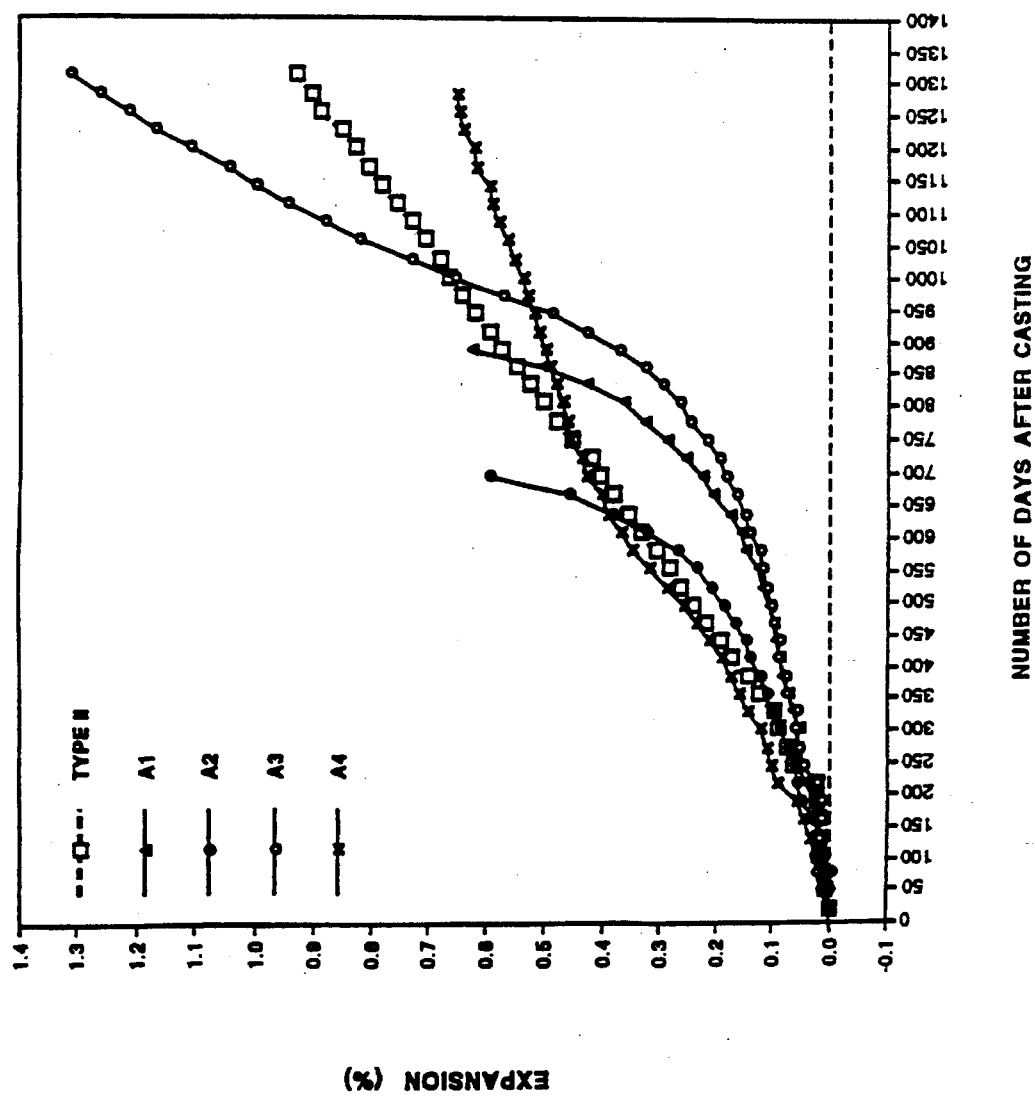

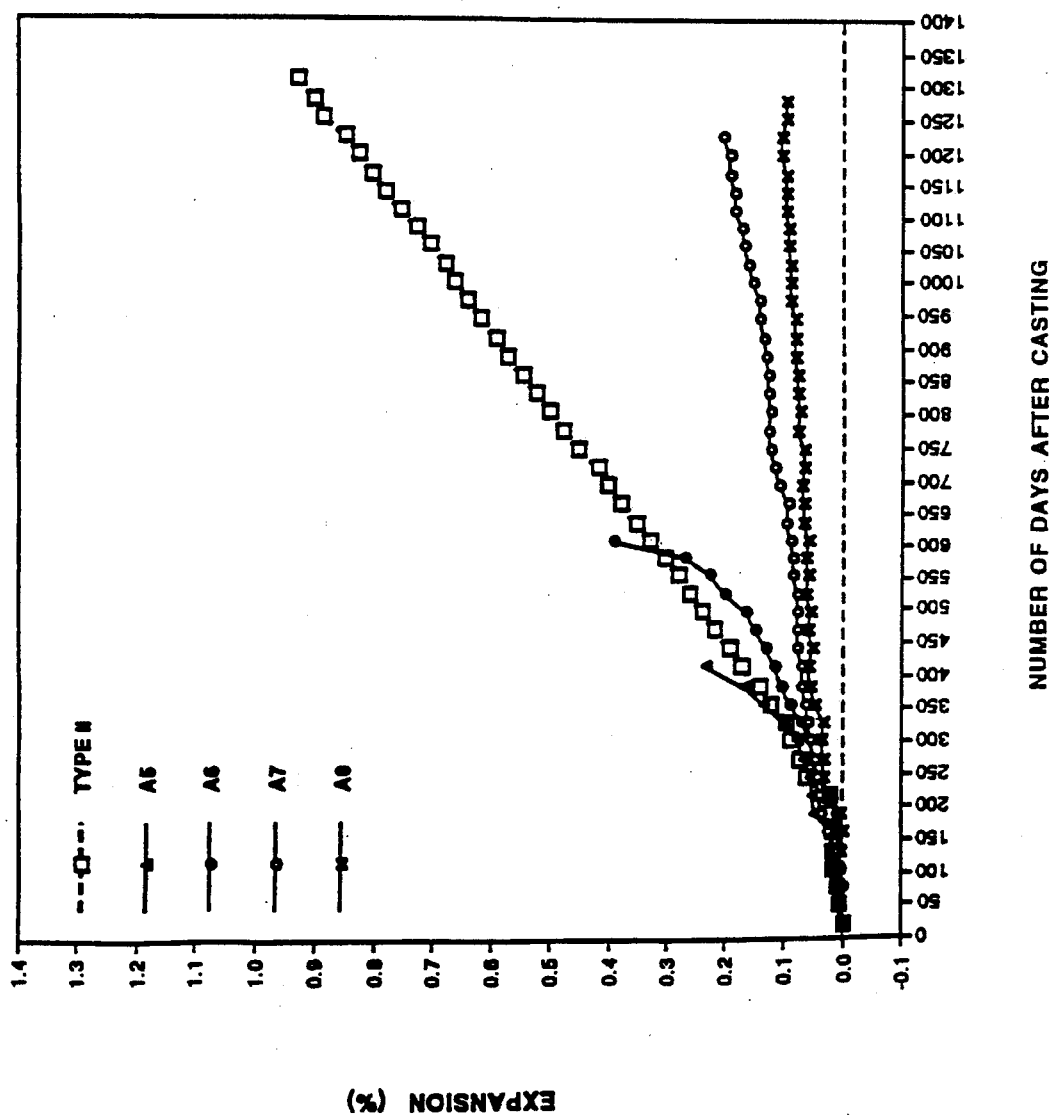

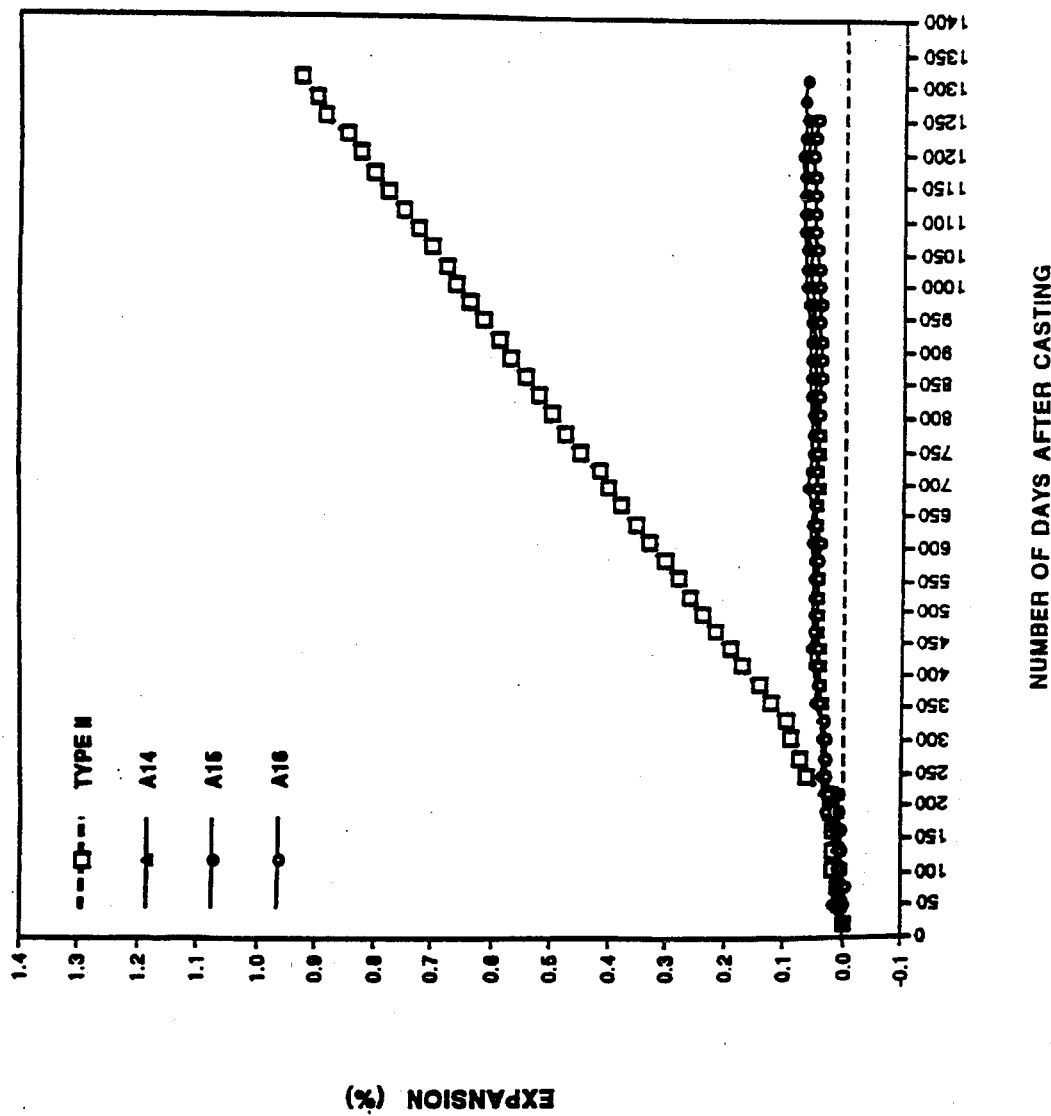

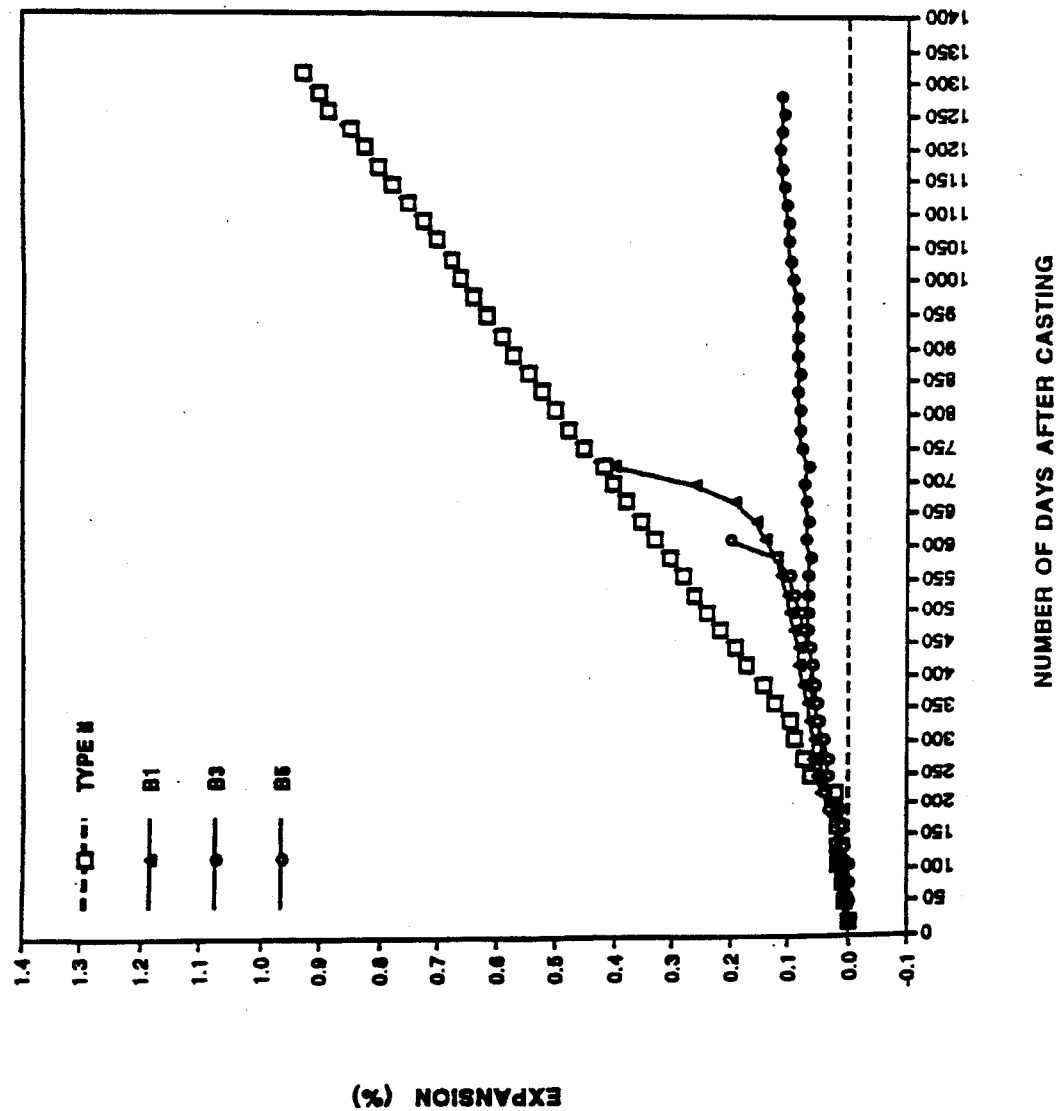

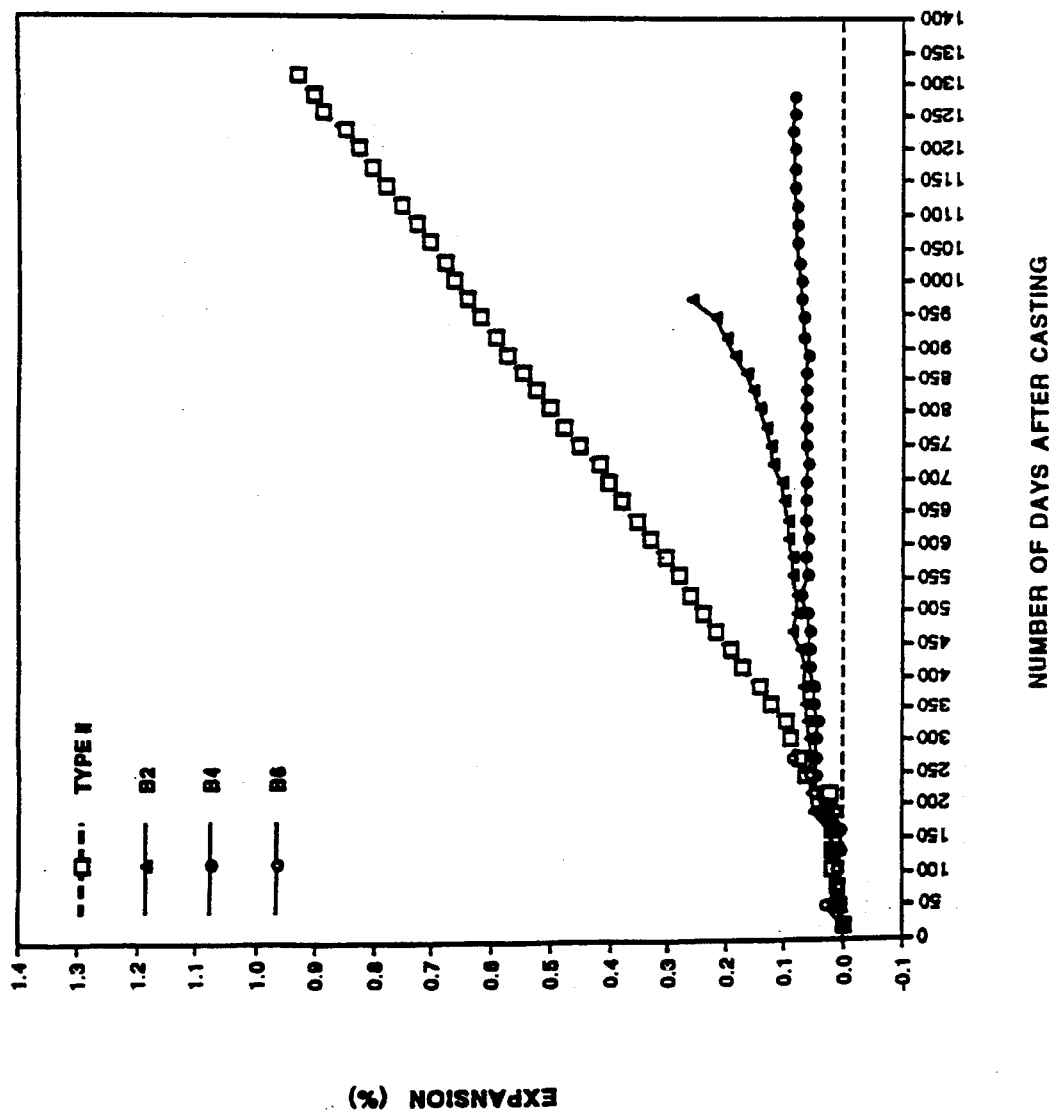

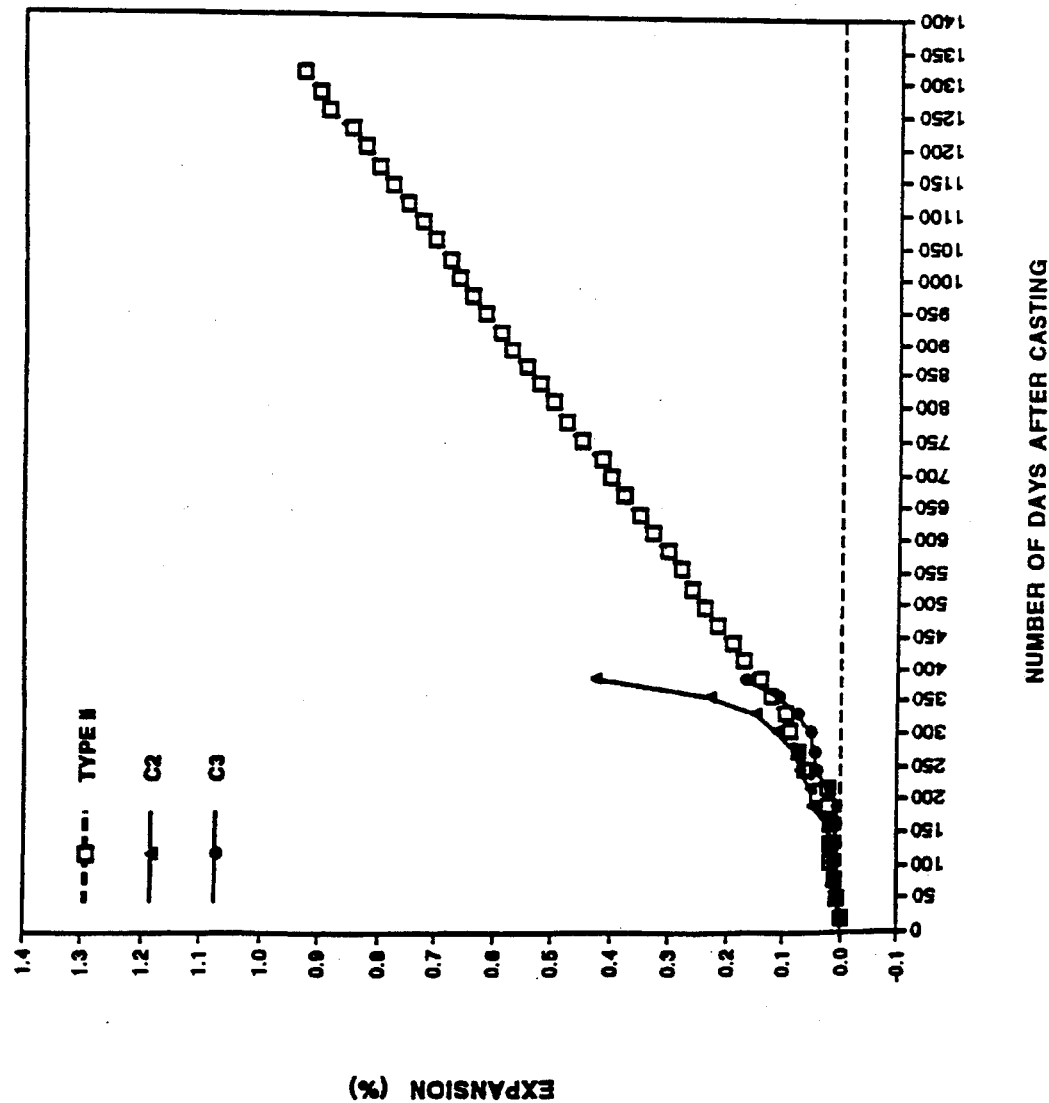

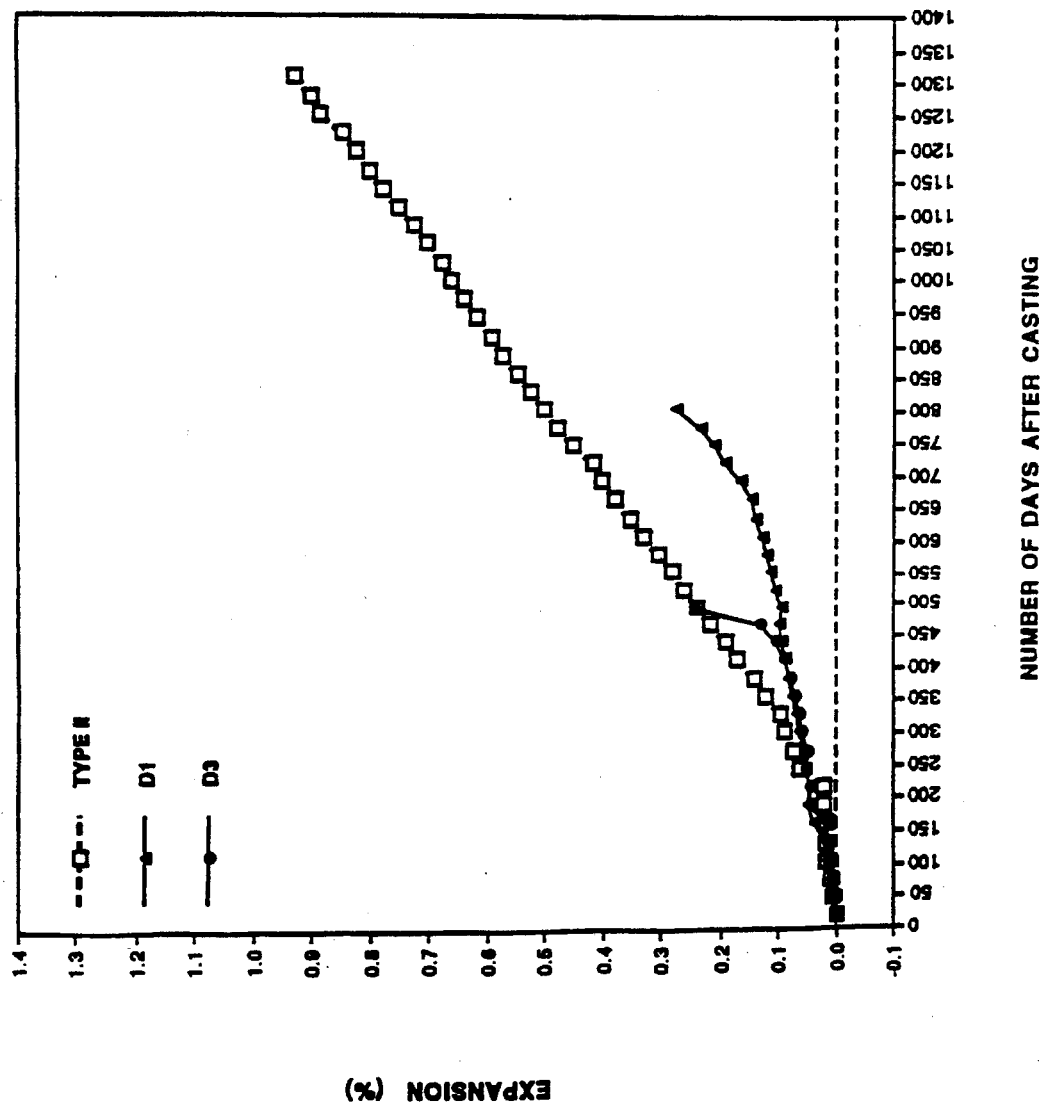

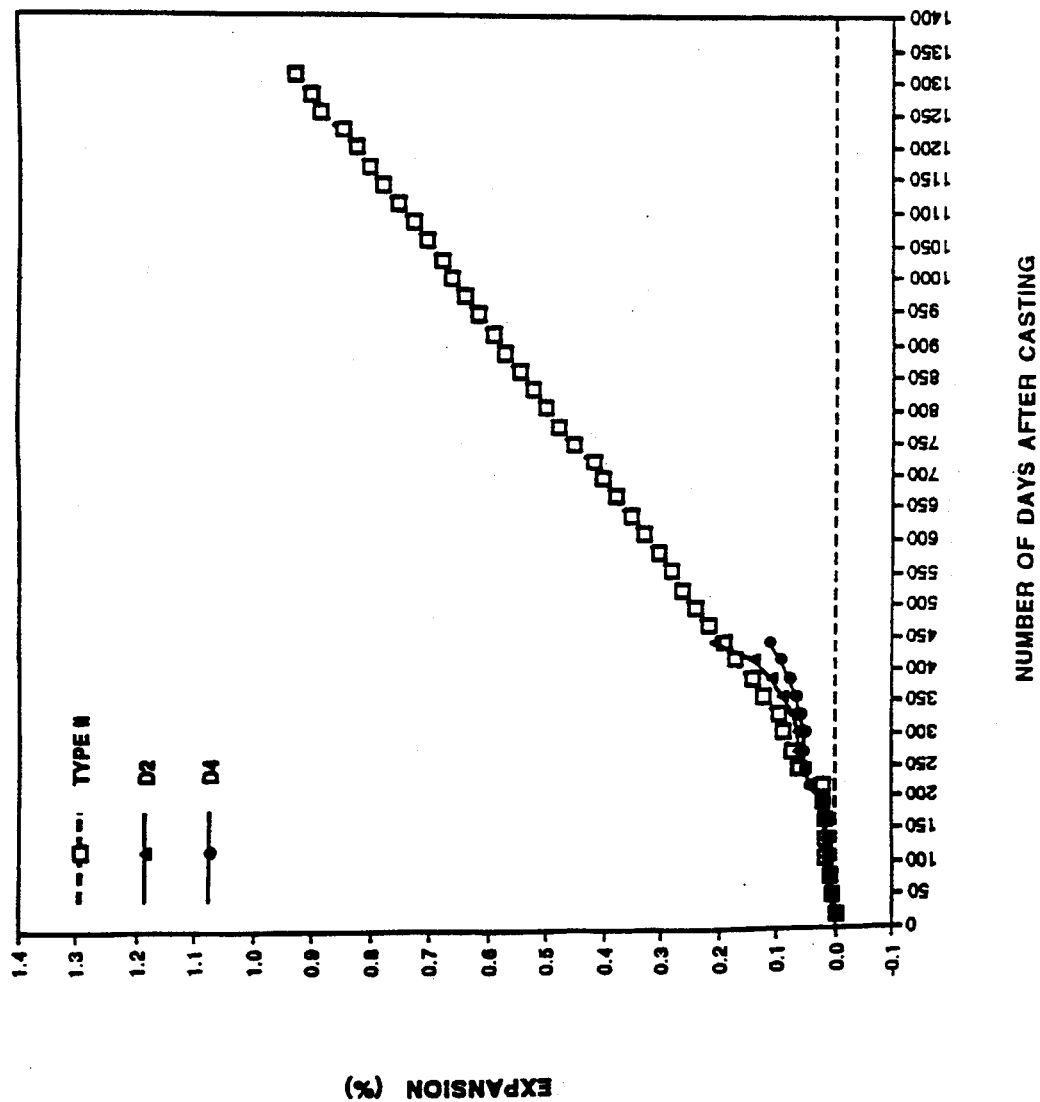
FIG 8 COMPARISON OF SULFATE PERFORMANCE 14-DAY

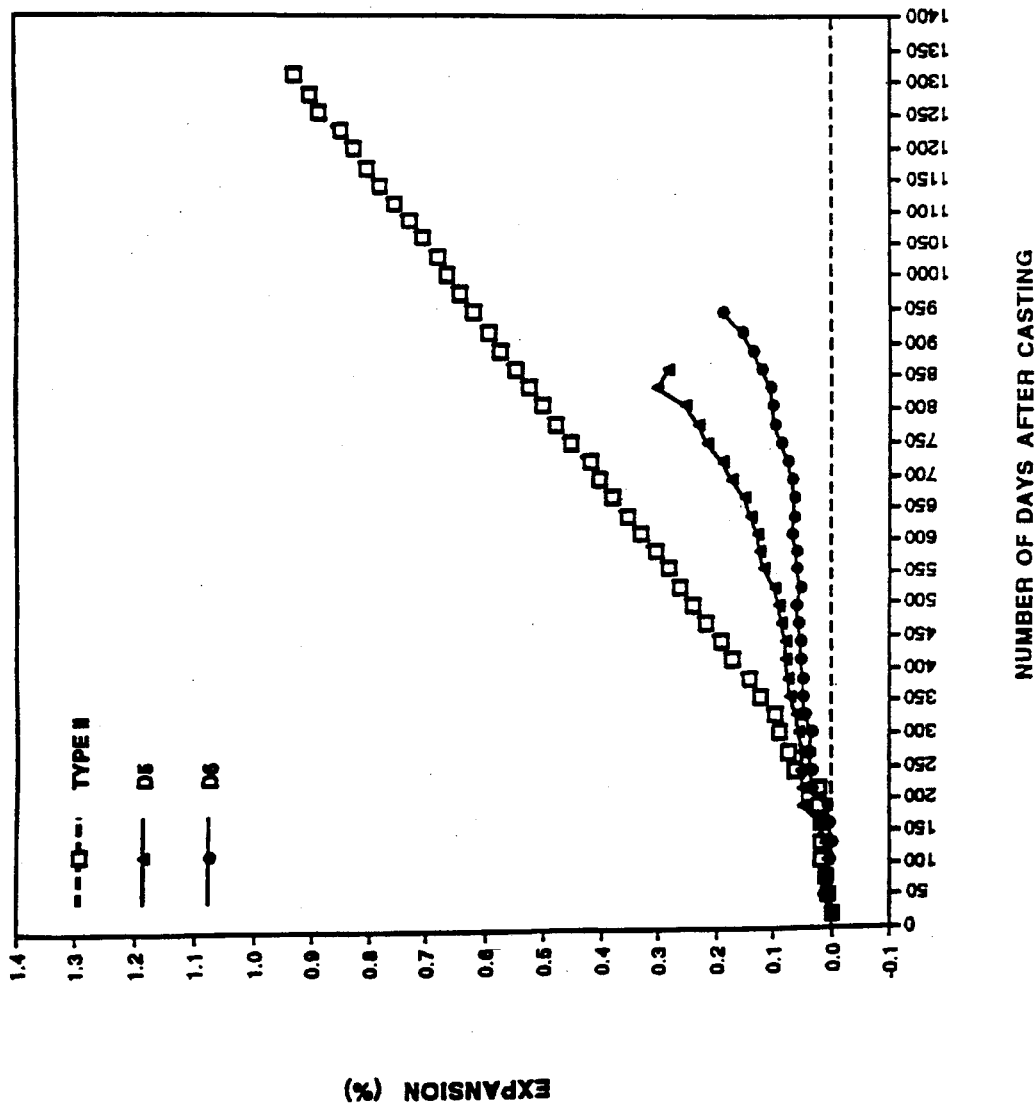

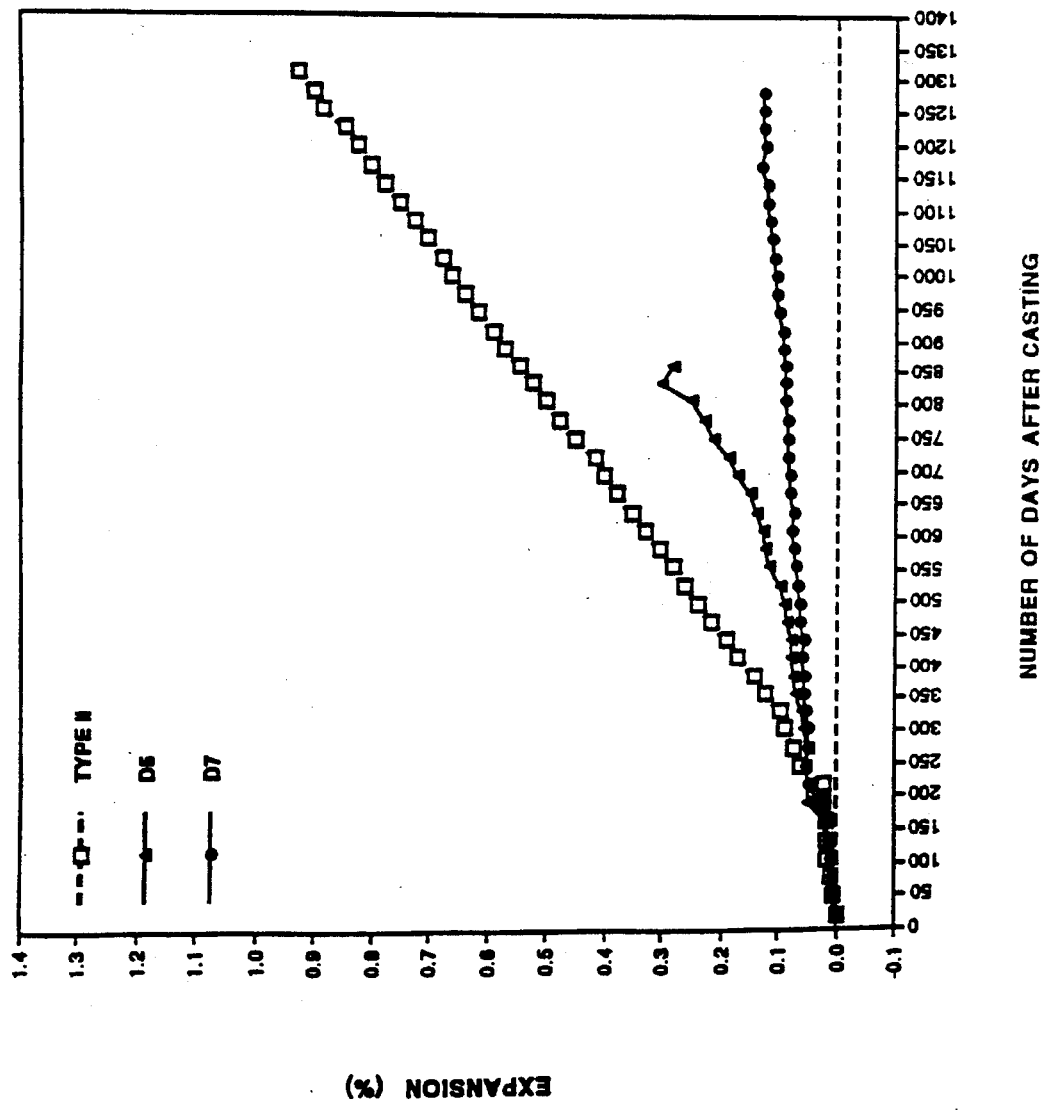

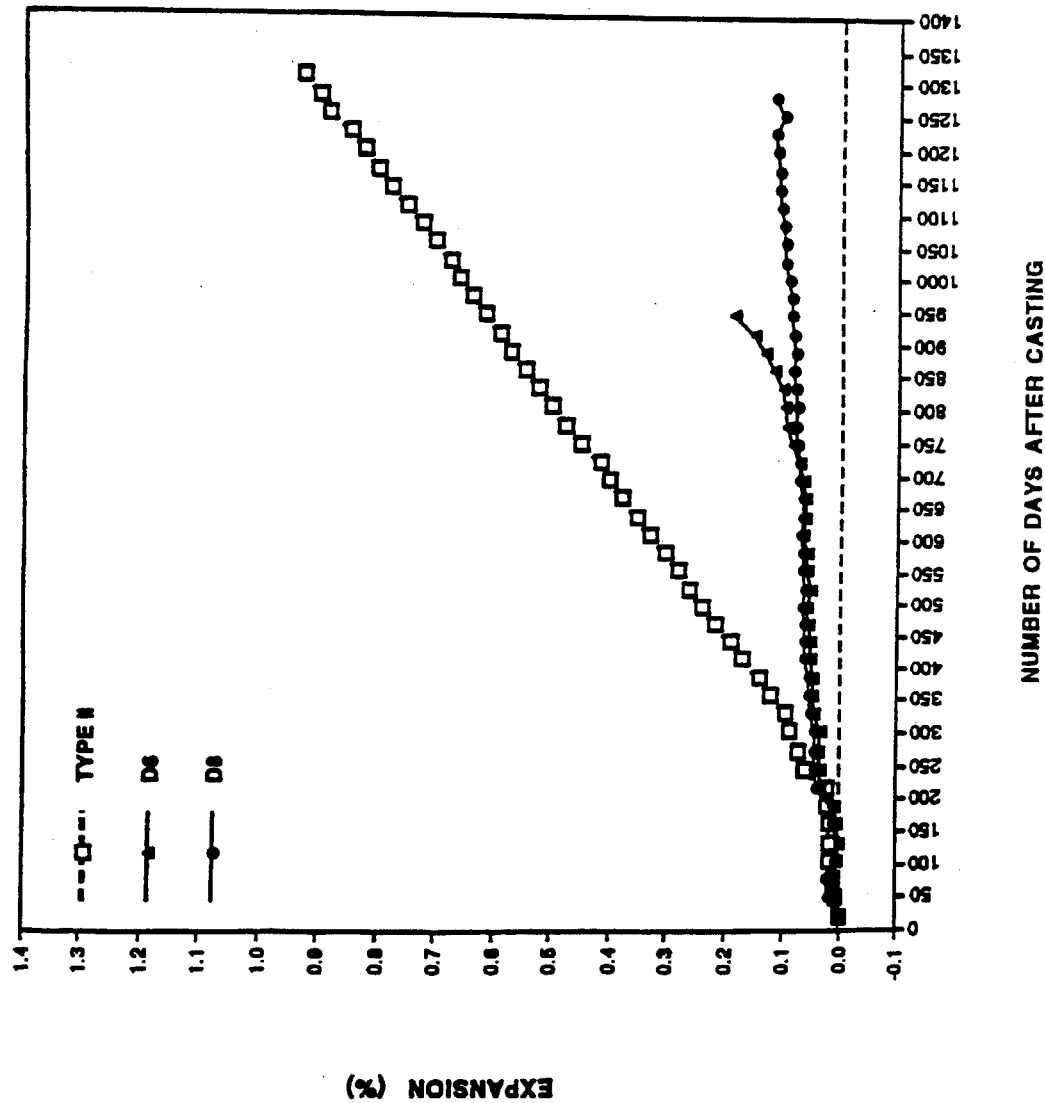
FIG 11 COMPARISON OF SULFATE PERFORMANCE 14-DAY

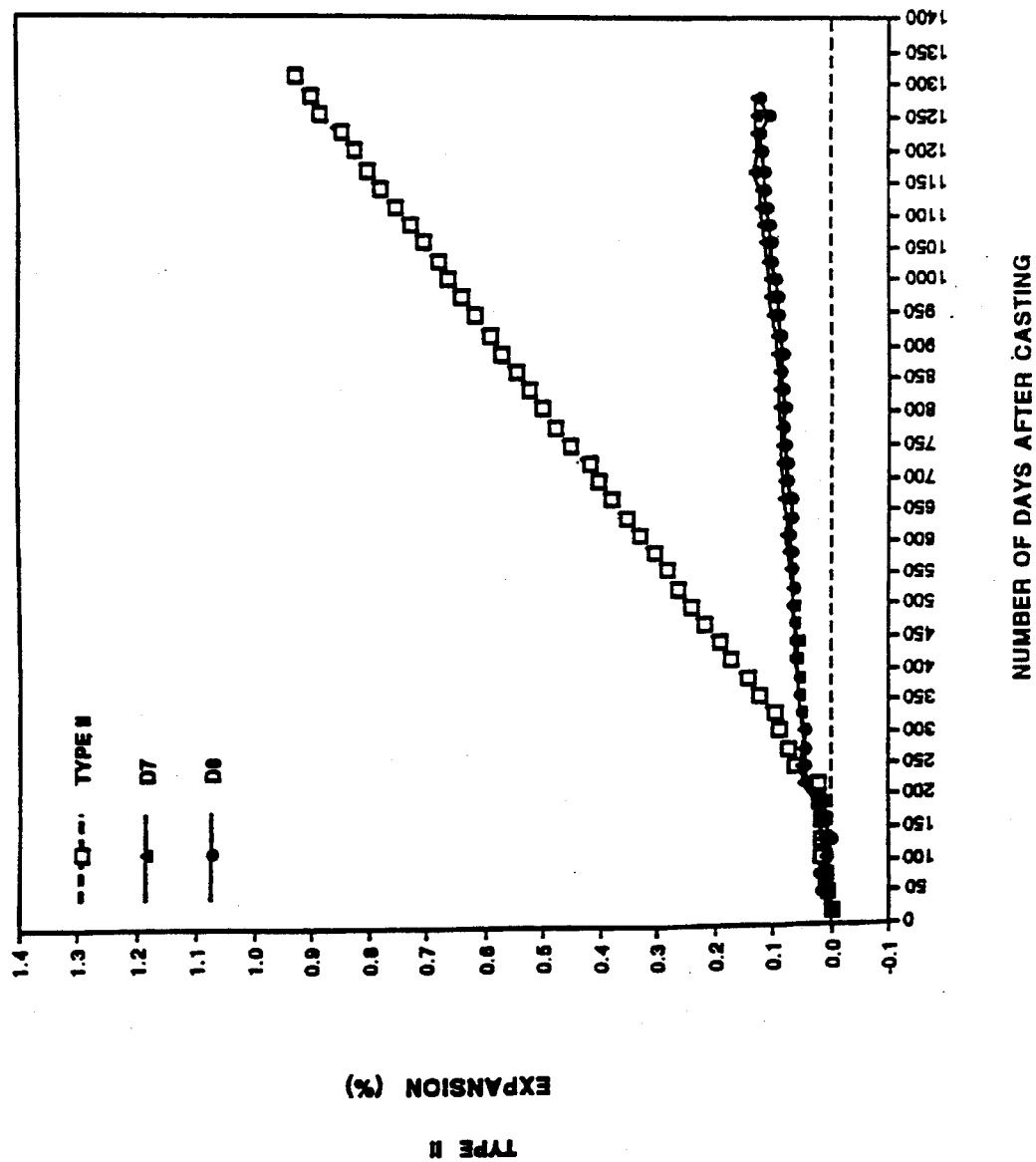
FIG 12 COMPARISON OF SULFATE PERFORMANCE 14-DAY

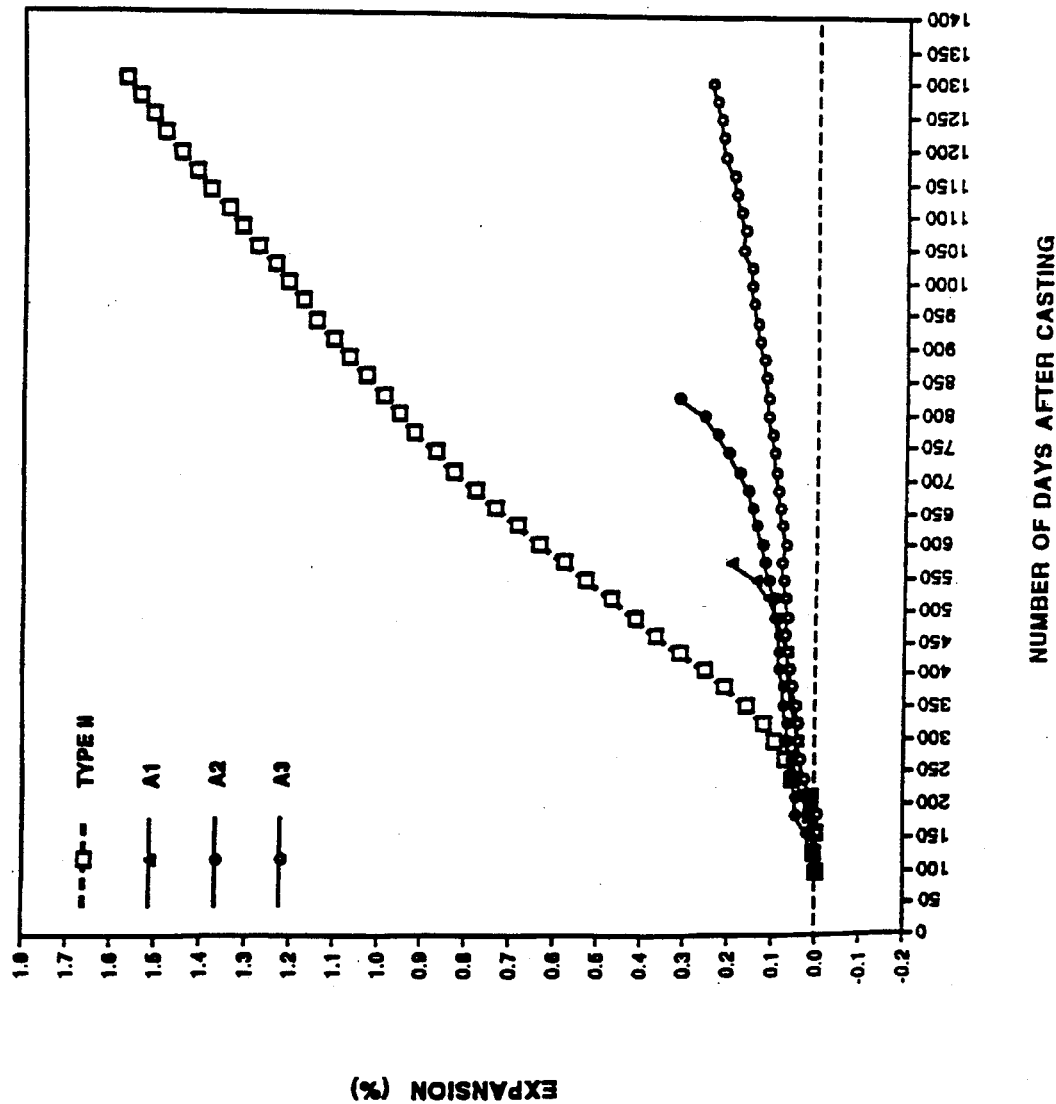

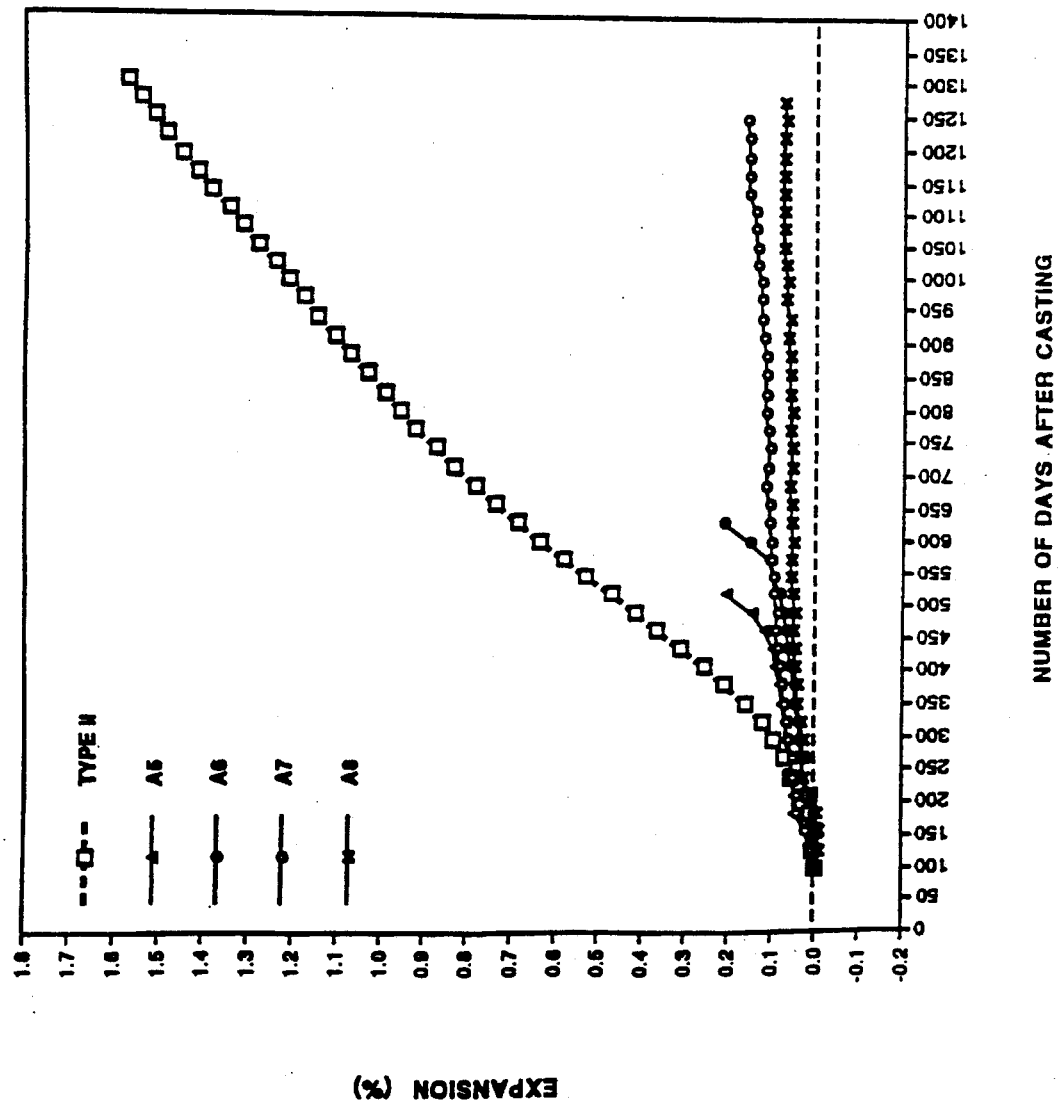
FIG 14 COMPARISON OF SULFATE PERFORMANCE 91-DAY

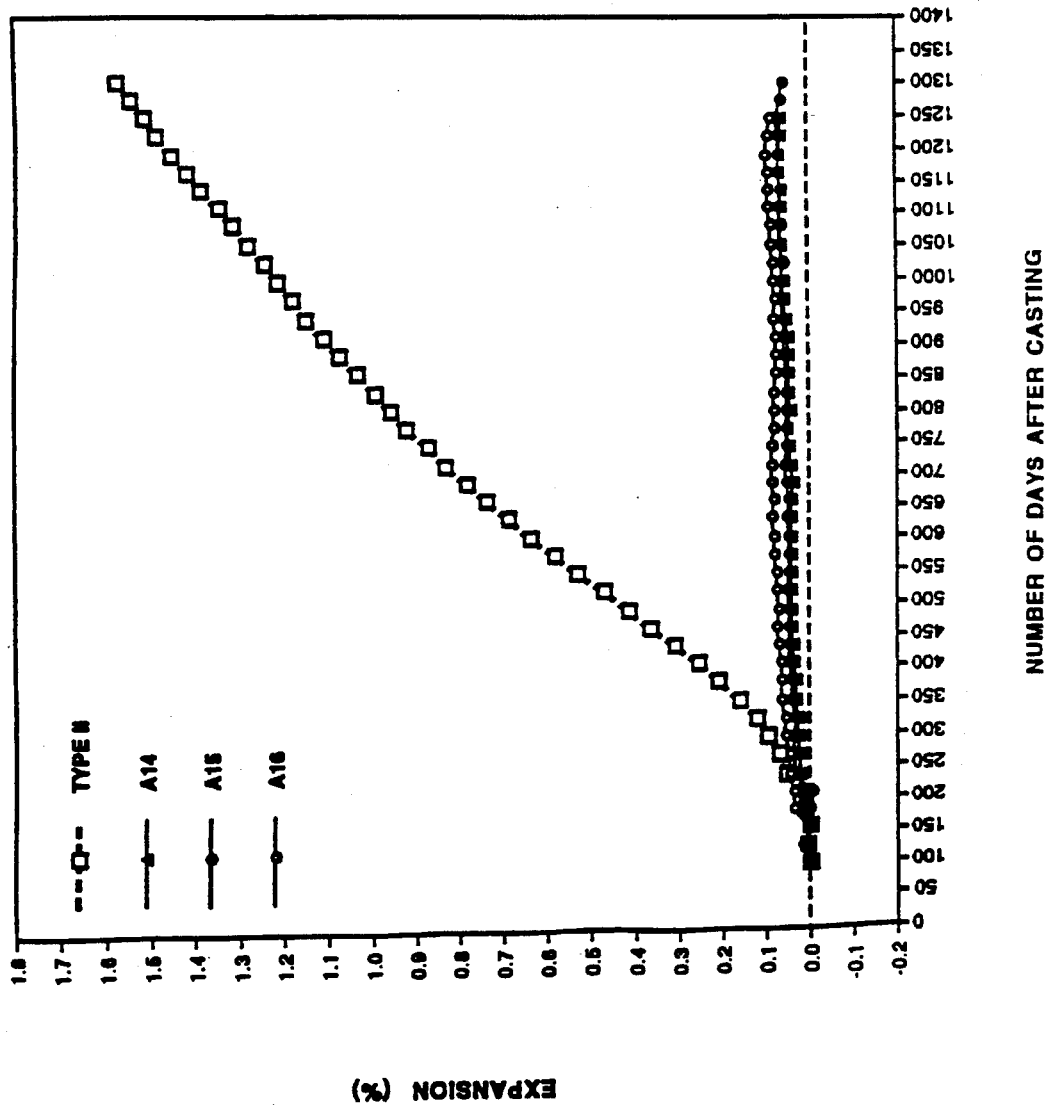
FIG 15 COMPARISON OF SULFATE PERFORMANCE 91-DAY

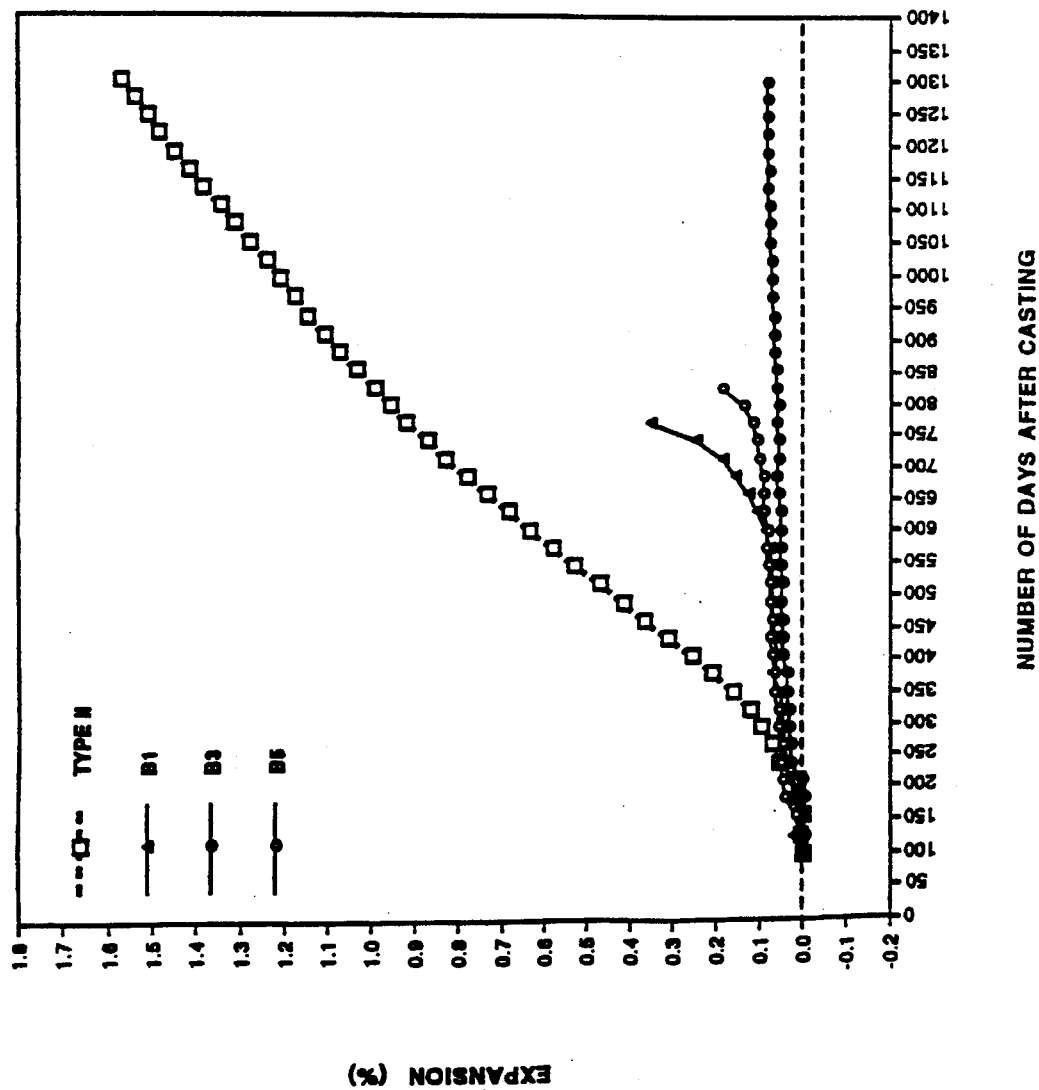

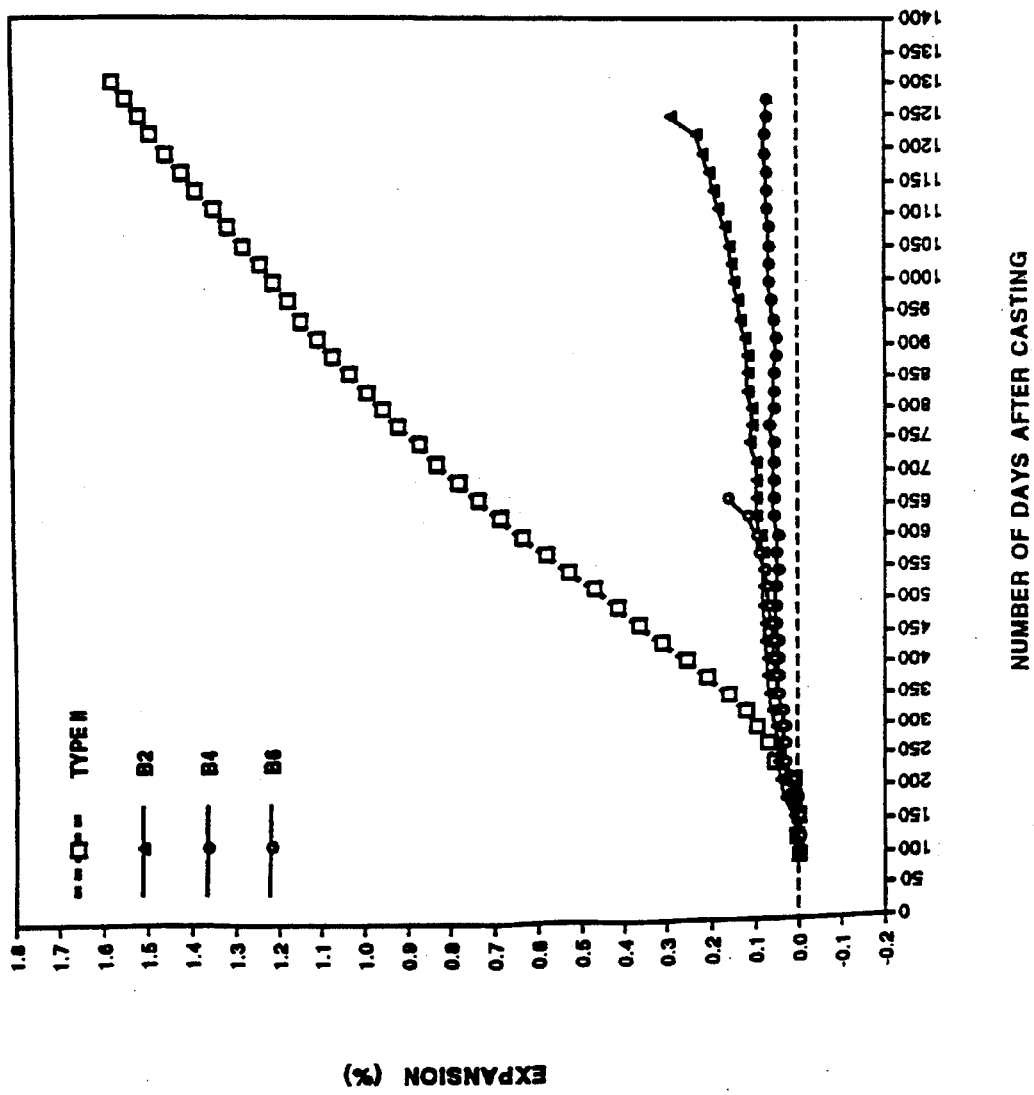

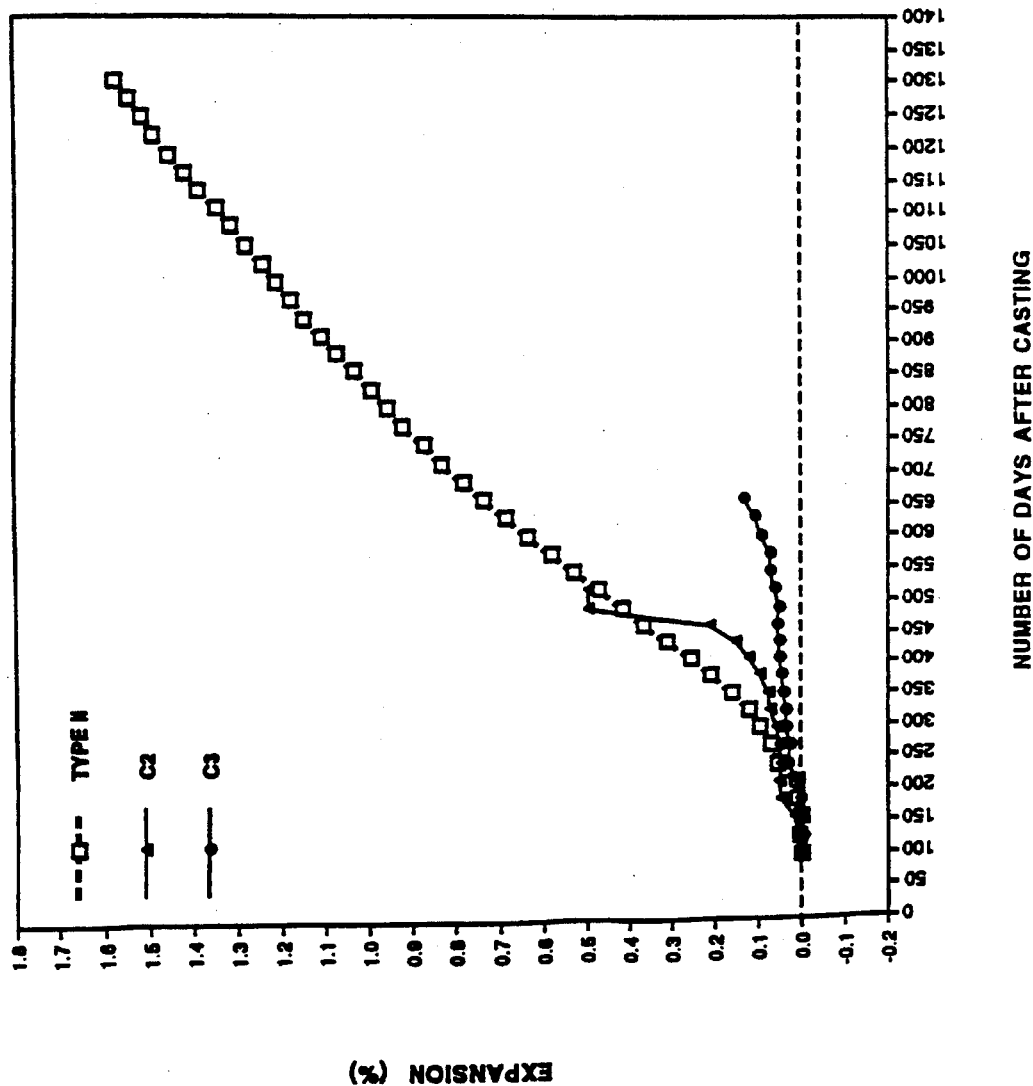
FIG 18  COMPARISON OF SULFATE PERFORMANCE 91-DAY

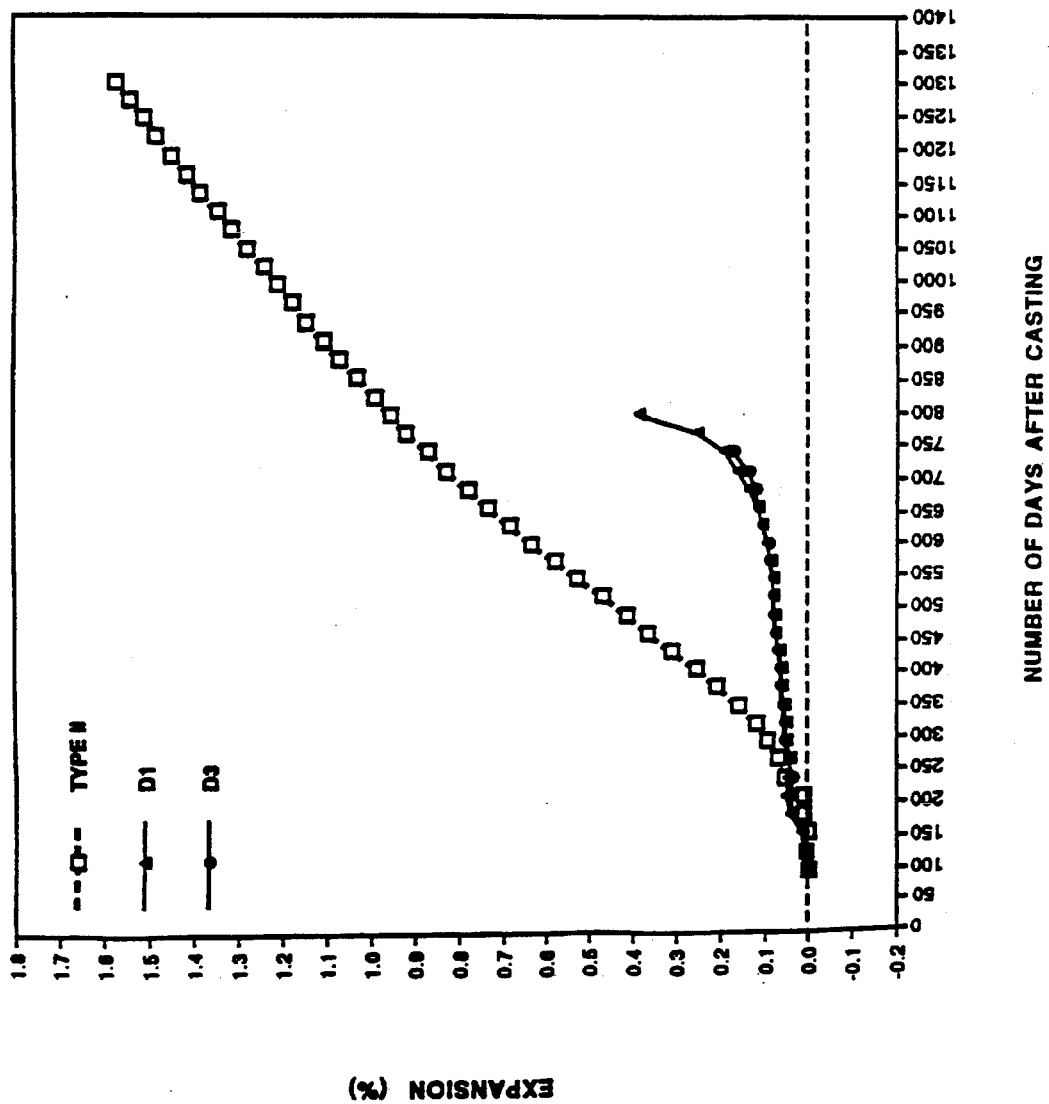
FIG 19 COMPARISON OF SULFATE PERFORMANCE 91-DAY

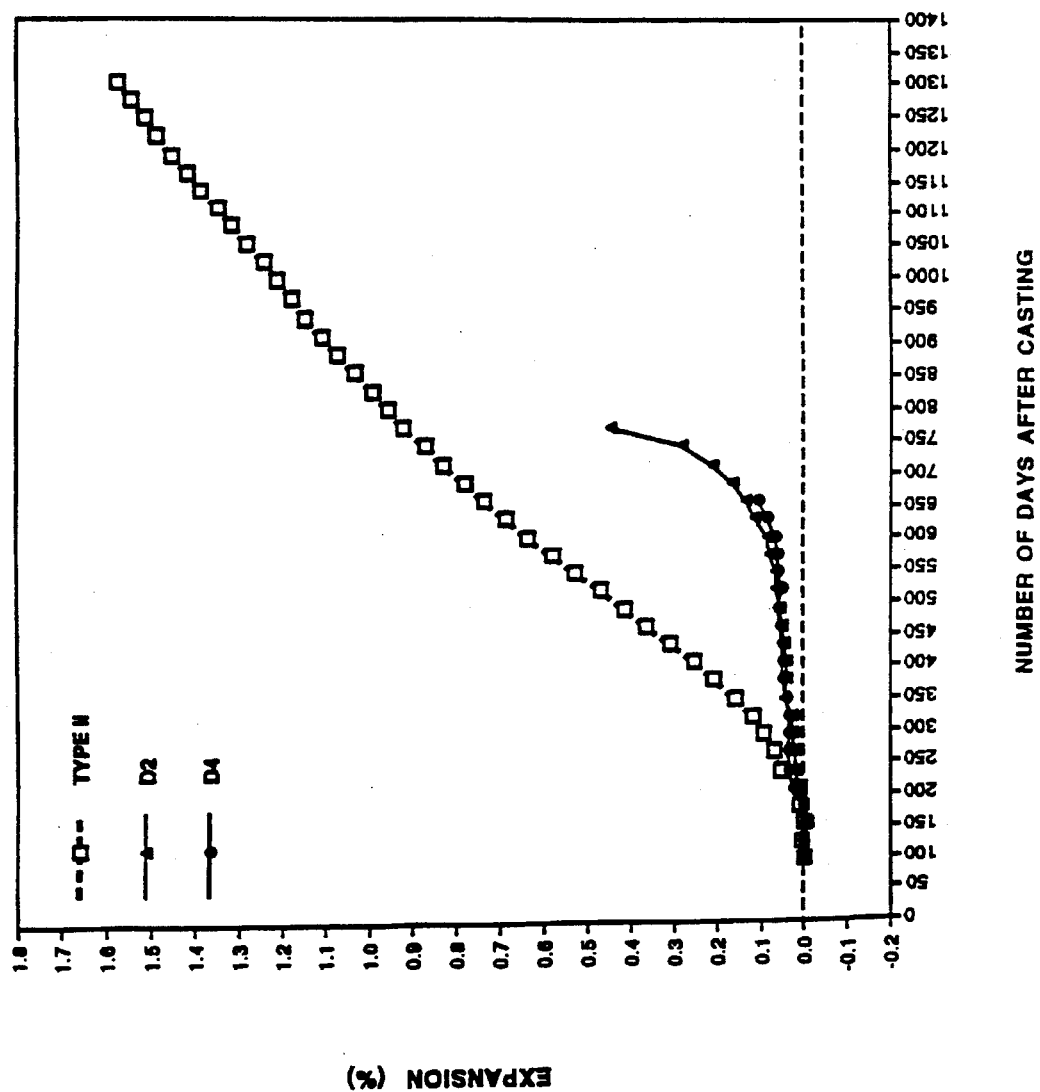
FIG 20 COMPARISON OF SULFATE PERFORMANCE 91-DAY

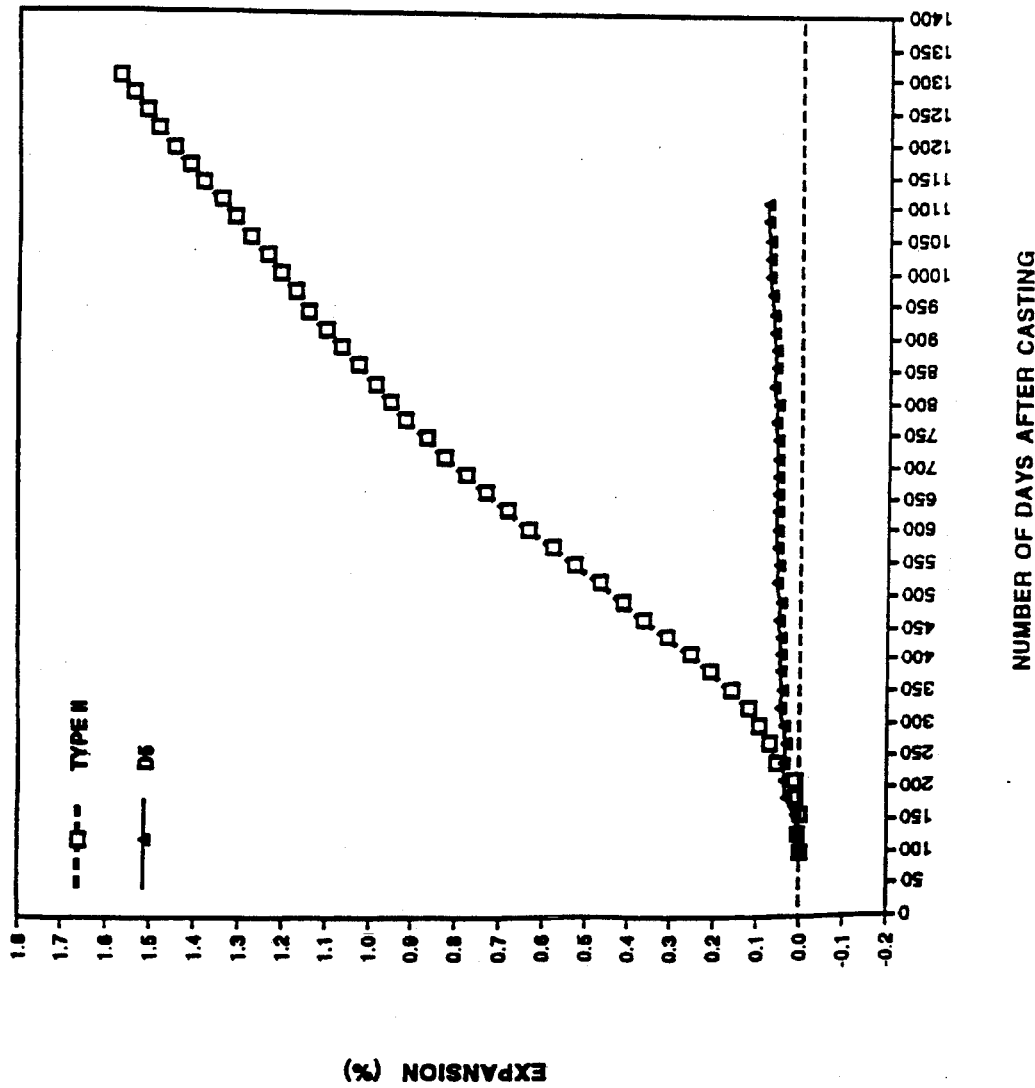

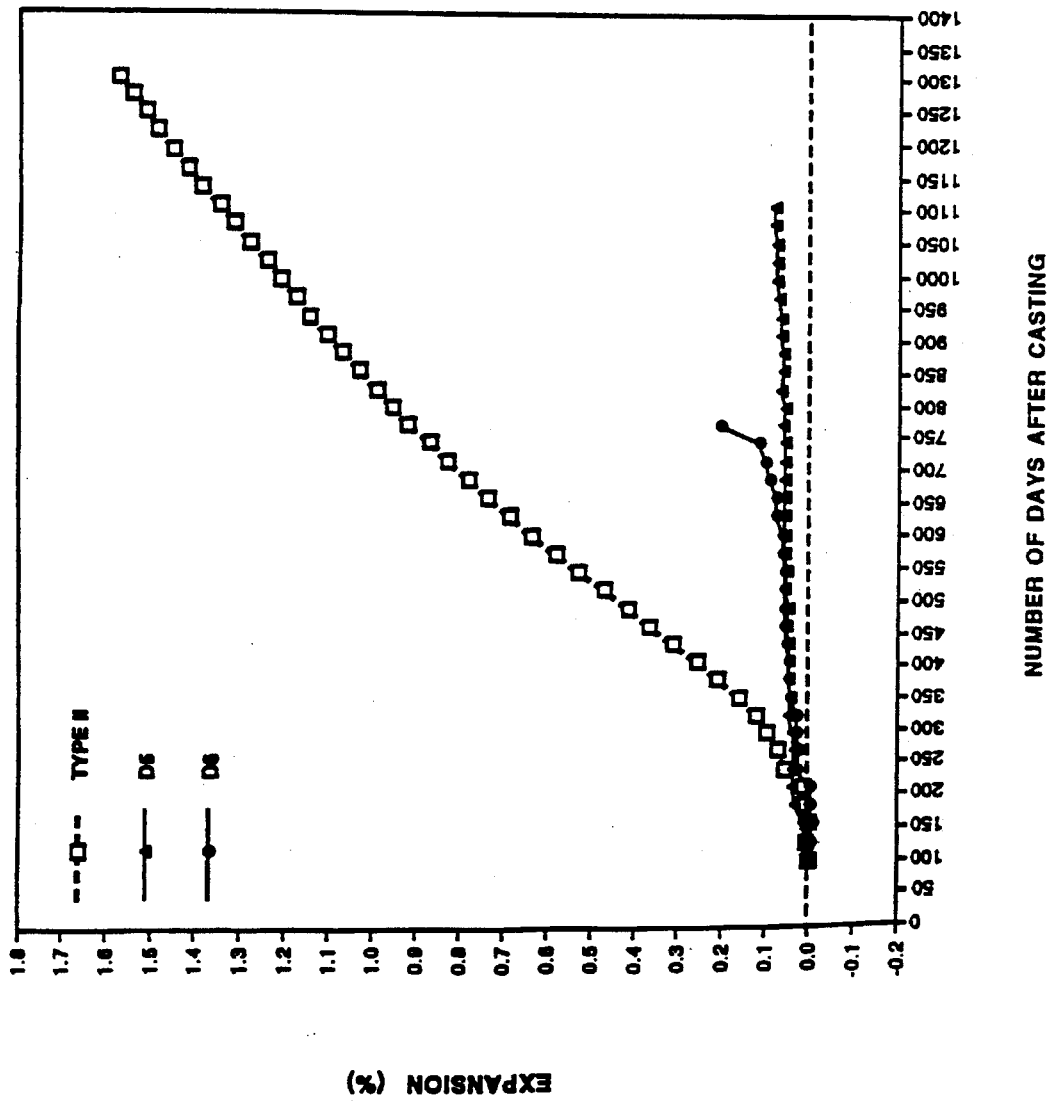
FIG 22 COMPARISON OF SULFATE PERFORMANCE 91-DAY

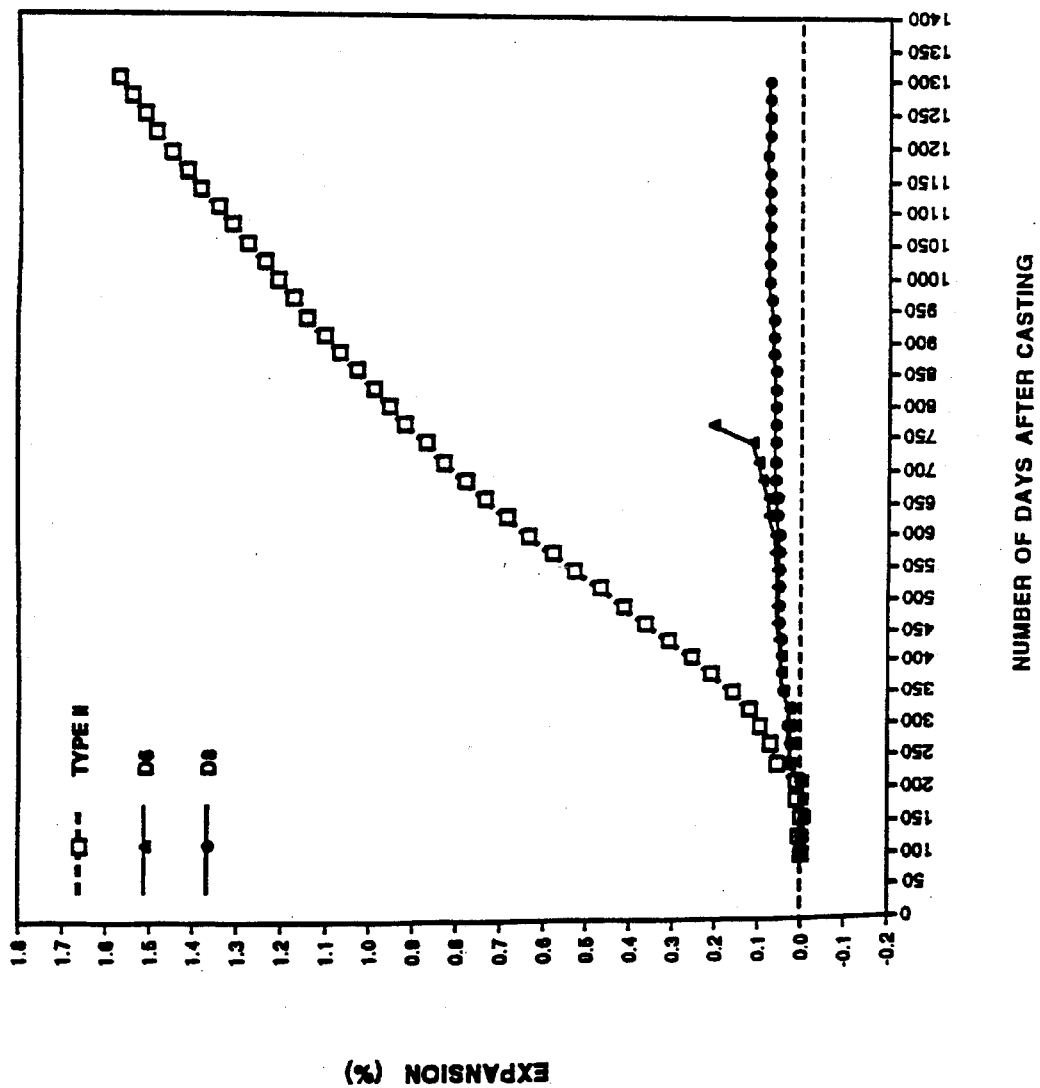

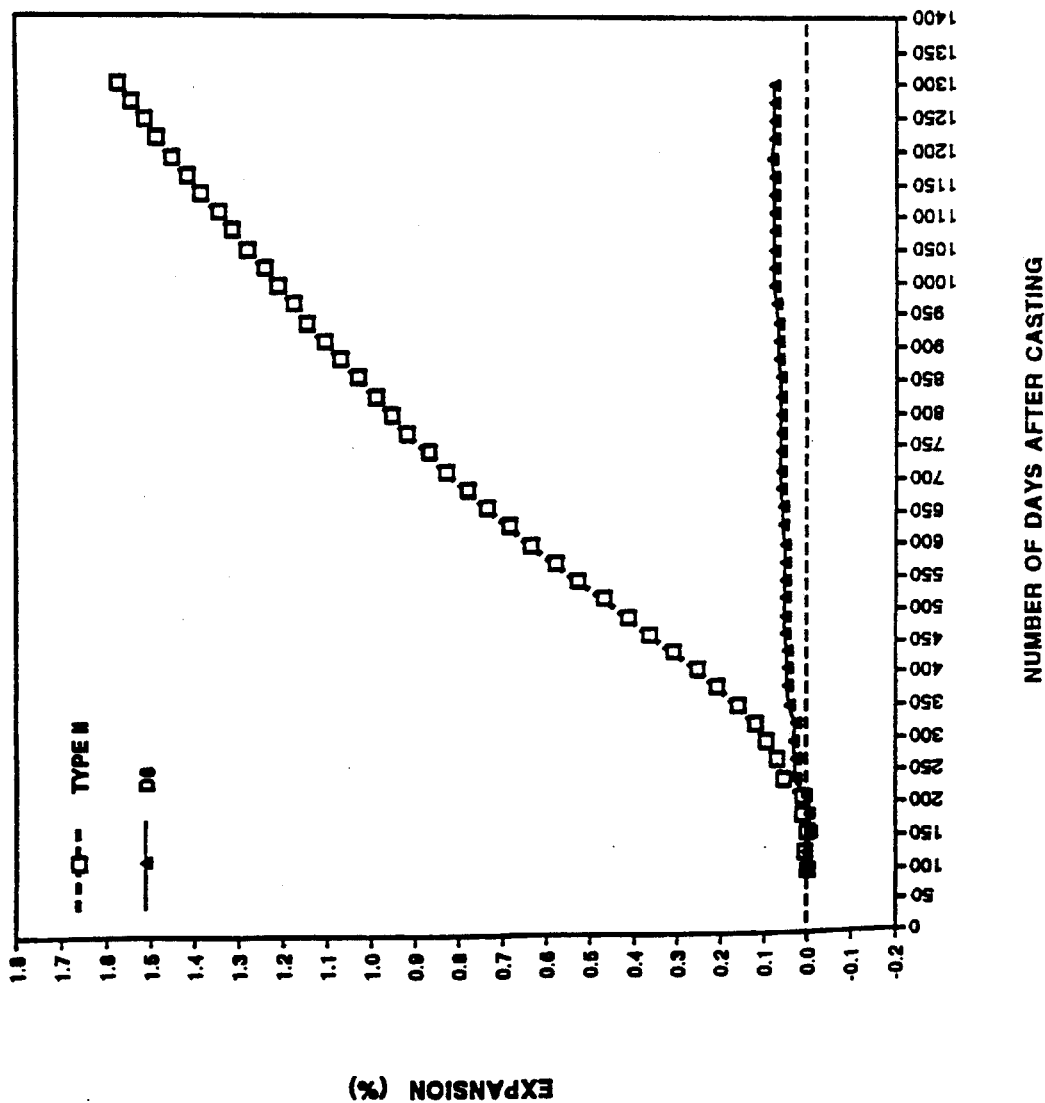
FIG 24 COMPARISON OF SULFATE PERFORMANCE 91-DAY

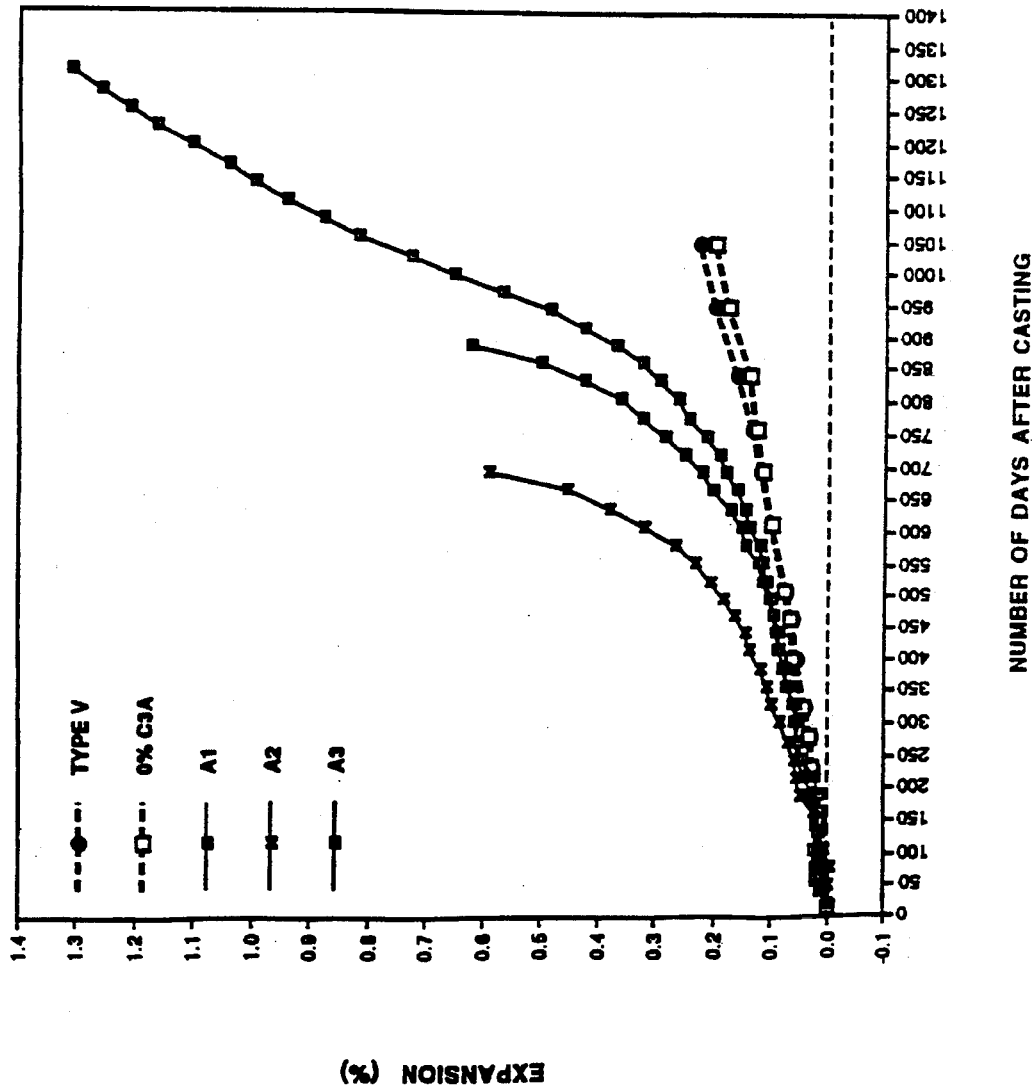
FIG 25 COMPARISON OF SULFATE PERFORMANCE 14-DAY

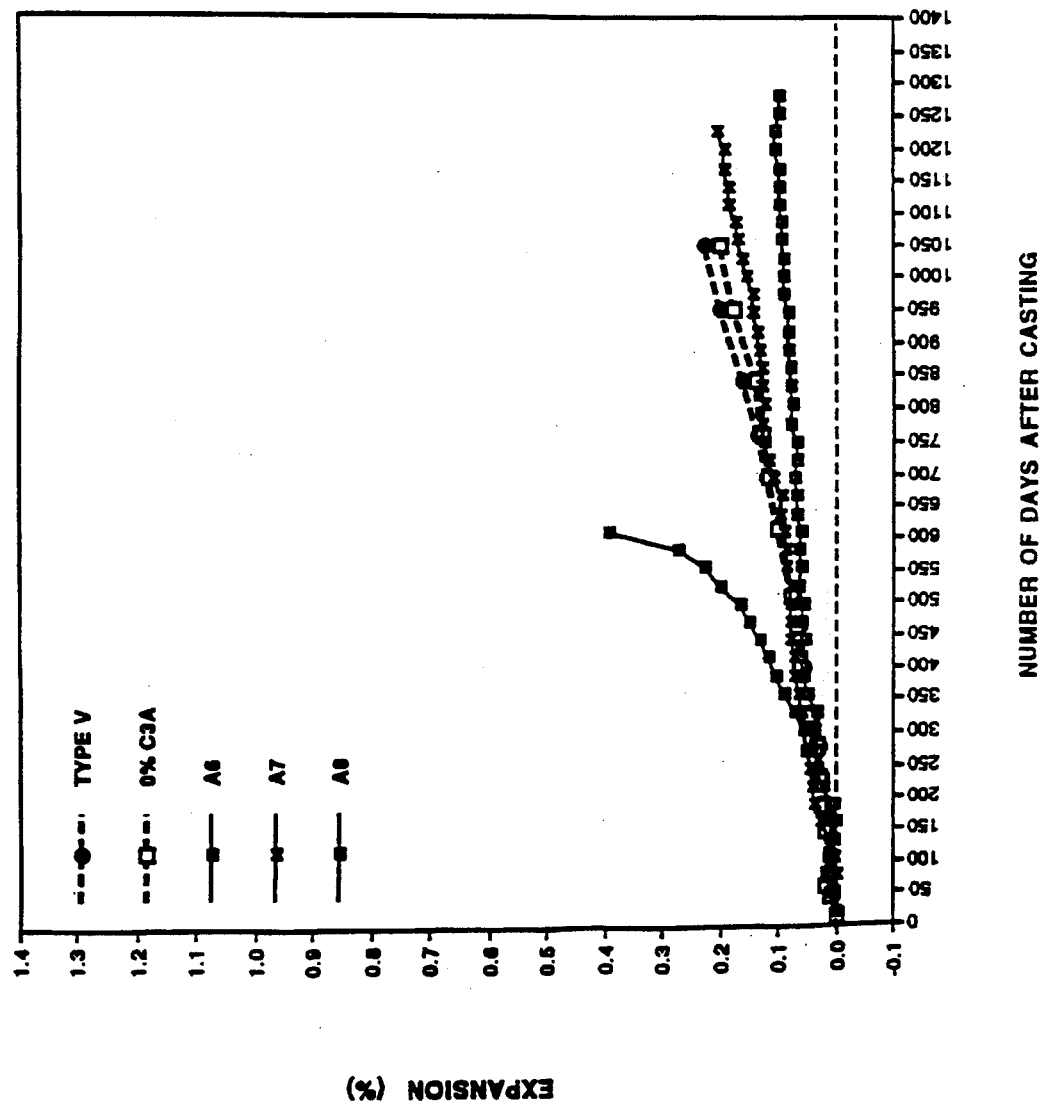
FIG 26 COMPARISON OF SULFATE PERFORMANCE 14-DAY

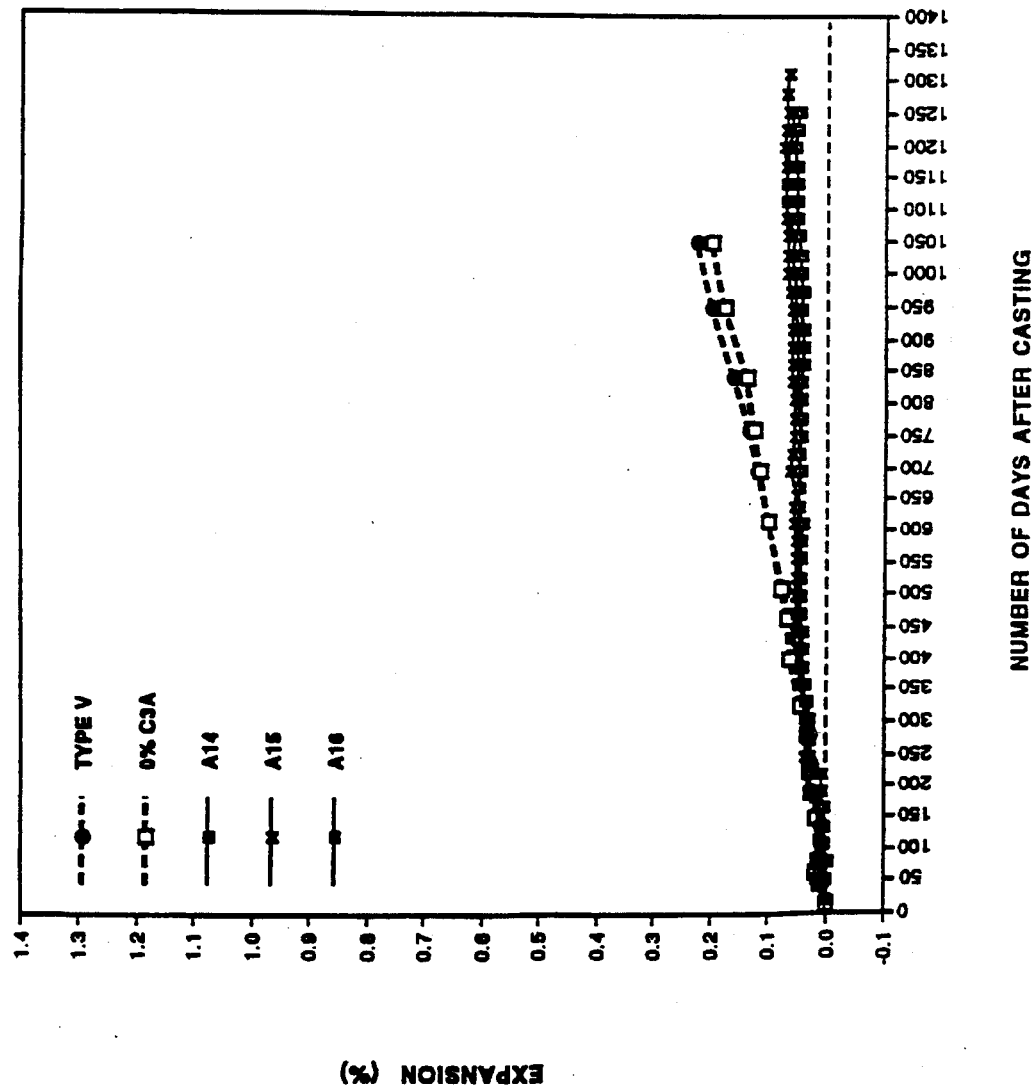
FIG 27 COMPARISON OF SULFATE PERFORMANCE 14-DAY

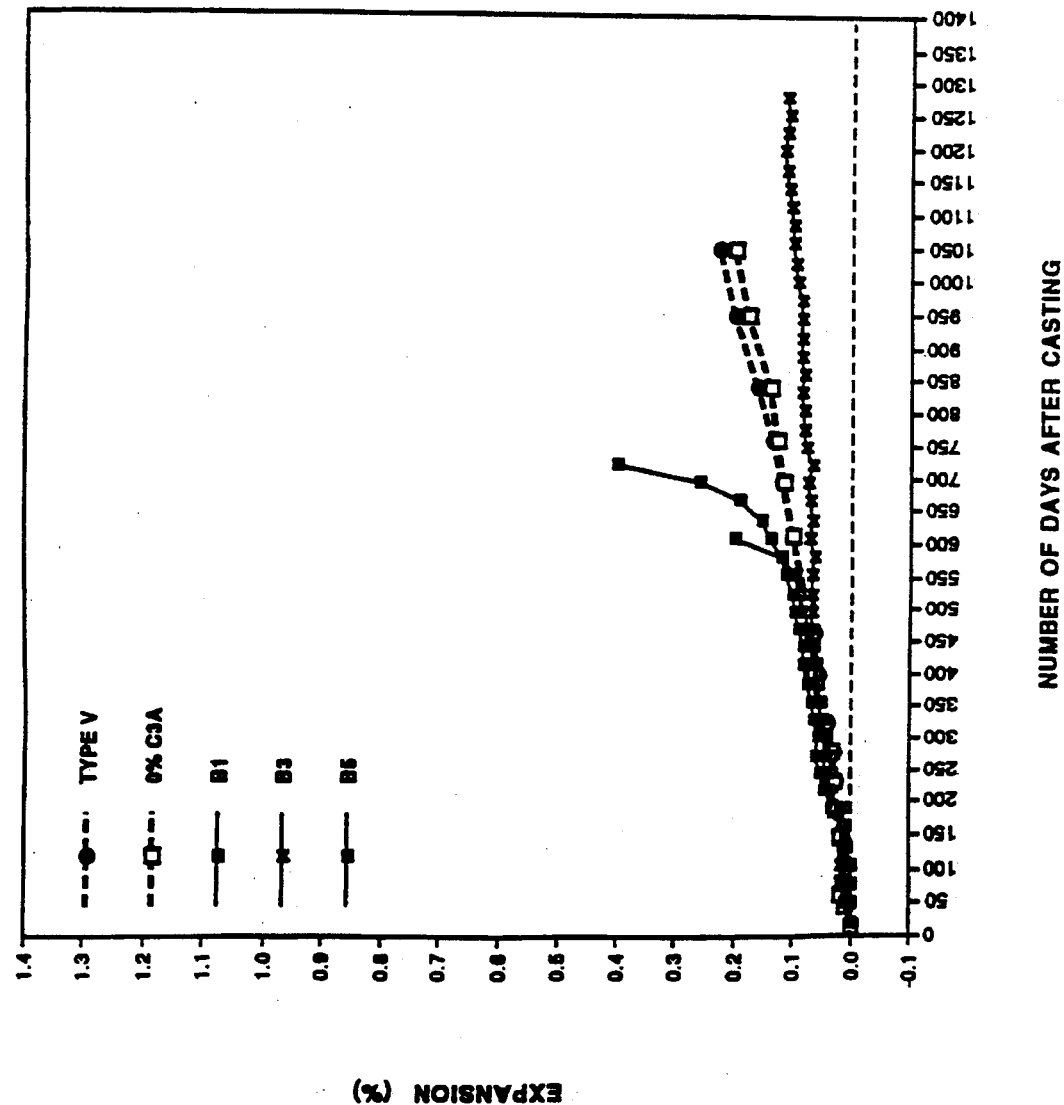

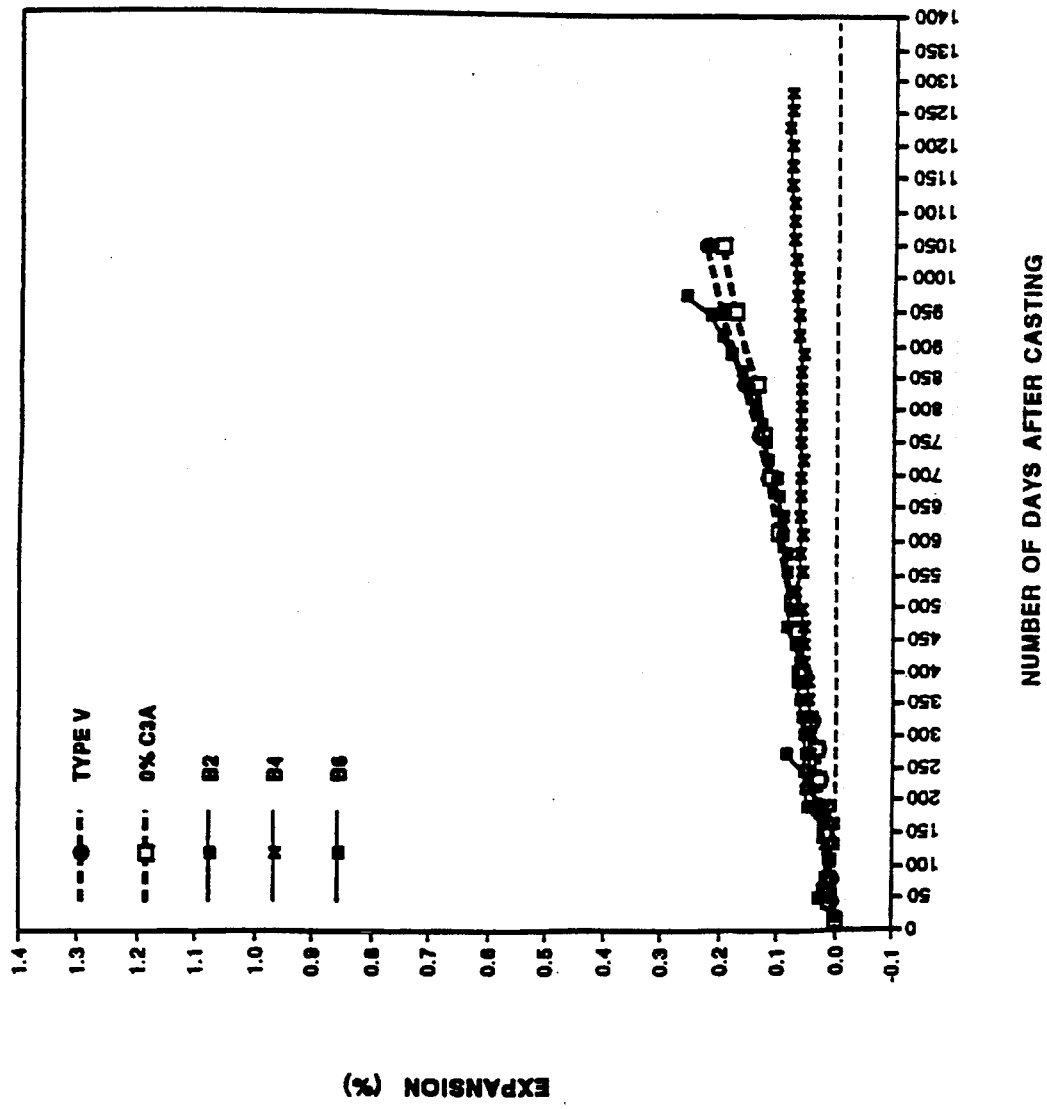
FIG 29  COMPARISON OF SULFATE PERFORMANCE
14-DAY

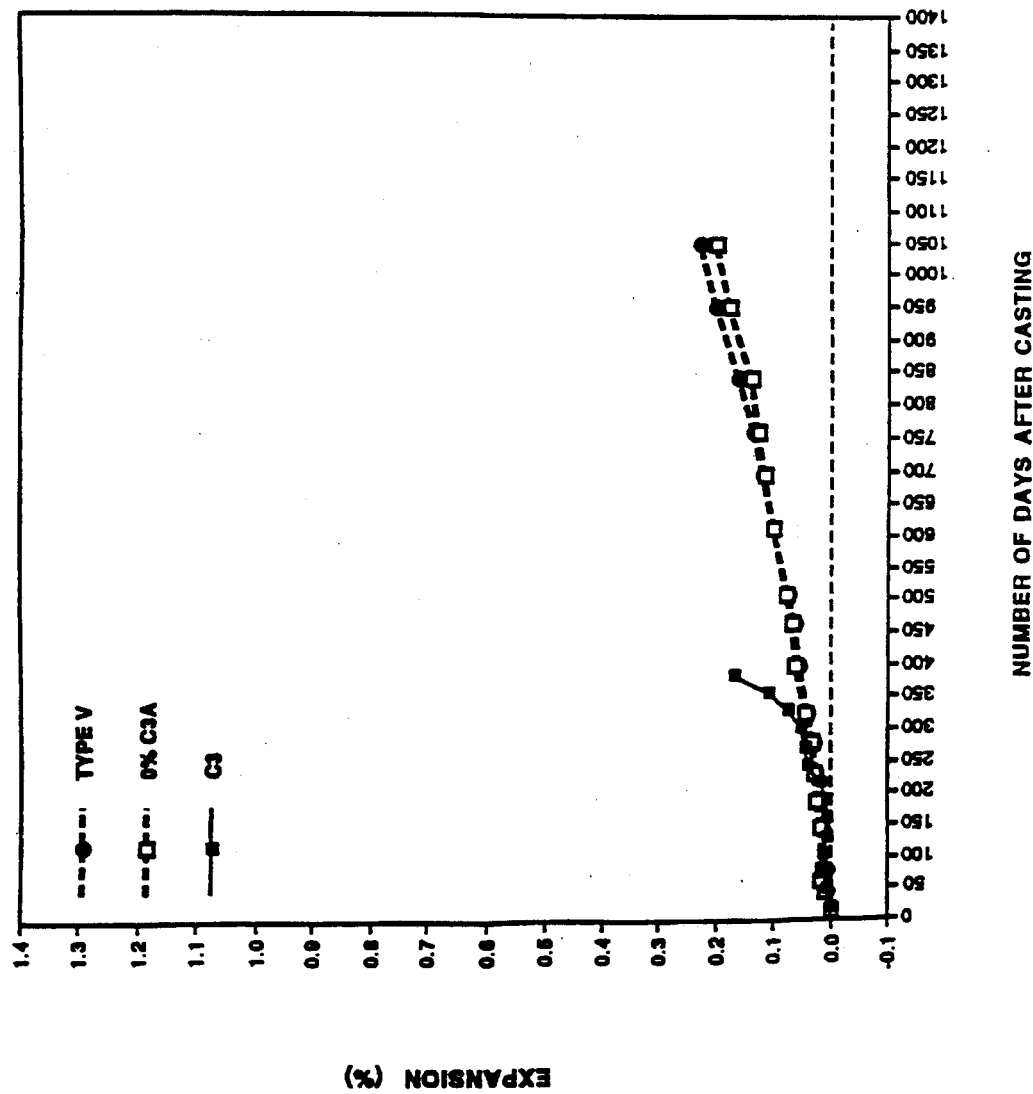

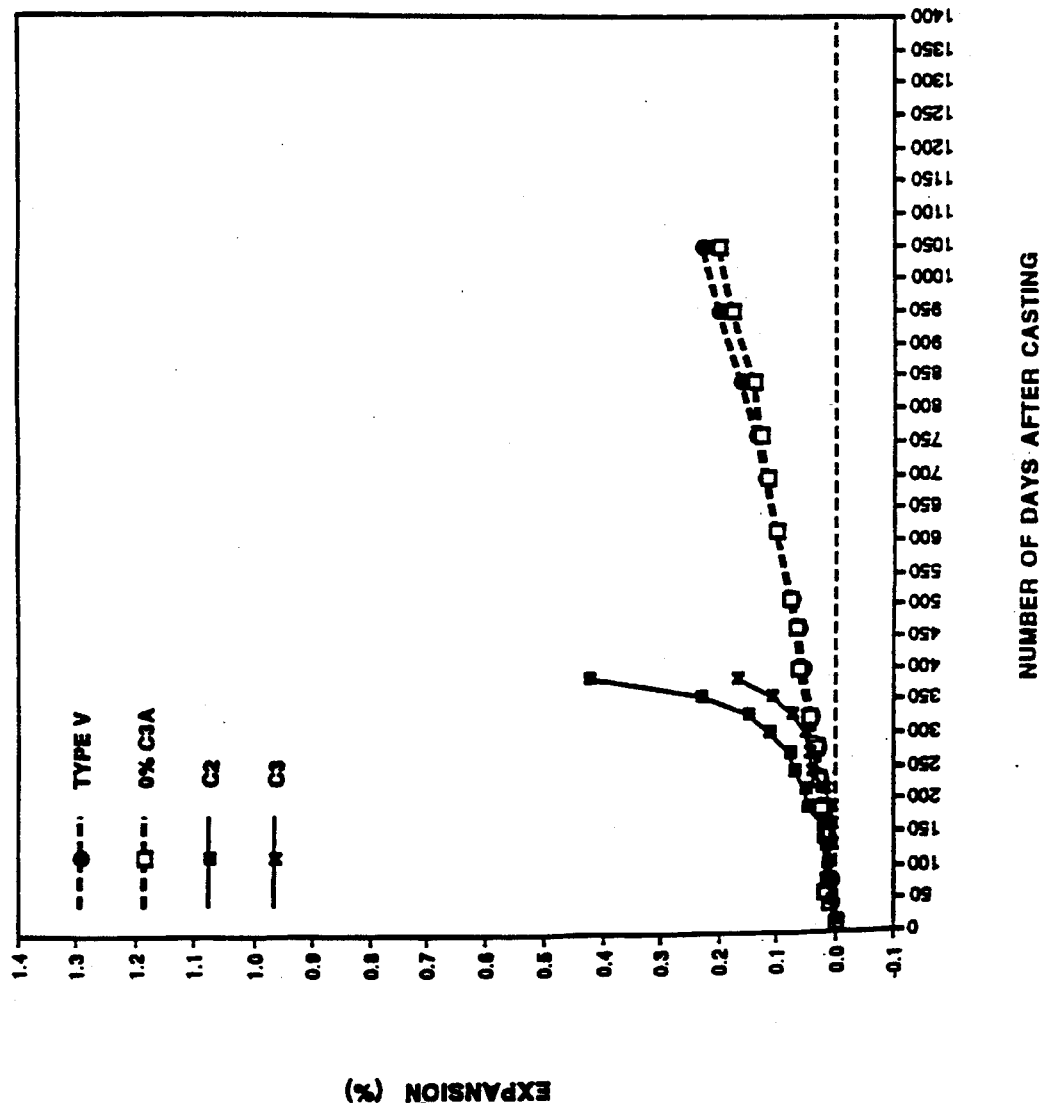

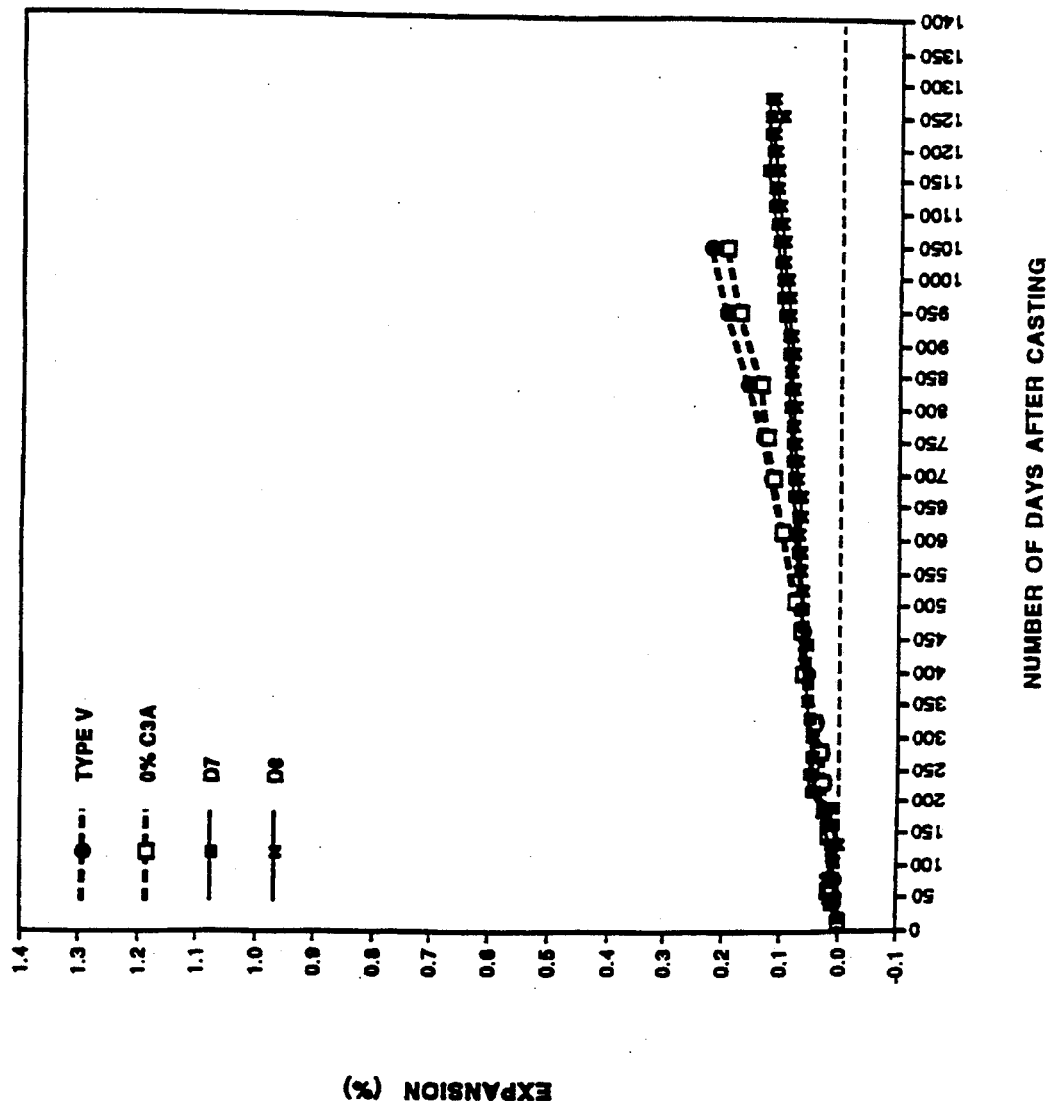

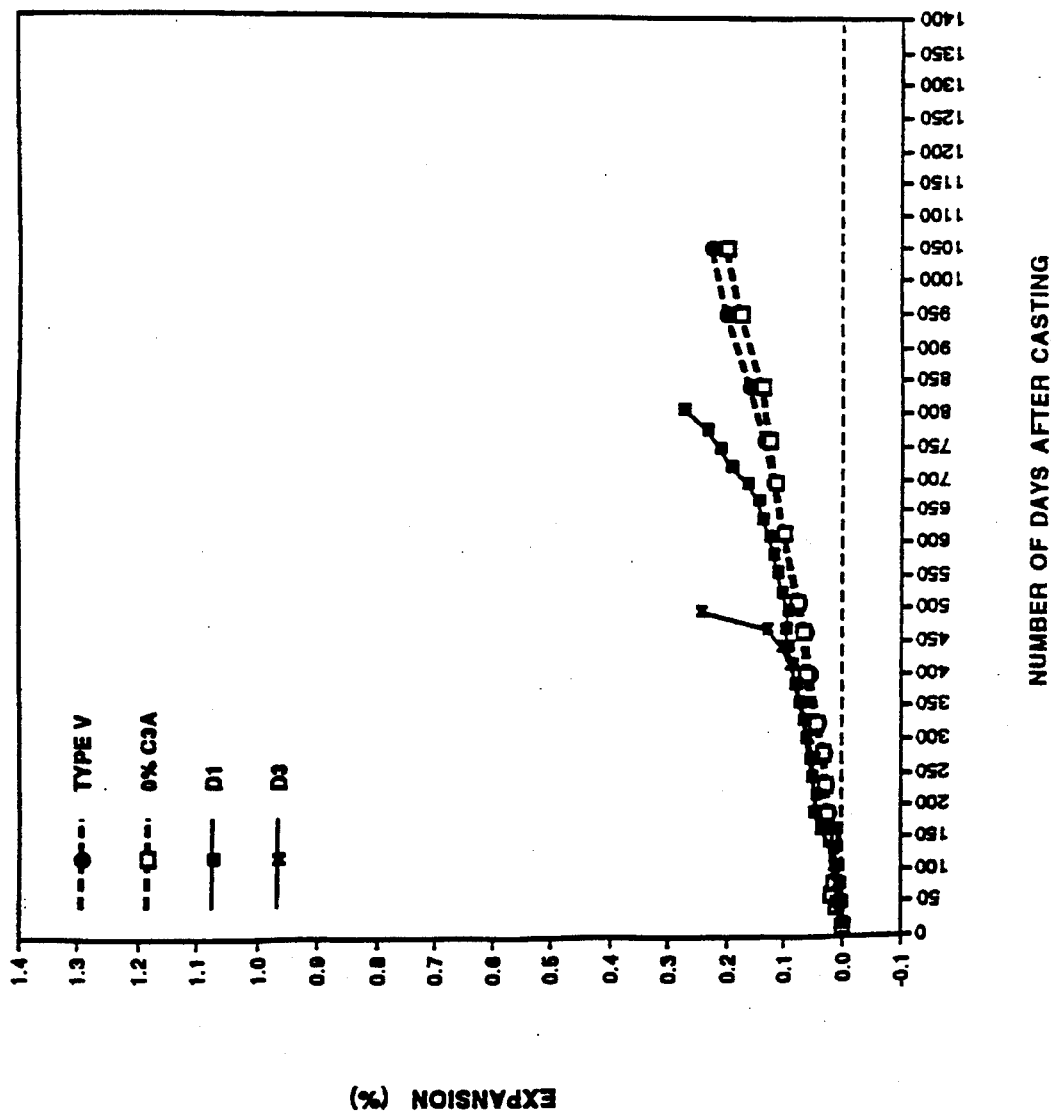
FIG 33 COMPARISON OF SULFATE PERFORMANCE 14-DAY

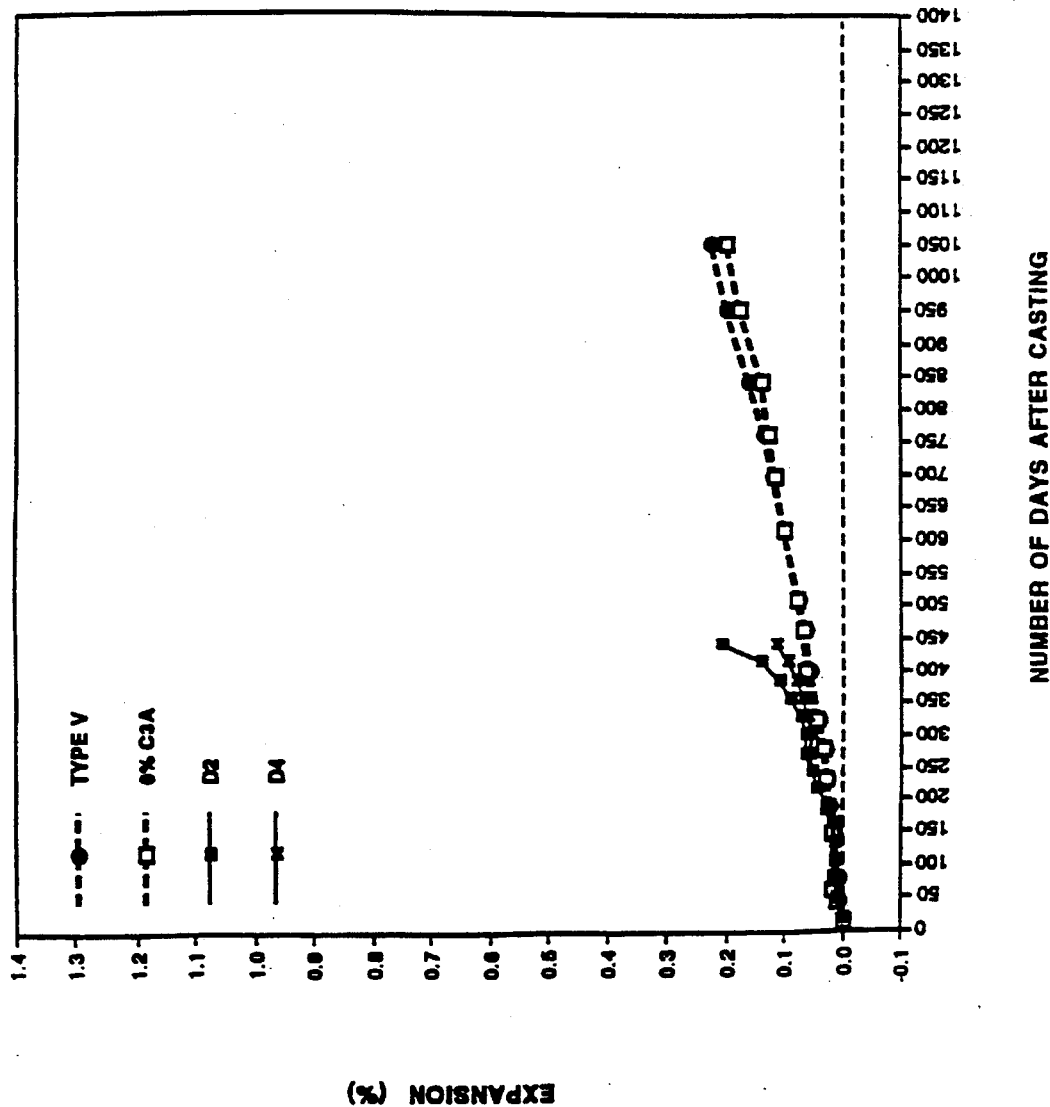

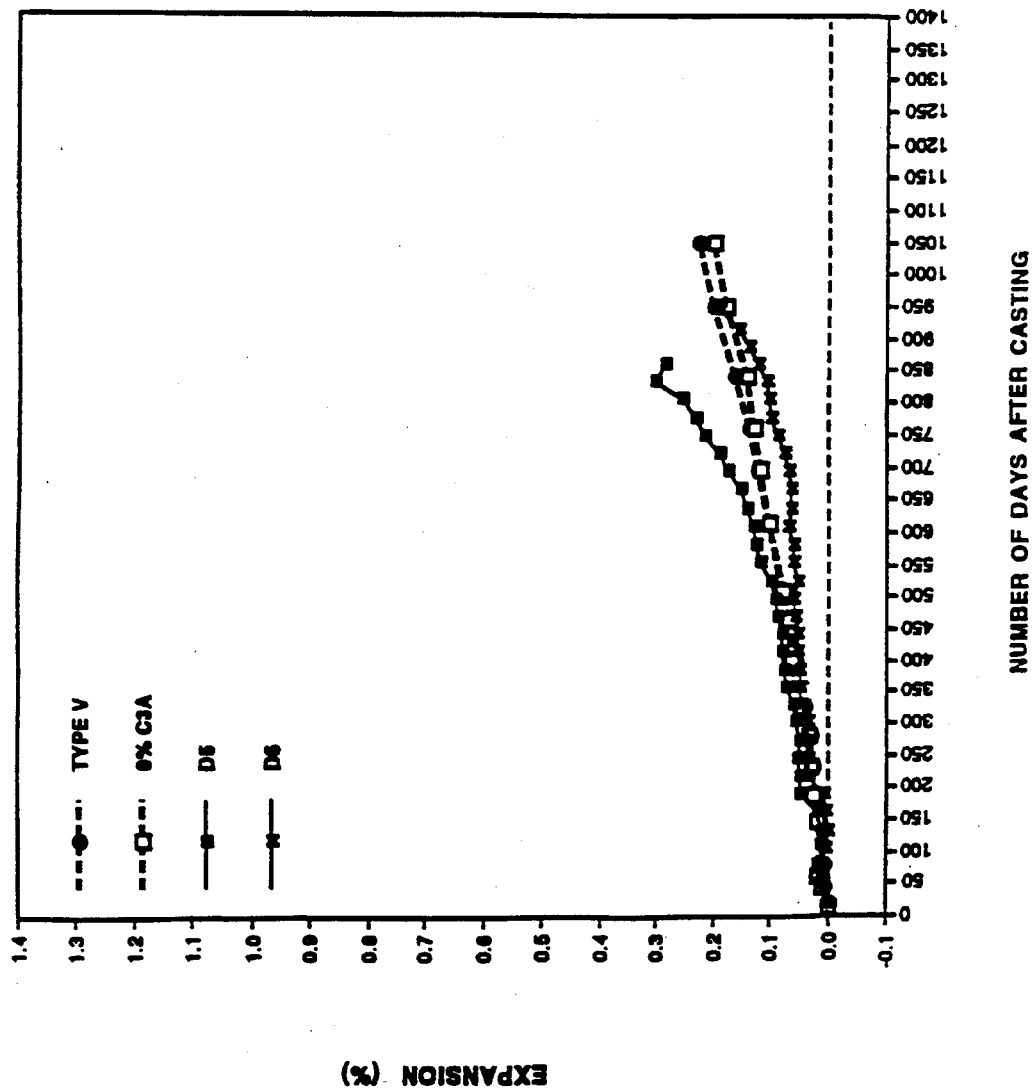
FIG 35 COMPARISON OF SULFATE PERFORMANCE 14-DAY

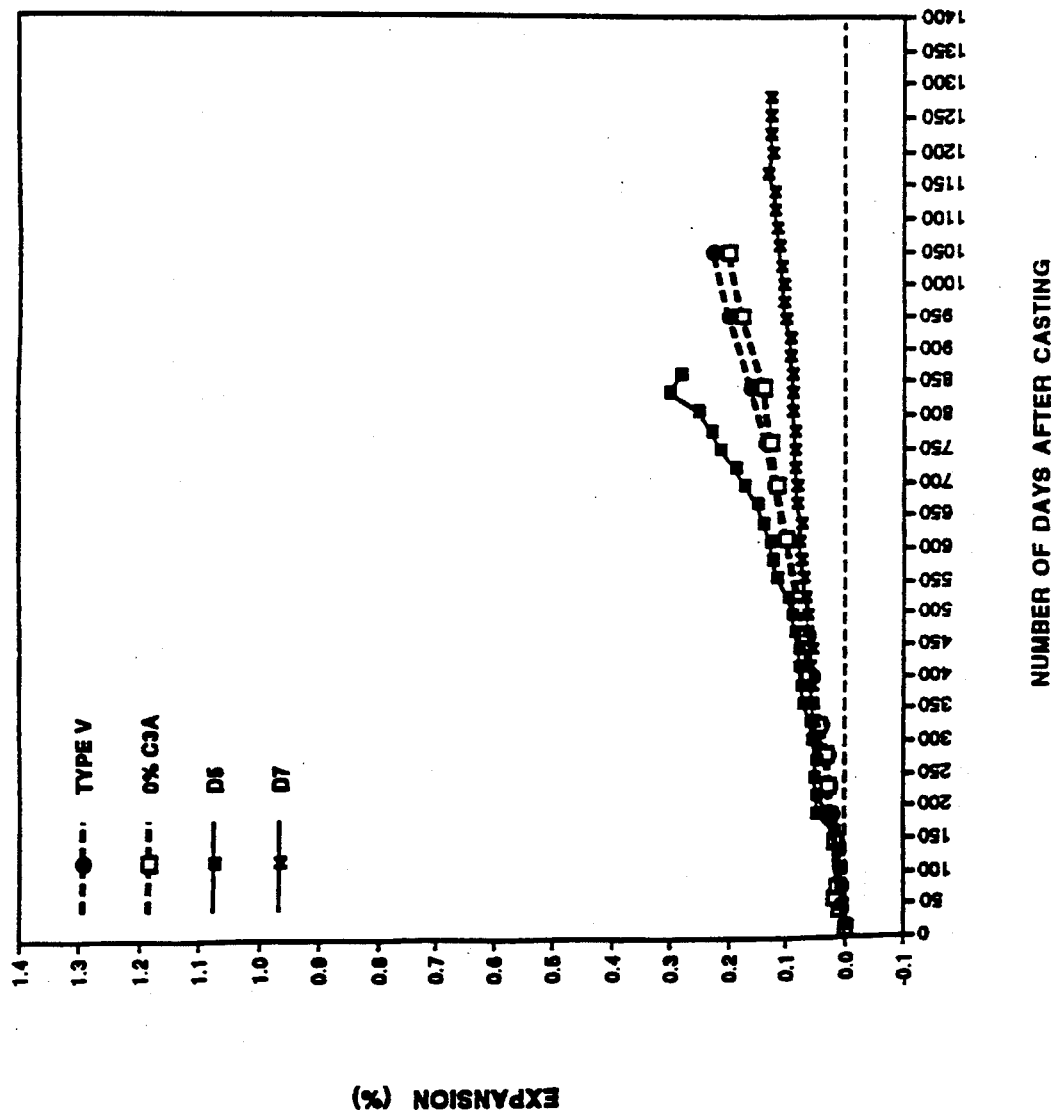
FIG 36 COMPARISON OF SULFATE PERFORMANCE 14-DAY

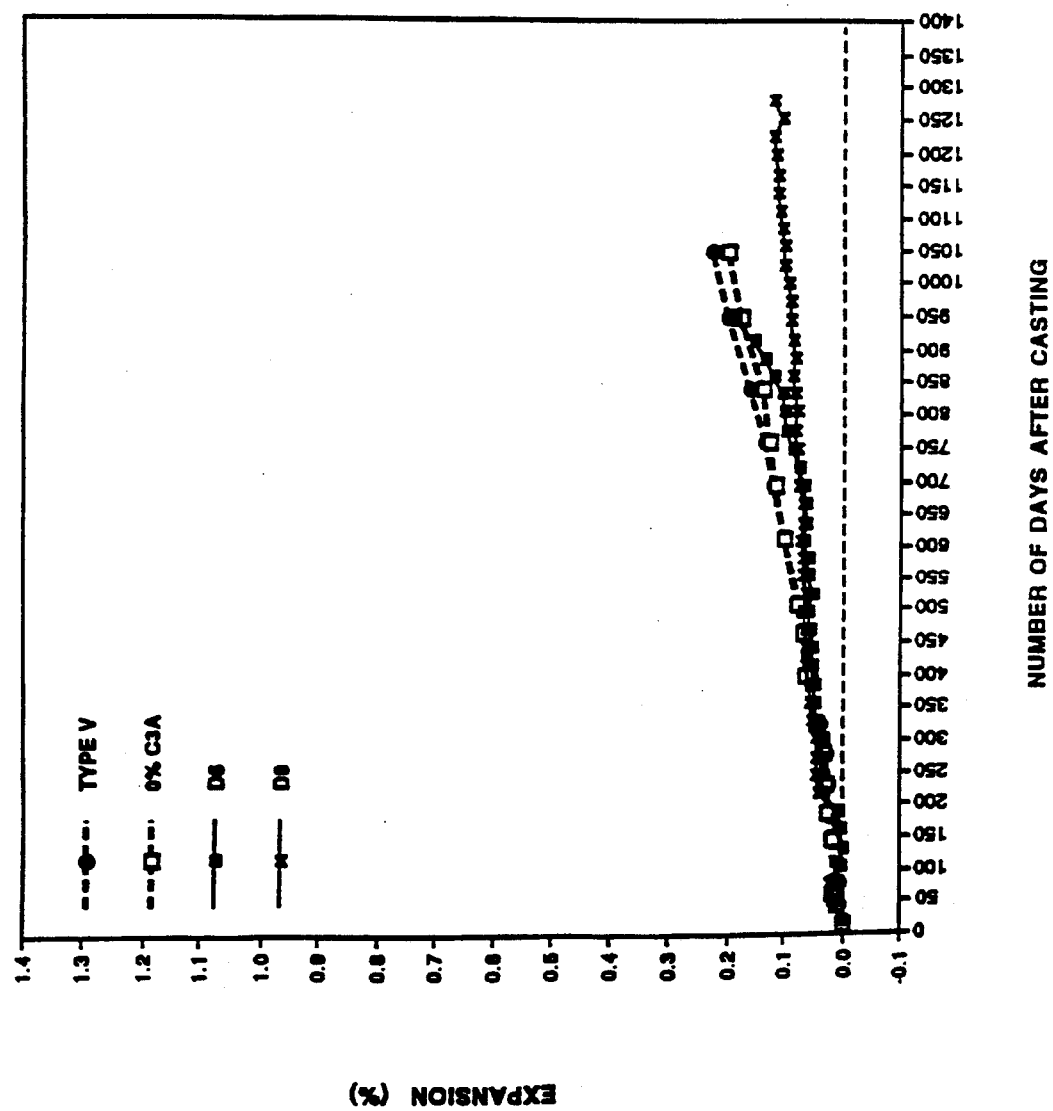
FIG 37 COMPARISON OF SULFATE PERFORMANCE 14-DAY

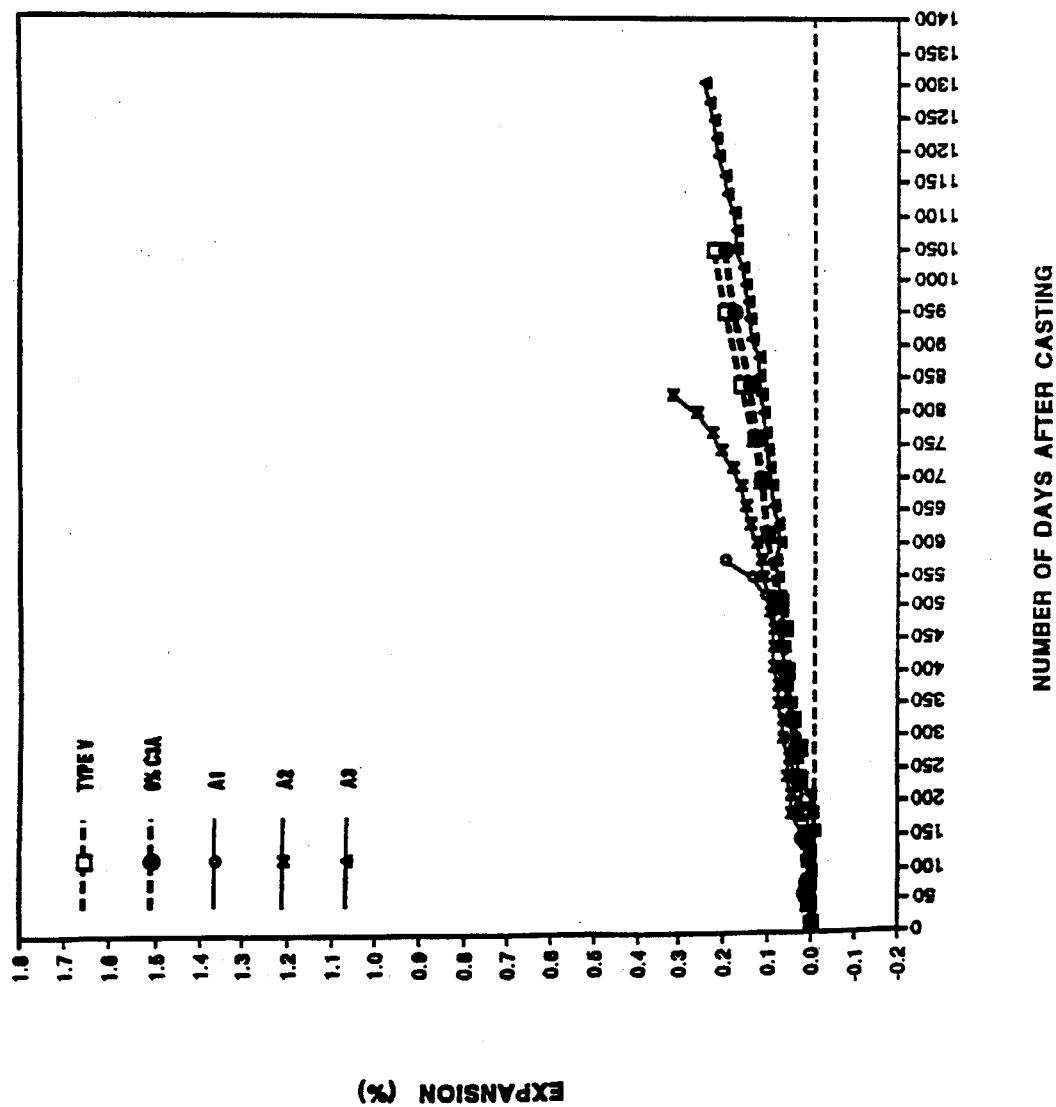

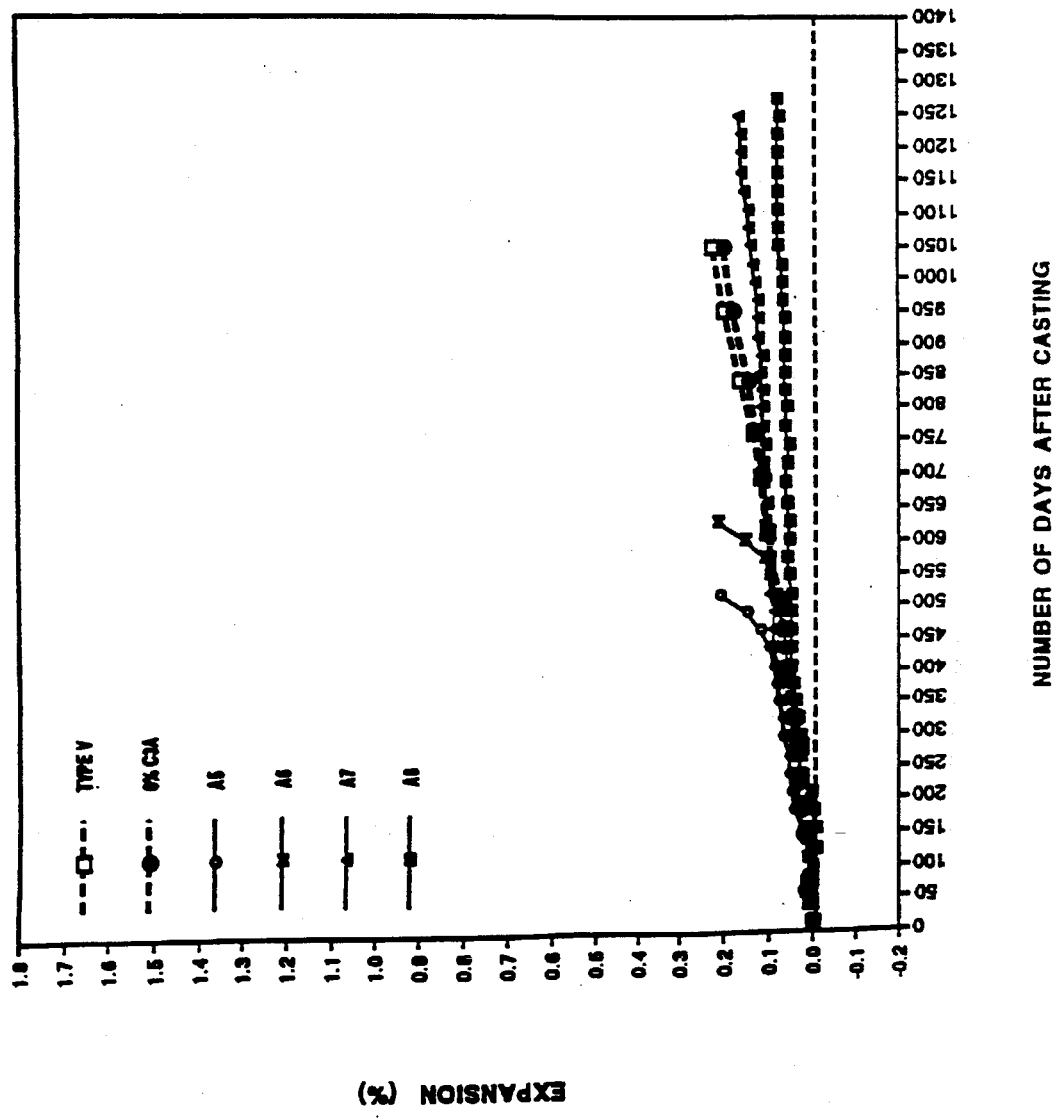

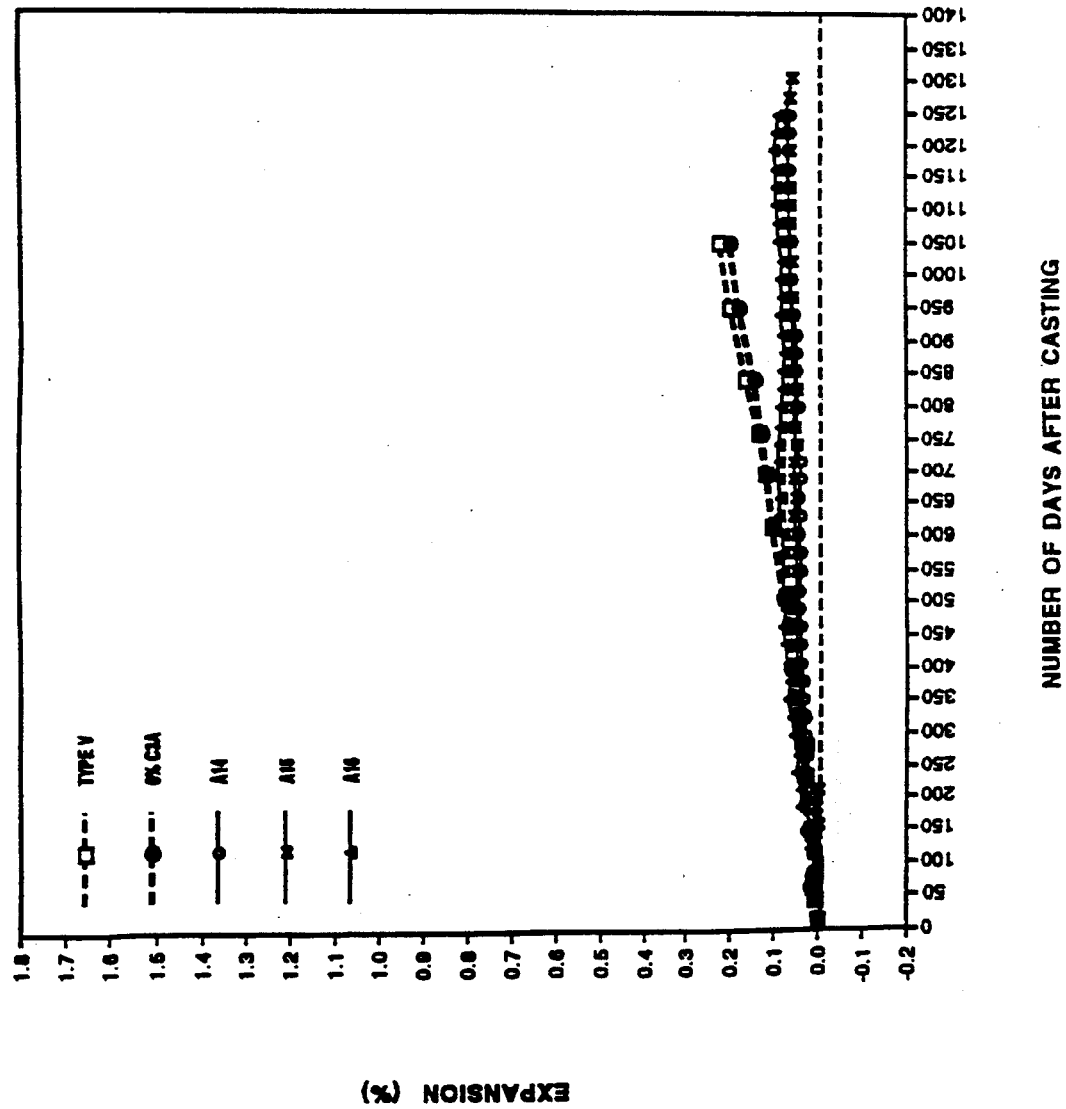

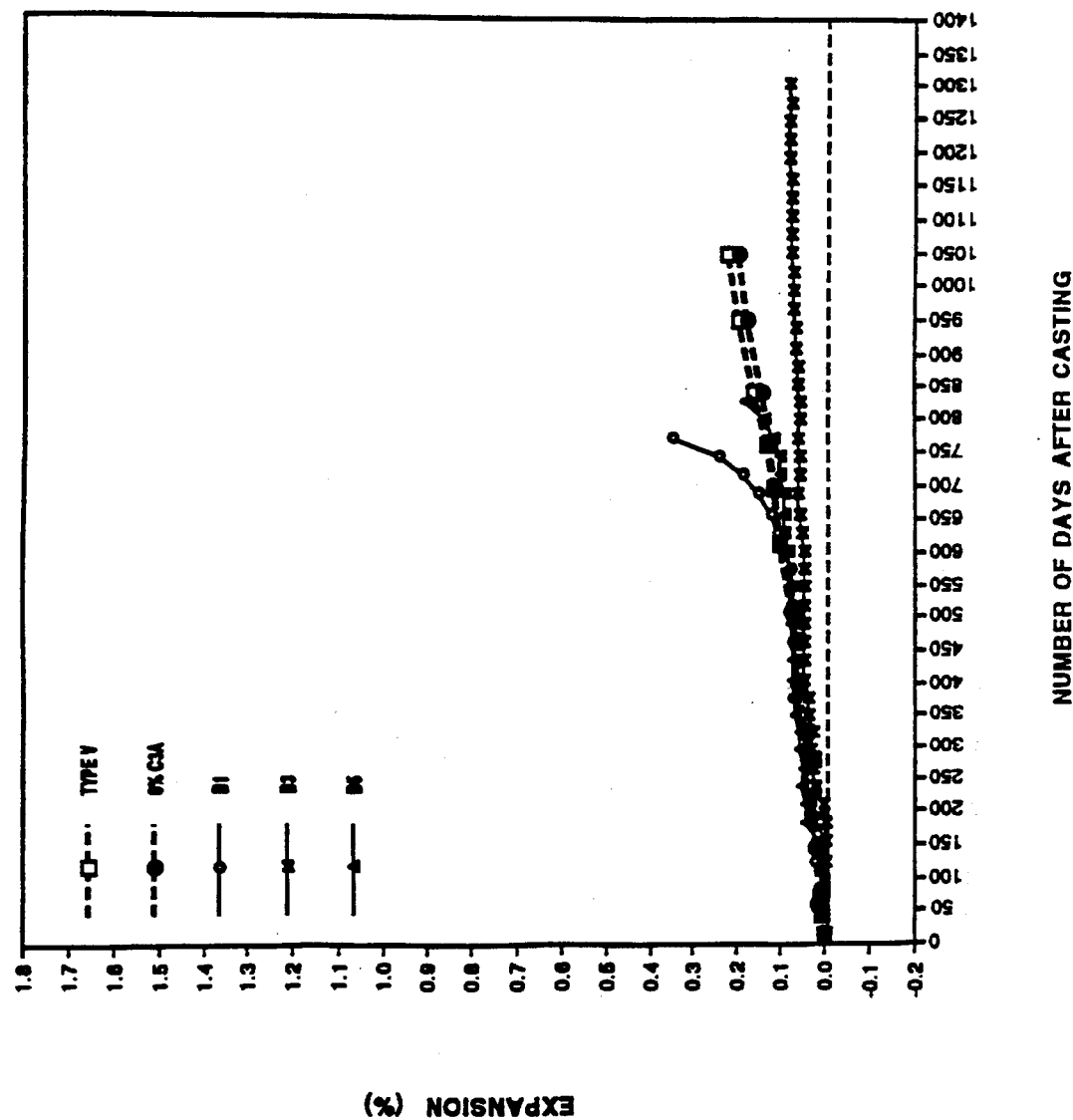

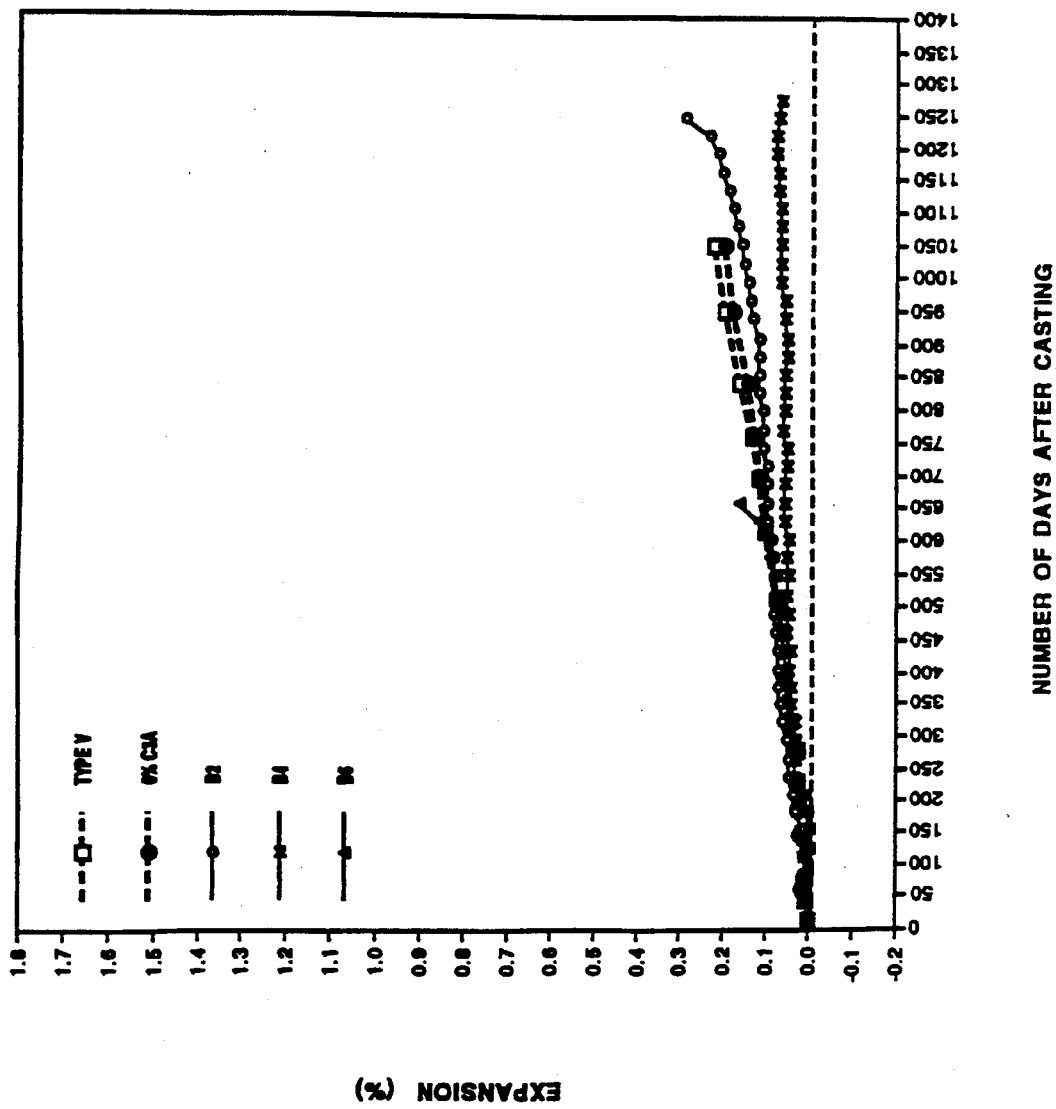

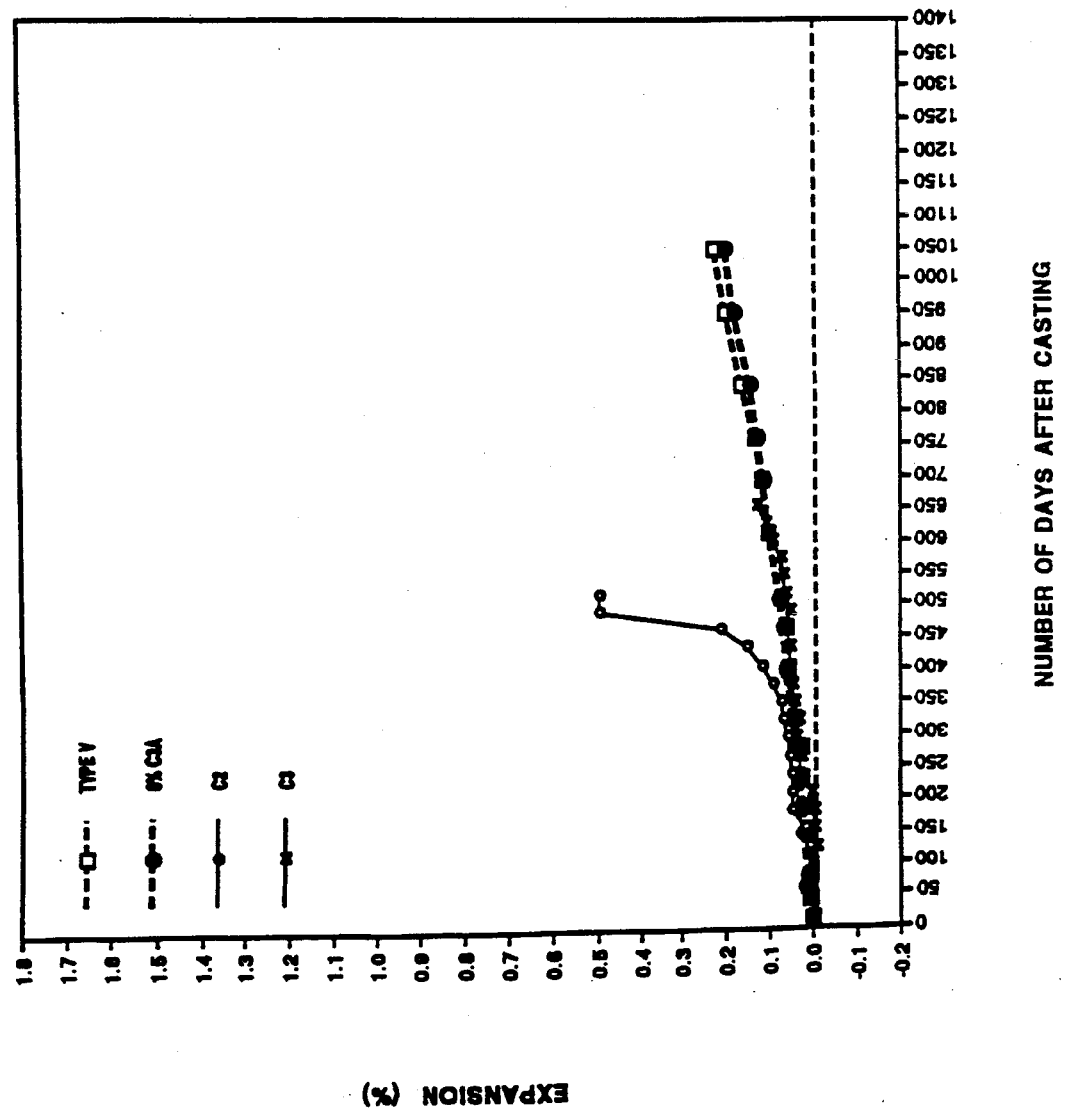

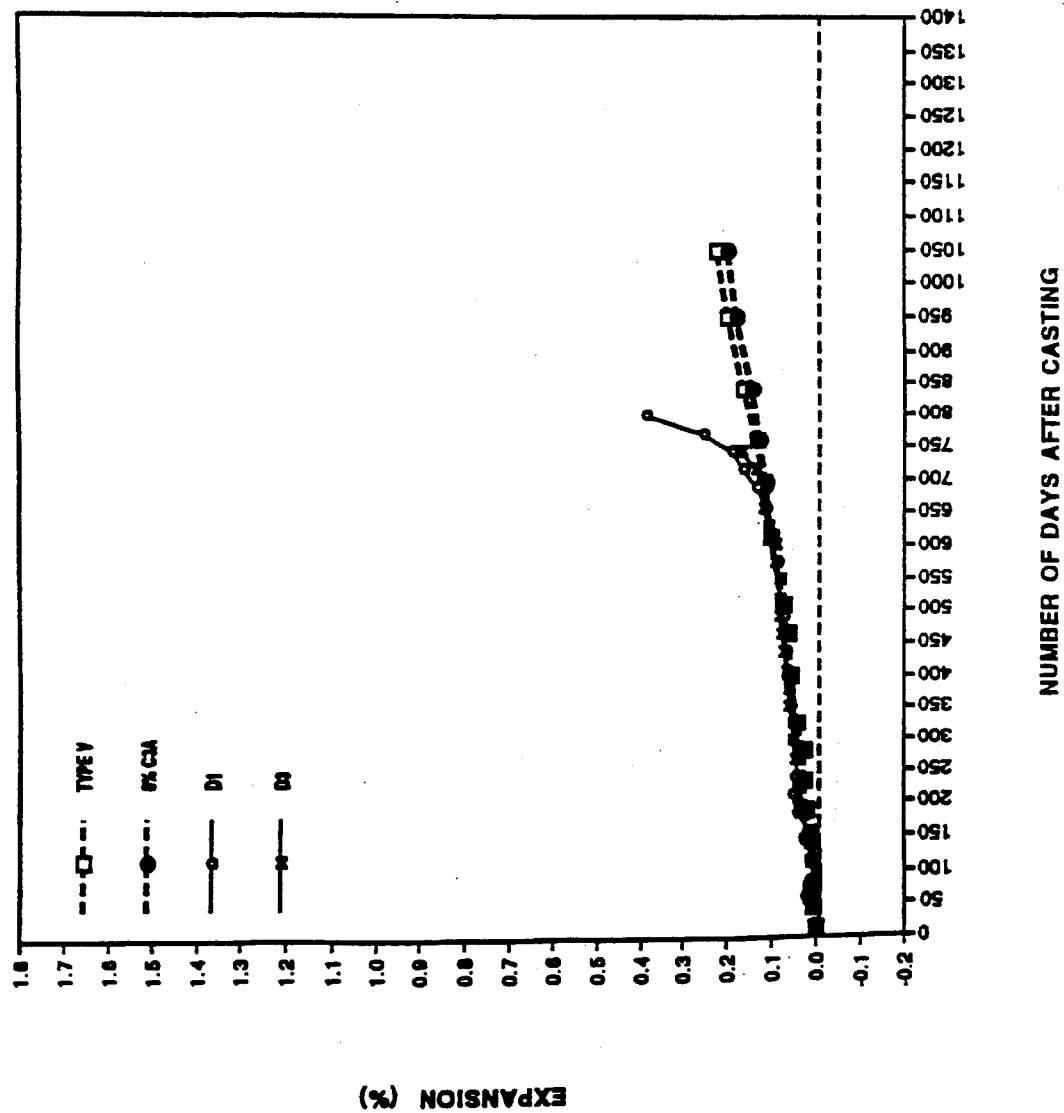
FIG 44 COMPARISON OF SULFATE PERFORMANCE 91-DAY

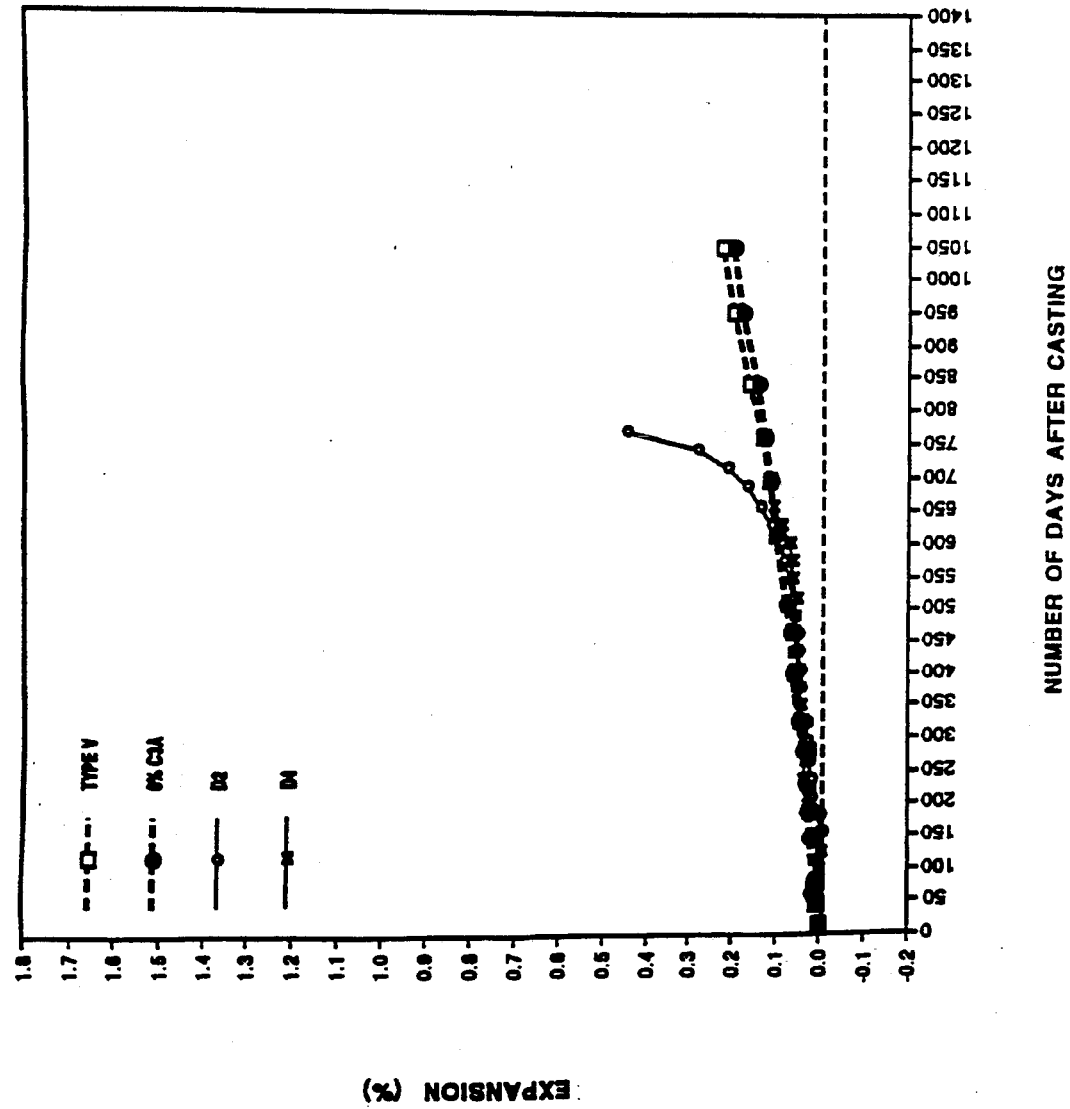

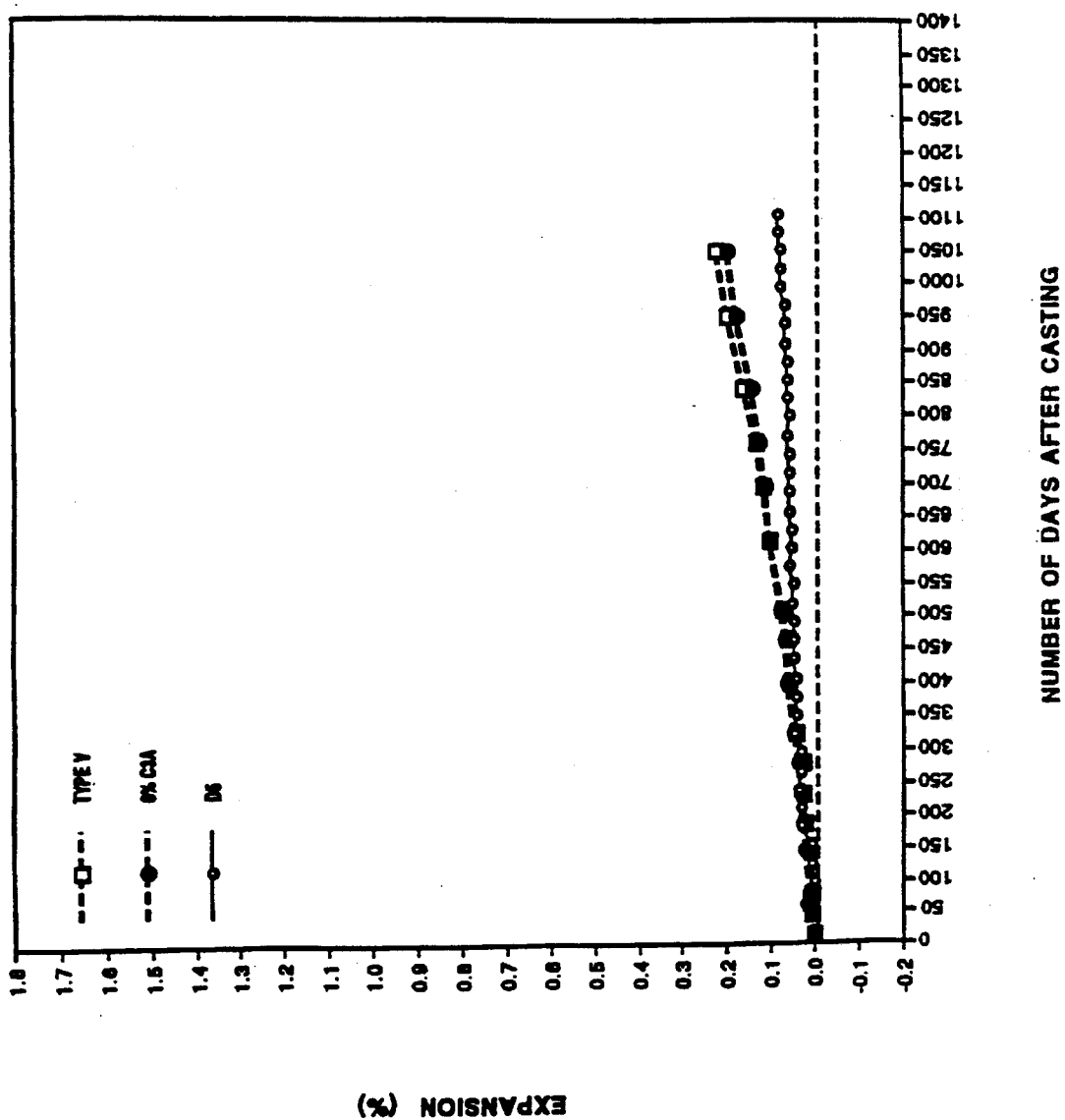

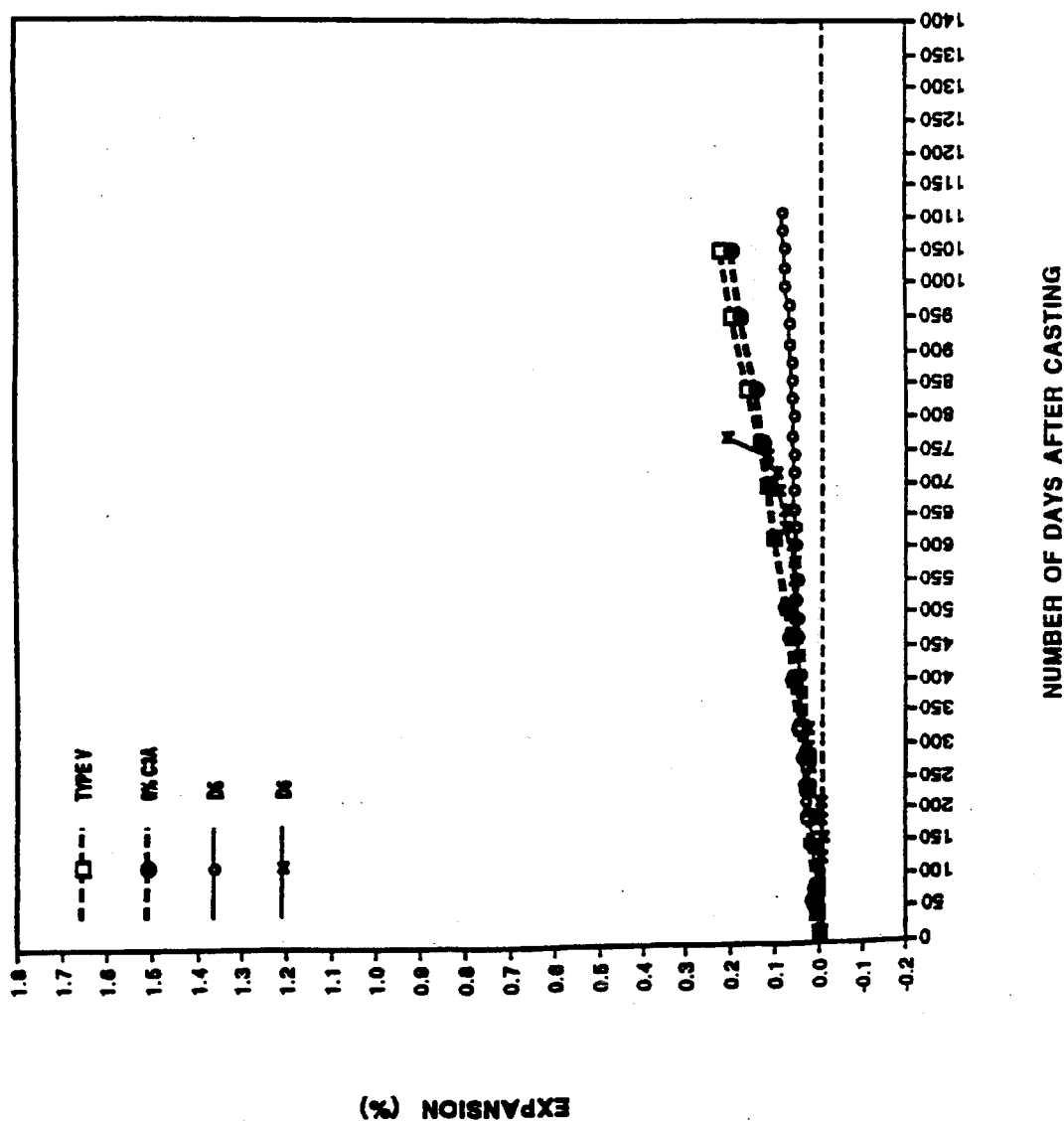

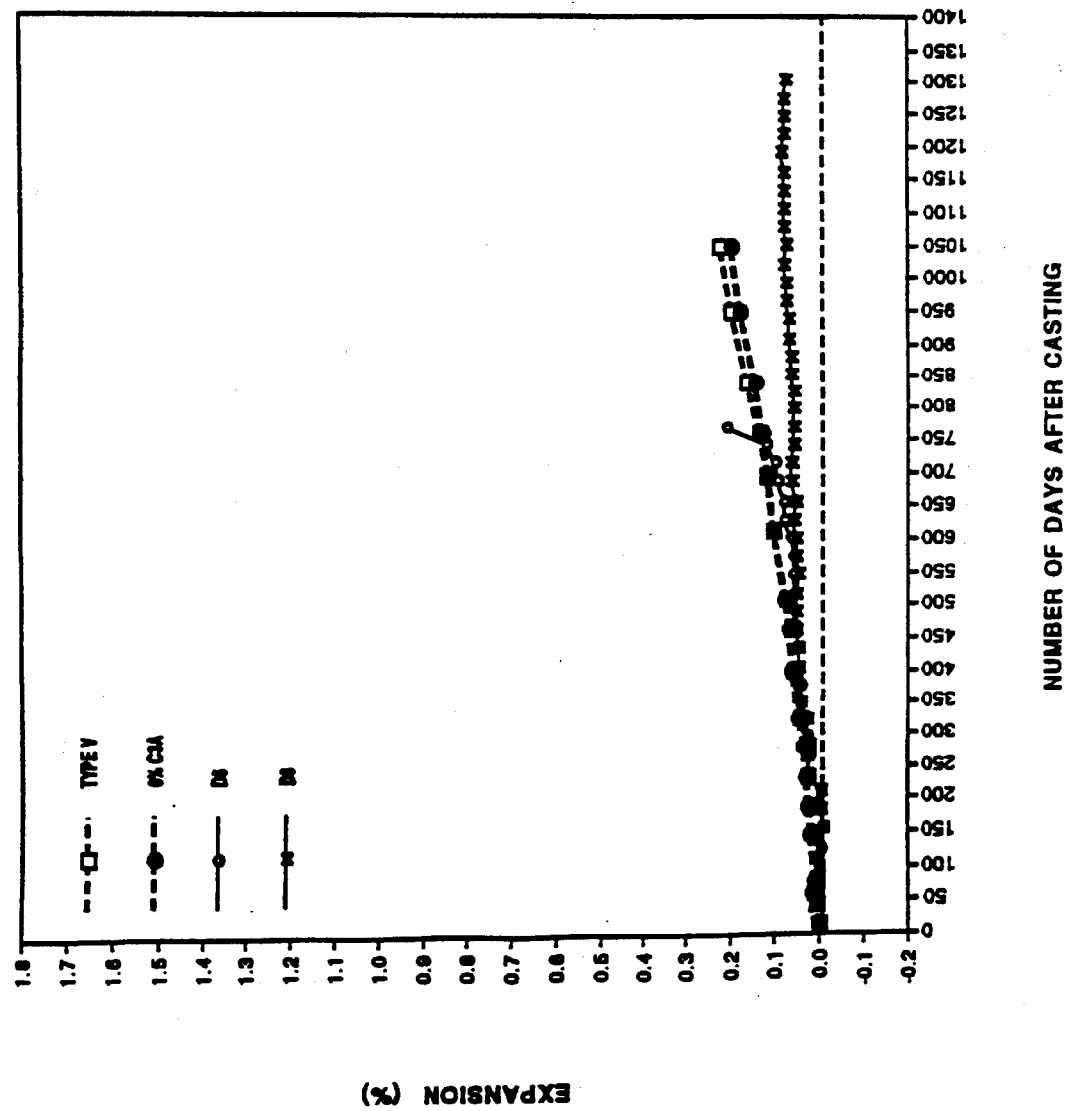

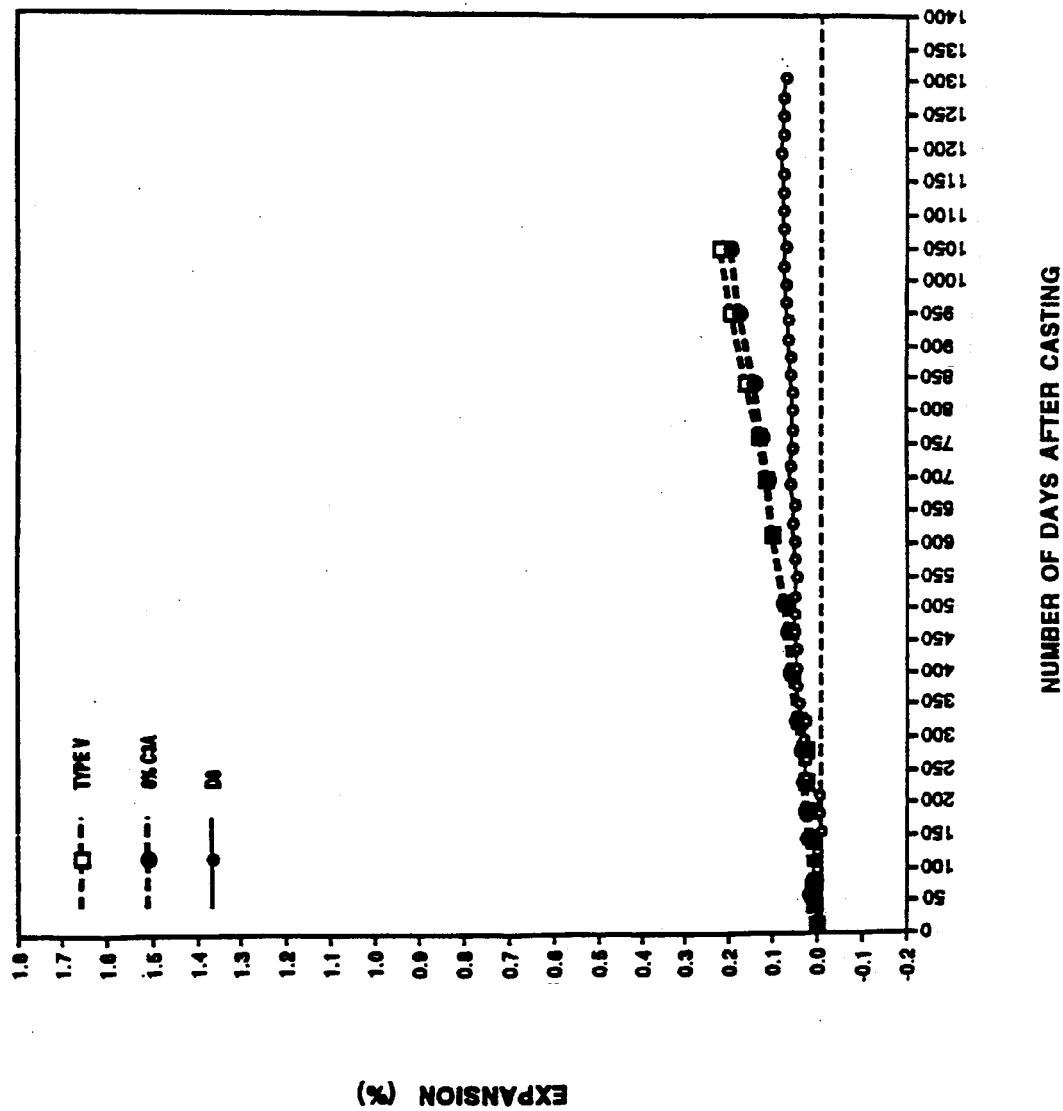

CONCRETES CONTAINING CLASS C FLY ASH THAT ARE STABLE IN SULPHATE ENVIRONMENTS

This is a division of application Ser. No. 08/195,268 filed Feb. 14, 1994.

BACKGROUND OF THE INVENTION

1. Field of the Invention

The invention relates to the use of a coal combustion product, fly ash, as an additive in concretes. More particularly, the invention provides methods of treating Class C fly ash, and concrete mixtures containing Class C fly ash, to prevent the formation, in sulfate ion-containing environments, of volume-expanding compositions within the hardened concrete that cause stress failure of the concrete.

2. Description of the Related Art

Fly ash is a combustion product produced when coal is burned in power plants. The large quantity of fly ash produced nationally poses a disposal problem. All fly ash, however, is not the same. The chemistry of the fly ash is dependent upon the nature of the coal from which it is obtained. Thus, ASTMC618 (incorporated by reference) defines two classes of fly ash: Classes C and F. Class F is obtained by burning anthracite or bituminous coal while Class C is the combustion product of sub-bituminous coal or lignite. Class C fly ash often contains significant amounts of calcium mineral matter, while Class F rarely does. Thus, Class C fly ash has cementitious and pozzolanic properties while Class F is rarely cementitious when mixed with water alone. "Use of Fly Ash in Concrete," Reported by American Concrete Institute Committee 226 (1987) (hereby fully incorporated by reference).

The Class C fly ashes contain calcium aluminate compounds, calcium hydroxide, and/or iron oxides. Any of these three components may lead to expansion and cracking of hardened concrete made from a Class C fly ash-cement mix when it is exposed to a sulfate environment.

The art, while speaking to certain mixtures of "fly ash" with cements, does not address the problem of concrete failure when a Class C fly ash-containing concrete is exposed to a sulfate ion-containing environment. For example, German Offenlegungsschrift 28 01 687 (German '687) contains an English language abstract which discloses a "binder" that contains a "high percentage of fly ash" that is used to make high strength concrete or concrete moldings. The binder contains 72–82 wt. % fly ash, 16–24 wt. % hydraulic binder, and 2–4 wt. % gypsum. The preferred hydraulic binder is clinker, cement, or hydraulic lime. The mixture may further contain 4–6 wt. % silica sand. In the process, the fly ash, hydraulic binder, and gypsum are milled together to a certain fineness. It is preferred that the fly ash and sand are first milled to a certain fineness and thereafter milled with the cement and gypsum. There is no discussion of the sulfate resistance of the concrete obtained from this "binder" containing fly ash.

Likewise, British patent 940,692 (British '692) discloses that clinker may be simultaneously crushed in its crude or semi-crude state with fly ash. Page 2, lines 32–34. It also discloses first crushing clinker alone and subsequently mixing it with the fly ash in a final stage of crushing the ash and clinker together. Uncrushed ash will not produce an effective cement. Page 2, lines 35–39. Granulated blast furnace slag may be used in certain of the blends. British '692 indicates that in its cements, the proportion of fly ash ranges from 20 to 30 wt. % and the proportion of portland cement or clinker and optimal granulated slag present in the cement is from 70 to 80 wt. %. In the examples, specifically Examples 2 and 11, the compositions include clinker, fly ash, and gypsum in the following proportions:

| Example 2 | |
|---|---|
| Clinker | 25% |
| Fly ash | 73% |
| $CaSO_4$ | 1% |
| $Na_2SO_4$ | 1% |
| Example 11 | |
| Clinker | 30 parts |
| Fly ash | 70 parts |
| Gypsum | 5 parts |

Kovach, *The Use of Thermal Power Station Pulverized Fuel Ash in the Manufacture of Cement in Hungary*, (Ankara, Turkey Symposium, Nov. 1970), indicates that grinding increases the reactivity of fly ash and the strengths of cement containing the ground ash. See pg. 4. However, Kovach also indicates that the additional of fly ash improves the sulfate resistance of the cement. Testing indicated that the strength of cement containing 30% fly ash was from 5 to 20% higher than that of the referenced cement without fly ash. See pg. 8. In certain tests, gypsum was added to the fly ash and cement so as to give a 7% sulfate content in the cement. The expansion of the gypsum-containing fly ash and cement mixtures was less than for the cement-fly ash mixtures without gypsum, when measured at ages 28 days, 90 days, and one year. See pg. 8. Kovach concludes that the expansion of fly ash-containing cements slows down or ceases after some time, while that of control cements increases until the specimens are totally destroyed. In light of this, Kovach concludes that fly ash-containing cements surpass ordinary portland cements with respect to sulfate resistance. However, he found that the addition of gypsum to fly ash-containing cements reduced the volume expansion of specimens.

Davis, et al., *Properties of Cements and Concretes Containing Fly Ash*, Proceedings of the American Concrete Institute (Feb. 1937), Vol. 33, Journal of the American Concrete Inst., indicate that fly ash and portland cement may be mixed by intergrinding. See pgs. 580–81, 597–98. Further, Davis suggests that whereas concretes typically undergo shrinkage, fly ash-containing concrete exhibit a "fairly low shrinkage" and shrink less than corresponding concrete without any fly ash. See pgs. 603–04. With respect to resistance to sodium sulfate, Davis indicates that only two fly ash-cement specimens tested were not equal in resistance to corresponding fly ash-free portland cement concretes. There is no indication that the fly ash used was of the Class C type.

U.S. Pat. No. 3,782,985 uses "cenospheres"—small hollow spheres of fly ash—to make light weight concrete by admixing with portland cement. The resultant concretes are not only light weight but also have high strength, although the cenospheres are mixed into cement in the ratio of 0.2 to 4 parts fly ash to 1 part cement, by volume. There is no indication that the concretes lack sulfate resistance.

U.S. Pat. No. 3,565,648 to Mori, et al., shows the grinding of fly ash with gypsum, in a hydraulic slurry. The ground slurry is then added to a cement mixture in a certain proportion to prepare concretes. During the grinding of fly ash with gypsum, in the presence of water, alumina from the fly ash reacts with calcium sulfate and water to form a hydrate of calcium sulfoaluminate. Col. 1, ln. 66-Col. 2, ln. 7. Thus, the process of Mori requires inter-grinding of fly ash with gypsum in the presence of water.

European patent application 007 872 A1 shows a hydraulic dry concrete mixture containing cement, fly ash, and an accelerator. The accelerator is disclosed as being selected from slaked lime, gypsum, or activated silica. The mixture is said to exhibit improved setting characteristics and produce concretes with high mechanical strength. The mixture includes 40–70 parts portland cement, 20–50 parts fly ash, and 0–15 parts of the accelerator.

U.S. Pat. No. 4,240,952 to Hulbert, et al., discloses a concrete composition including gypsum, portland cement, and an aggregate containing fly ash. While noting that it had been proposed to substitute fly ash for certain proportions of portland cement, the '952 patent indicates that portland cement generally contains 2 wt. % of gypsum, added as a retarder. The chemical reactions during setting of concrete results in the formation of four important chemicals: tricalcium aluminate which hydrates rapidly producing heat and causing initial stiffening of the concrete; tricalcium silicate which jellifies within a few hours and has an effect on the strength of concrete mainly in the first 14 days; dicalcium silicate which forms slowly and which is mainly responsible for progressive increase in strength which occurs from 14 to 28 days and beyond; and tetracalcium alumino-ferrite which has no effect on the strength and other properties of the hardened cement.

While it is noted that commercial portland cement normally contains about 2 wt. % of gypsum, in the '952 composition, an additional amount of gypsum is added to act as a retarder by forming a sulfo-aluminate layer around particles of portland cement and fly ash. This layer slows down the dissolution of alumina and lime and thus inhibits hydration. While it is asserted to be within the scope of the invention to replace all of the portland cement with fly ash, the invention includes 20 percent by weight of portland cement in the cementitious material in order to form a mix that resembles portland cement mixes.

U.S. Pat. No. 4,715,896 to Berry discloses a water-hardenable cementitious binder composition that includes finely divided blast furnace slag, Class C fly ash, and an alkaline activator that increases the pH of the composition above about 11 in the presence of water. It is disclosed that the alkaline activator may be any alkaline metal or alkaline earth metal hydroxide, compatible with the other ingredients of the composition, that will elevate the pH of the composition in the presence of water. It is admitted that the nature of the cementitious reaction which takes place between the slag material and fly ash in the presence of the activator is not fully understood. However, it is asserted that elevation of pH is required. See Col. 2, lns 36–54. Significantly, however, the composition of the '896 patent includes blast furnace slag and does not include portland cement.

U.S. Pat. No. 4,756,761, to Philip, et al., discloses cementitious products including fly ash that require the addition of water and an alkaline material, preferably lime, to activate the cementitious composition. It further discloses that a sulfate anion can be added as either gypsum, or sodium sulfate, or another. The patent appears to encourage the formation of ettringite-like structures in order to obtain sufficient strength and stability in the final cementitious product. Col. 4, lns 66-Col. 5, ln. 2.

There yet exists a need for a method for disposing of the large quantities of Class C fly ash that are generated as a product of lignite and sub-bituminous coal combustion at power generating facilities. In order to allow use of this fly ash in concrete, methods must be found to overcome the stress cracking of hardened concretes containing Class C fly ash when they are exposed to a sulfate environment.

SUMMARY OF THE INVENTION

The invention provides methods of treating Class C fly ash and methods of blending the Class C fly ash into portland cement to produce concretes that do not undergo stress cracking when exposed to sulfate-containing environments.

In one aspect of the invention, the Class C fly ash is interground with other compositions. Thus, in a preferred method, Class C fly ash is ground with portland cement clinker, and gypsum in certain proportions in a mill to provide a sulfate-resistant cement blend, like the Type IP (normal sulfate-resistant) and Type IIP (medium sulfate resistant) cements. In another preferred embodiment, the invention also provides a method of using Class C fly ash by first inter-grinding a mixture of portland cement clinker and gypsum. The ground mixture is then mixed with fly ash, in certain proportions, to produce a cement product that can be used for making concrete that is sulfate resistant.

In another aspect of the invention, treatment of the Class C fly ash takes place during mixing with cement to make concrete. In one preferred method, sulfate ions added to mixing water is combined with a cement-fly ash mixture and suitable aggregate to make a concrete that is stable when exposed to an environment containing sulfate ions. In another preferred method, an alkaline-based additive is added to mixing water for the concrete containing the fly ash-cement mixture. As a result of adding the alkaline-based additive, it is theorized without being bound, that the reactivity of fly ash is increased at the early stages of a concrete hardening, so that a sulfate resistant concrete is produced.

Without being bound, it is theorized that tricalcium aluminate in Class C fly ash combines with sulfates from gypsum, or as added through solution in mixing water, to produce ettringite resulting in volume expansion within an already hardened concrete. This results in stress cracking of the concrete. Further, calcium hydroxide, also found in certain Class C fly ashes, combines with sulfates to form gypsum, which initiates a series of expansion reactions also leading to cracking of the concrete. Finally, iron oxides, found in certain Class C fly ashes, also react with sulfates to form ettringite-like crystals with attendant volume expansion and internal stresses that cause cracking of hardened concrete.

Under certain circumstances, the methods of the invention, when applied to cement Type I, Class C fly ash mixtures produce a sulfate-resistant concrete, even though Type I cement concrete is not regarded as sulfate-resistant.

The methods of the invention avoid the production of the volume-expanding compositions in the hardened concrete so that internal stresses caused by their expansion are avoided. As a result, waste product Class C fly ash can now be used to make sulfate resistant concrete-a useful product.

BRIEF DESCRIPTION OF THE DRAWINGS

A better understanding of the present invention can be obtained when the following detailed description of the preferred embodiment is considered in conjunction with the following drawings, in which:

FIG. 1 is a comparison of sulphate performance for 14-day moist cure samples.

FIG. 2 is a comparison of sulphate performance for 14-day. day moist cure samples.

FIG. 3 is a comparison of sulphate performance for 14-day moist cure samples.

FIG. 4 is a comparison of sulphate performance for 14-day moist cure samples.

FIG. 5 is a comparison of sulphate performance for 14-day moist cure samples.

FIG. 6 is a comparison of sulphate performance for 14-day moist cure samples.

FIG. 7 is a comparison of sulphate performance for 14-day moist cure samples.

FIG. 8 is a comparison of sulphate performance for 14-day moist cure samples.

FIG. 9 is a comparison of sulphate performance for 14-day moist cure samples.

FIG. 10 is a comparison of sulphate performance for 14-day moist cure samples.

FIG. 11 is a comparison of sulphate performance for 14-day moist cure samples.

FIG. 12 is a comparison of sulphate performance for 14-day moist cure samples.

FIG. 13 is a comparison of sulphate performance for samples having a 91-day moist cure as compared to Type II cement concretes.

FIG. 14 is a comparison of sulphate performance for samples having a 91-day moist cure as compared to Type II cement concretes.

FIG. 15 is a comparison of sulphate performance for samples having a 91-day moist cure as compared to Type II cement concretes.

FIG. 16 is a comparison of sulphate performance for samples having a 91-day moist cure as compared to Type II cement concretes.

FIG. 17 is a comparison of sulphate performance for samples having a 91-day moist cure as compared to Type II cement concretes.

FIG. 18 is a comparison of sulphate performance for samples having a 91-day moist cure as compared to Type II cement concretes.

FIG. 19 is a comparison of sulphate performance for samples having a 91-day moist cure as compared to Type II cement concretes.

FIG. 20 is a comparison of sulphate performance for samples having a 91-day moist cure as compared to Type II cement concretes.

FIG. 21 is a comparison of sulphate performance for samples having a 91-day moist cure as compared to Type II cement concretes.

FIG. 22 is a comparison of sulphate performance for samples having a 91-day moist cure as compared to Type II cement concretes.

FIG. 23 is a comparison of sulphate performance for samples having a 91-day moist cure as compared to Type II cement concretes.

FIG. 24 is a comparison of sulphate performance for samples having a 91-day moist cure as compared to Type II cement concretes.

FIG. 25 is a comparison of sulphate performance for 14-day moist cure samples with respect to Type V and 0% tricalcium aluminate cement concretes.

FIG. 26 is a comparison of sulphate performance for 14-day moist cure samples with respect to Type V and 0% tricalcium aluminate cement concretes.

FIG. 27 is a comparison of sulphate performance for 14-day moist cure samples with respect to Type V and 0% tricalcium aluminate cement concretes.

FIG. 28 is a comparison of sulphate performance for 14-day moist cure samples with respect to Type V and 0% tricalcium aluminate cement concretes.

FIG. 29 is a comparison of sulphate performance for 14-day moist cure samples with respect to Type V and 0% tricalcium aluminate cement concretes.

FIG. 30 is a comparison of sulphate performance for 14-day moist cure samples with respect to Type V and 0% tricalcium aluminate cement concretes.

FIG. 31 is a comparison of sulphate performance for 14-day moist cure samples with respect to Type V and 0% tricalcium aluminate cement concretes.

FIG. 32 is a comparison of sulphate performance for 14-day moist cure samples with respect to Type V and 0% tricalcium aluminate cement concretes.

FIG. 33 is a comparison of sulphate performance for 14-day moist cure samples with respect to Type V and 0% tricalcium aluminate cement concretes.

FIG. 34 is a comparison of sulphate performance for 14-day moist cure samples with respect to Type V and 0% tricalcium aluminate cement concretes.

FIG. 35 is a comparison of sulphate performance for 14-day moist cure samples with respect to Type V and 0% tricalcium aluminate cement concretes.

FIG. 36 is a comparison of sulphate performance for 14-day moist cure samples with respect to Type V and 0% tricalcium aluminate cement concretes.

FIG. 37 is a comparison of sulphate performance for 14-day moist cure samples with respect to Type V and 0% tricalcium aluminate cement concretes.

FIG. 38 is a comparison of sulphate performance for 91-day moist cure samples with respect to Type V and 0% tricalcium aluminate cement concretes.

FIG. 39 is a comparison of sulphate performance for 91-day moist cure samples with respect to Type V and 0% tricalcium aluminate cement concretes.

FIG. 40 is a comparison of sulphate performance for 91-day moist cure samples with respect to Type V and 0% tricalcium aluminate cement concretes.

FIG. 41 is a comparison of sulphate performance for 91-day moist cure samples with respect to Type V and 0% tricalcium aluminate cement concretes.

FIG. 42 is a comparison of sulphate performance for 91-day moist cure samples with respect to Type V and 0% tricalcium aluminate cement concretes.

FIG. 43 is a comparison of sulphate performance for 91-day moist cure samples with respect to Type V and 0% tricalcium aluminate cement concretes.

FIG. 44 is a comparison of sulphate performance for 91-day moist cure samples with respect to Type V and 0% tricalcium aluminate cement concretes.

FIG. 45 is a comparison of sulphate performance for 91-day moist cure samples with respect to Type V and 0% tricalcium aluminate cement concretes.

FIG. 46 is a comparison of sulphate performance for 91-day moist cure samples with respect to Type V and 0% tricalcium aluminate cement concretes.

FIG. 47 is a comparison of sulphate performance for 91-day moist cure samples with respect to Type V and 0% tricalcium aluminate cement concretes.

FIG. 48 is a comparison of sulphate performance for 91-day moist cure samples with respect to Type V and 0% tricalcium aluminate cement concretes.

FIG. 49 is a comparison of sulphate performance for 91-day moist cure samples with respect to Type V and 0% tricalcium aluminate cement concretes.

DETAILED DESCRIPTION OF THE PREFERRED EMBODIMENTS

The invention provides methods of using Class C fly ash as an additive in concretes so that the concretes may be used in sulfate ion containing environments without subsequent failure. Class C fly ashes contain calcium aluminate compounds (such as tricalcium aluminate), calcium hydroxide, or iron oxides, or combinations of these. It is theorized that concretes containing cement in combination with Class C fly ash, when placed in a sulfate-containing environment, fail by cracking due to the formation of ettringite when tricalcium aluminate combines with sulfates in the already hardened concrete. Also, any calcium hydroxide present in the hardened concrete will combine with sulfates to form gypsum, thereby initiating a series of expansion reactions ultimately leading to cracking of the concrete. Finally, any iron oxide present in the hardened concrete will also react with sulfates to form ettringite-like crystals with volume expansion resulting in internal stresses in the concrete that lead to concrete failure.

In a preferred embodiment according to the invention, a Class C fly ash is interground with portland cement clinker and gypsum to produce a cementitious mixture. When this cementitious mixture is used to produce a hardened concrete, and the concrete is exposed to a sulfate environment, the hardened concrete is substantially free of the formation of volume-expanding compositions, such as ettringite, that cause concrete failure. As a result, the concrete is stable.

Preferably, the intergrinding of the Class C fly ash with portland cement clinker and gypsum is carried out by the process of dry milling. Also preferably, from about 25 to about 70 wt. % fly ash is interground with from about 70 to about 25 wt. % portland cement clinker, and from about 5 to about 10 wt. % gypsum; all based on the total weight of fly ash, cement, and gypsum, to produce the cementitious mixture that may be used to make a concrete that is stable in a sulfate environment.

In an alternative preferred embodiment of the invention that requires intergrinding, portland cement clinker is dry milled with gypsum, according to the above ratios, to produce a gypsum-containing cement. This cement is then admixed with a proportion of Class C fly ash, according to the above ratios, to produce a cementitious mixture. This cementitious mixture, in combination with water and an aggregate, produces a hardened concrete that has improved resistance to sulfate environments. The concrete is free of the formation of such quantities of volume-expanding compositions that would ordinarily result in concrete failure.

In other preferred embodiments according to the invention, an intergrinding step is not required. Instead, chemical modifications are applied at the concrete mixing stage in order to produce a concrete that is stable in a sulfate environment and that contains significant proportions of Class C fly ash. One of these methods according to the invention requires the admixing of a cementitious product including portland cement and Class C fly ash, with an aggregate and water wherein is dissolved a chemical that is a source of sulfate or hydroxyl anions. Preferably, from about 75 to about 65 wt. % portland cement and from about 25 to about 35 wt. % fly ash is combined with appropriate proportions of aggregate and water. Preferably, the concentration of sulfate ions in the water ranges from about 1 wt. % to about 2.5 wt. %. Preferably, sodium sulfate is used as a source of sulfate anions. When hydroxyl anions are used, sulfate (gypsum) interground cement blends are mixed with Class C fly ash and the hydroxyl anion content of the mixing water for concrete is preferably from about 1.5 to about 3.5 wt. %.

The following examples serve to illustrate the invention and do not limit the scope of the invention as described above and as claimed herebelow.

EXAMPLES

Cements containing Class C fly ash were prepared and compared with standard Type II, Type V, and 0% tricalcium aluminate cements. The tests were generally conducted by first preparing sample concretes containing each of the foregoing cements with suitable aggregates and then subjecting the samples to a sulfate environment after 14 days of moist cure, or 91 days of moist cure, representing the time delay between the typical preparation of a concrete structure and its subsequent disposition in the sulfate environment.

The Class C fly ash utilized was W. A. Parish Fly Ash supplied by that power generating facility of Houston Lighting & Power Co.; the aggregate was a Georgetown crushed limestone that is not susceptible to alkali-silica reaction; and the fine aggregate used was Colorado River sand. The fly ash met the ASTM C618-87 Class C fly ash requirements and analyzed as follows:

TABLE 1

| FLY ASH CHEMICAL, PHYSICAL, AND MINERALOGICAL ANALYSIS | | | |
|---|---|---|---|
| Compound | Percent | Mineral | Percent |
| SiO2 | 34.4 | Quartz | 4.0 |
| Al2O3 | 18.7 | Mullite | 3.1 |
| Fe2O3 | 5.6 | Spinel | 1.6 |
| Sum of oxides | 58.7 | Hematite | — |
| CaO | 27.3 | Lime | 0.6 |
| MgO | 5.9 | Periclase | 1.2 |
| SO3 | 1.86 | Anhydrite | 0.8 |
| Na2O | 1.94 | Melilite | 1.7 |
| K2O | 0.40 | Tricalcium Aluminate | 1.5 |
| LOI | 0.32 | Merwinite | 2.6 |
| M.C. | 0.32 | Sum of crystalline phases | 17.0 |
| Physical Analysis: | | | |
| Retained #325 sieve | | 14.3% | |
| Pozzolanic activity | | 92 | |
| Specific Gravity | | 2.68 | |
| Water requirement | | 90% | |
| Autoclave expansion | | 0.01% | |

In order to prepare concrete samples for testing, the following mixes were prepared:

TABLE 2

MIX DESIGN PROPORTIONS

| Mix No. | Cement Type | Stone | Sand | Water | Cement | Fly Ash | $Na_2SO_4$ | NaOH |
|---|---|---|---|---|---|---|---|---|
| A-1 | II | 116 | 120 | 18.33 | 38.30 | * | — | — |
| A-2 | II | 116 | 120 | 18.33 | 38.30 | * | — | — |
| A-3 | II | 116 | 120 | 18.33 | 38.30 | * | — | — |
| A-4 | II | 116 | 120 | 18.33 | 38.30 | * | — | — |
| A-5 | II | 116 | 120 | 18.33 | 38.30 | * | — | — |
| A-6 | II | 116 | 120 | 18.33 | 38.30 | * | — | — |
| A-7 | II | 116 | 120 | 18.33 | 38.30 | * | — | — |
| A-8 | II | 116 | 120 | 18.33 | 38.30 | * | — | — |
| A-9 | II | 116 | 120 | 18.33 | 38.30 | * | — | — |
| A-10 | I | 116 | 120 | 18.33 | 38.30 | * | — | — |
| A-11 | I | 116 | 120 | 18.33 | 38.30 | * | — | — |
| A-12 | I | 116 | 120 | 18.33 | 38.30 | * | — | — |
| A-13 | I | 116 | 120 | 18.33 | 38.30 | * | — | — |
| A-14 | I | 116 | 120 | 18.33 | 38.30 | * | — | — |
| A-15 | I | 116 | 120 | 18.33 | 38.30 | * | — | — |
| A-16 | I | 116 | 120 | 18.33 | 38.30 | * | — | — |
| B-1 | II | 116 | 120 | 18.33 | 28.72 | 9.58 | 0.304 | — |
| B-2 | II | 116 | 120 | 18.33 | 24.90 | 13.40 | 0.425 | — |
| B-3 | II | 116 | 120 | 18.33 | 28.72 | 9.58 | 0.923 | — |
| B-4 | II | 116 | 120 | 18.33 | 24.90 | 13.40 | 1.291 | — |
| B-5 | II | 116 | 120 | 18.33 | 28.72 | 9.58 | 1.593 | — |
| B-6 | II | 116 | 120 | 18.33 | 24.90 | 13.40 | 2.228 | — |
| B-7 | I | 116 | 120 | 18.33 | 28.72 | 9.58 | 0.304 | — |
| B-8 | I | 116 | 120 | 18.33 | 24.90 | 13.40 | 0.425 | — |
| B-9 | I | 116 | 120 | 18.33 | 28.72 | 9.58 | 0.923 | — |
| B-10 | I | 116 | 120 | 18.33 | 24.90 | 13.40 | 1.291 | — |
| B-11 | I | 116 | 120 | 18.33 | 28.72 | 9.58 | 1.593 | — |
| B-12 | I | 116 | 120 | 18.33 | 24.90 | 13.40 | 2.228 | — |
| C-1 | II | 116 | 120 | 18.33 | 38.30 | 0.00 | — | — |
| C-2 | II | 116 | 120 | 18.33 | 28.72 | 9.58 | — | — |
| C-3 | II | 116 | 120 | 18.33 | 24.90 | 13.40 | — | — |
| C-4 | I | 116 | 120 | 18.33 | 38.30 | 0.00 | — | — |
| C-5 | I | 116 | 120 | 18.33 | 28.72 | 9.58 | — | — |
| C-6 | I | 116 | 120 | 18.33 | 24.90 | 13.40 | — | — |
| D-1 | II | 116 | 120 | 18.33 | 28.73 | 9.58 | — | 0.147 |
| D-2 | II | 116 | 120 | 18.33 | 28.72 | 9.58 | — | 0.239 |
| D-3 | II | 116 | 120 | 18.33 | 24.90 | 13.40 | — | 0.147 |
| D-4 | II | 116 | 120 | 18.33 | 24.90 | 13.40 | — | 0.293 |
| D-5 | II | 116 | 120 | 18.33 | 38.30 | * | — | 0.147 |
| D-6 | II | 116 | 120 | 18.33 | 38.30 | * | — | 0.293 |
| D-7 | II | 116 | 120 | 18.33 | 38.30 | * | — | 0.147 |
| D-8 | II | 116 | 120 | 18.33 | 38.30 | * | — | 0.293 |

*interground with fly ash as shown in Tables 3, 4.

Mix nos. A-1 through A-16 and D5-D8 were obtained by inter-grinding cement and fly ash. The proportion of fly ash and cement was as follows:

TABLE 3

INTER-GROUND CEMENT BLENDS

| Mix No. | Type | Clinker Wt. | Cement Gypsum | Anhydrite | Fly Ash % | Wt. | Gypsum |
|---|---|---|---|---|---|---|---|
| A-1 | II | 52.5 | 2.7 | | 25 | 17.5 | 0.0 |
| A-2 | II | 52.5 | 2.7 | | 25 | 17.5 | 0.7 |
| A-3 | II | 52.5 | 2.7 | | 25 | 17.5 | 2.0 |
| A-4 | II | 52.5 | 2.7 | | 25 | 17.5 | 3.4 |
| A-5 | II | 45.5 | 2.3 | | 35 | 24.5 | 0.0 |
| A-6 | II | 45.5 | 2.3 | | 35 | 24.5 | 0.9 |
| A-7 | II | 45.5 | 2.3 | | 35 | 24.5 | 2.9 |
| A-8 | II | 45.5 | 2.3 | | 35 | 24.5 | 4.8 |
| A-9 | II | 35.0 | 1.8 | | 50 | 35.0 | 6.9 |
| D-5 | II | 45.5 | 2.3 | | 35 | 24.5 | 0.0 |
| D-6,7,8 | II | 45.5 | 2.3 | | 35 | 24.5 | 2.9 |
| A-10 | I | 52.5 | 1.8 | 0.8 | 25 | 17.5 | 0.0 |
| A-11 | I | 52.5 | 1.8 | 0.8 | 25 | 17.5 | 3.4 |
| A-12 | I | 45.5 | 1.6 | 0.7 | 35 | 24.5 | 0.0 |
| A-13 | I | 45.5 | 1.6 | 0.7 | 35 | 24.5 | 4.8 |
| A-14 | I | 35.0 | 1.2 | 0.5 | 50 | 35.0 | 6.9 |
| A-15 | I | 28.0 | 1.0 | 0.4 | 60 | 42.0 | 8.3 |
| A-16 | I | 21.0 | 0.7 | 0.31 | 70 | 49.0 | 9.7 |

TABLE 4

| Mix No. | W.A. Parish Fly Ash Assumed Reactive Al2O3, % | Fly Ash:Cement |
|---|---|---|
| A-1 | 5 - no added gypsum | 25% fly ash:II |
| A-2 | 10.0 | 25% fly ash:II |
| A-3 | 20 | 25% fly ash:II |
| A-4 | 30 | 25% fly ash:II |
| A-5 | 5 - no added gypsum | 25% fly ash:II |
| A-6 | 10 | 35% fly ash:II |
| A-7 | 20 | 35% fly ash:II |
| A-8 | 30 | 35% fly ash:II |
| A-9 | 30 | 50% fly ash:II |
| D-5 | 5 - no added gypsum | 35% fly ash:II |
| D-6,7,8 | 20 | 35% fly ash:II |
| A-10 | 5 | 25% fly ash:I |
| A-11 | 30 | 25% fly ash:I |
| A-12 | 5 | 35% fly ash:I |
| A-13 | 30 | 35% fly ash:I |
| A-14 | 30 | 50% fly ash:I |
| A-15 | 30 | 60% fly ash:I |
| A-16 | 30 | 70% fly ash:I |

The mixes set forth in Table 2 were used to produce cylinders six inches long by three inches in diameter. For mixing batches B-1 through B-12, sodium sulfate solution was used to prepare the concrete instead of water. The concentration of sodium sulfate was estimated from the following equation:

$$2Ca_3Al_2O_6 + 6(CaSO_4 \cdot 2H_2O) + 5H_2O \rightarrow Ca_{12}Al_4(OH)_{24}(SO_4)_6 \cdot 5H_2O$$

($C_3A$)     (Gypsum)     (Ettringite)

Gypsum/C3A = (3*172)/270 = 1.9 weight ratio of gypsum/$C_3A$
Gypsum/$SO_3$ = 172/80 = 2.15 weight ratio of gypsum/$SO_3$
Anhydrite/$SO_3$ = 136/80 = 1.7 weight ratio of anhydrite/$SO_3$ The "sulfation point" is the point where a stoichiometric balance of sulfate is provided to react the $C_3A$ to ettringite completely. This reaction requires 1.9 times the amount of gypsum as tricalcium aluminate ($C_3A$) by weight.

W. A. Parish Class C fly ash contains approximately 1.5% $C_3A$ and 0.8 percent anhydrite, determined by x-ray diffraction (XRD) analysis. Therefore:

1.5 $C_3A$*1.9=2.85 % gypsum (sulfation point)

2.85 gypsum/2.15=1.33% $SO_3$ (sulfation point)

0.8% anhydrite/1.7=0.47% $SO_3$ 1.33−0.47=0.86 percent $SO_3$ required $Na_2SO_4/SO_3$=142/80=1.78 weight ratio of sodium sulfate/$SO_3$ 0.86*1.78=1.53% $NA_2SO_4$ required (sulfation point)
Using a 5.25 cu. ft. mix with 25 and 35 percent replacement by volume, according to Texas State Department of Highways and Public Transportation (TSDHPT) standard C-11:

$25\% \rightarrow 20.6 \text{lb fly ash} * 0.015 = 0.321 \text{lb Na}_2\text{SO}_4,$ $35\% \rightarrow 28.8 \text{lb fly ash} * 0.015 = 0.441 \text{lb Na}_2\text{SO}_4.$ The mix contains 48.1lb water (21.8 liters), therefore the molar concentrations (moles of $Na_2SO_4$/liter) of the 25, and 35 percent replacement solutions are as follows:

0.321lb*453.6 grams/lb=145 grams $Na_2SO_4$ (25% fly ash)

0.441lb*453.6 grams/lb=200 grams $Na_2SO_4$ (35% fly ash)

25% fly ash=(145 grams*1 mole)/21.8 liters*142 grams)= 0.047M solution,

35% fly ash=(200 grams*1 mole)/21.8 liters*142 grams)= 0.065M solution.

Three concentrations were chosen to study the effect of a sulfate additive to the mixing water. A concentration equal to 1.5 times the sulfation point, three times the sulfation point, and six times the sulfation point. There is no benefit to undersulfating the mixture.

| FLY ASH, PERCENT | 25 | 35 |
| --- | --- | --- |
| Concentration #1* | 0.07 M | 0.10 M |
| Concentration #2 | 0.14 M | 0.20 M |
| Concentration #3 | 0.28 M | 0.40 M |

*1.00 M has 142 grams of $Na_2SO_4$ per liter of solution.

This translates into the following quantities for preparing the solution for concrete batching:

| FLY ASH, PERCENT | 25 | 35 |
| --- | --- | --- |
| Concentration #1* | 9.9 g/l | 14.2 g/l |
| Concentration #2 | 19.9 g/l | 28.4 g/l |
| Concentration #3 | 39.8 g/l | 56.8 g/l |

Type II cement, a moderate sulfate resistant cement, was chosen as a control. This control cement is Lafarge Type II from New Braunfels, Tex. Concrete samples were prepared in a 3 cubic foot capacity electric mixer according to ASTM C192-76, standard method of making and curing concrete test specimens in the laboratory.

In order to test sulfate resistance, three inch by six inch concrete cylinders were continuously soaked in a 10% sodium sulfate solution. Each specimen had stainless steel guage studs embedded into each end for allowing length measurements. Two series of exposure tests were conducted: in one the specimens were first exposed to the sulfate solution after being moist cured for 14 days; in the other the specimens were first exposed to the sulfate solution after 91 days of moist curing. The procedure used is specified by the United States Bureau of Reclamation, U.S.B.R.-4908 Method B.

The sodium sulfate solution was maintained by flushing the tank and replacing the solution when a pH greater than 9.75 was recorded. However, this flushing was not carried out more than once per week. The solution was maintained at a temperature of 73°±3° F.

The sulfate resistance of concrete was determined by monitoring, at 30-day intervals, length expansion, mass change, and time until first cracking. Length expansion was determined using a length comparative frame with a 6⅝" gauge length and a digital indicator. A 6⅝" reference bar was used to calibrate the frame between each set of specimens. Mass changes in the specimens was determined by weighing the specimens on a balance accurate to 1.0 grams. Surface moisture on the specimens were removed by towel drying before weighing. Time until first cracking was determined by inspecting the specimens every 30 days. A visible crack, 2 centimeters in length, or two cracks totalling 2 centimeters in length, observed in half of the specimens of a set constituted "first cracking." Smaller cracks were considered minor and were noted along with the other measurements.

The results of tests are shown in FIGS. 1–24 from which it is readily deduced that concrete blends prepared by the methods according to the invention are superior to Type II cements. Likewise, concretes according to the invention are superior to Type V and 0% tricalcium aluminate cements, as can be seen from FIGS. 25 to 49.

Although the invention has been described with reference to its preferred embodiments, those of ordinary skill in the art may, upon reading this disclosure, appreciate changes and modifications which may be made and which do not depart from the scope and spirit of the invention as described above and claimed below.

What is claimed is:

1. A Class C fly ash containing cementitious mixture for use in producing a sulfate resistant hardened concrete, the cementitious mixture comprising:

(a) 25 wt % to 70 wt % Class C fly ash, said fly ash containing compounds selected from the group consisting of calcium aluminate, calcium hydroxide and iron oxides, (b) 70 wt % to 25 wt % portland cement clinker, and (c) 5 wt % to 10 wt % of gypsum such that at least an amount of sulfate is present to convert the calcium aluminate to ettringite;

wherein the cementitious mixture is produced by a process comprising the step of dry milling together said Class C fly ash, portland cement clinker and gypsum; and wherein the cementitious mixture, when admixed with an aggregate and water, forms a sulfate resistant hardened concrete substantially free of any calcium aluminate, calcium hydroxide and iron oxide compounds that react with sulfate ions from sulfate containing environments to form volume expanding compositions that lead to stress failure of the hardened concrete.

2. A class C fly ash containing cementitious mixture for use in producing a sulfate resistant hardened concrete, the cementitious mixture comprising:

25 wt % to 35 wt % Class C fly ash, said fly ash containing compounds selected from the group consisting of calcium aluminate, calcium hydroxide and iron oxides, dry milled with 65 wt % to 75 wt % portland cement clinker;

wherein the cementitious mixture, when admixed with an aggregate and water containing sulfate ions in an amount at least sufficient to convert the calcium aluminate to ettringite, produces a sulfate resistant hardened concrete that is substantially free of any calcium aluminate that reacts with sulfate ions from sulfate containing environments to form volume expanding compositions that lead to stress failure of the hardened concrete.

3. A Class C fly ash containing cementitious mixture for use in producing a sulfate resistant hardened concrete, the cementitious mixture comprising:

(a) 25 wt % to 70 wt % Class C fly ash, said fly ash containing compounds selected from the group consisting of calcium aluminate, calcium hydroxide and iron oxides, (b) 70 wt % to 25 wt % portland cement clinker, and (c) 5 wt % to 10 wt % of gypsum such that at least an amount of sulfate is present to convert the calcium aluminate to ettringite, wherein the cementitious mixture is produced by a process comprising the steps of dry milling together said portland cement clinker and gypsum and then admixing the Class C fly ash; and wherein the cementitious mixture, when admixed with an aggregate and water, forms a sulfate resistant hardened concrete substantially free of any calcium aluminate, calcium hydroxide and iron oxide compounds that react with sulfate ions from sulfate containing environments to form volume expanding compositions that lead to stress failure of the hardened concrete.

4. A sulfate resistant hardened concrete produced by a process comprising the step of:

admixing water and an aggregate with a cementitious mixture, said cementitious mixture comprising:
(a) 25 wt % to 70 wt % Class C fly ash, said fly ash containing compounds selected from the group consisting of calcium aluminate, calcium hydroxide and iron oxides,
(b) 70 wt % to 25 wt % portland cement clinker, and
(c) 5 wt % to 10 wt % of gypsum such that at least an amount of sulfate is present to convert the calcium aluminate to ettringite, wherein the cementitious mixture is produced by a process comprising the step of dry milling together said Class C fly ash, portland cement clinker and gypsum; and wherein said sulfate resistant hardened concrete is substantially free of any calcium aluminate, calcium hydroxide and iron oxide compounds that react with sulfate ions from sulfate containing environments to form volume expanding compositions that lead to stress failure of the hardened concrete.

5. A sulfate resistant hardened concrete produced by the a process comprising the step of:

admixing water and an aggregate with a cementitious mixture, said cementitious mixture comprising:
(a) 25 wt % to 70 wt % Class C fly ash, said fly ash containing compounds selected from the group consisting of calcium aluminate, calcium hydroxide and iron oxides,
(b) 70 wt % to 25 wt % portland cement clinker, and
(c) 5 wt % to 10 wt % of gypsum such that at least an amount of sulfate is present to convert the calcium aluminate to ettringite, wherein the cementitious mixture is produced by a process comprising the steps of dry milling together said portland cement clinker and gypsum and then admixing the Class C fly ash;

wherein said sulfate resistant hardened concrete is substantially free of any calcium aluminate, calcium hydroxide and iron oxide compounds that react with sulfate ions from sulfate containing environments to form volume expanding compositions that lead to stress failure of the hardened concrete.

6. A sulfate resistant hardened concrete produced by a process comprising the step of:

admixing a cementitious mixture, said cementitious mixture including 25 wt % to 35 wt % Class C fly ash, said fly ash containing compounds selected from the group consisting of calcium aluminate, calcium hydroxide and iron oxides, dry milled with 65 wt % to 75 wt % portland cement clinker, with an aggregate and water containing sulfate ions in an amount at least sufficient to convert the calcium aluminate to ettringite;

wherein said sulfate resistant hardened concrete is substantially free of any calcium aluminate, calcium hydroxide and iron oxide compounds that react with sulfate ions from sulfate containing environments to form volume expanding compositions that lead to stress failure of the hardened concrete.

7. The cementitious mixture of claim 1 wherein the gypsum is present in an amount by weight at least 1.9 times that of the calcium aluminate of the Class C fly ash.

8. The cementitious mixture of claim 3 wherein the gypsum is present in an amount by weight at least 1.9 times that of the calcium aluminate of the Class C fly ash.

9. The sulfate resistant hardened concrete of claim 4 wherein the gypsum is present in an amount by weight at least 1.9 times that of the calcium aluminate of the Class C fly ash.

10. The sulfate resistant hardened concrete of claim 5 wherein the gypsum is present in an amount by weight at least 1.9 times that of the calcium aluminate of the Class C fly ash.

11. The cementitious mixture of claim 2 wherein the sulfate ions are present in the water at a concentration in the range of 1.0 wt % to 2.5 wt %.

12. The sulfate resistant hardened concrete of claim 6, wherein the sulfate ions are present in the water at a concentration in the range of 1.0 wt % to 2.5 wt %.

13. The cementitious mixture of claim 2, wherein the amount of sulfate ions present is 1.5 times that needed to completely convert the calcium aluminate to ettringite.

14. The sulfate resistant hardened concrete of claim 6, wherein the amount of sulfate ions present is 1.5 times that needed to completely convert the calcium aluminate to ettringite.

15. A class C fly ash containing cementitious mixture for use in producing a sulfate resistant hardened concrete, the cementitious mixture comprising:

25 wt % to 35 wt % Class C fly ash, said fly ash containing compounds selected from the group consisting of calcium aluminate, calcium hydroxide and iron oxides, dry milled with 65 wt % to 75 wt % portland cement clinker;

wherein the cementitious mixture, when admixed with an aggregate and water containing hydroxyl ions in an amount at least sufficient to increase the reactivity of the calcium aluminate at early stages of concrete hardening, produces a sulfate resistant hardened concrete that is substantially free of any calcium aluminate, calcium hydroxide and iron oxide compounds that react with sulfate ions from sulfate containing environments to form volume expanding compositions that lead to stress failure of the hardened concrete.

16. The cementitious mixture of claim 15, wherein the hydroxyl ions are present in the water at a concentration in the range of 1.5 wt % to 3.5 wt %.

17. A sulfate resistant hardened concrete produced by a process comprising the step of:

admixing a cementitious mixture, said cementitious mixture including 25 wt % to 35 wt % Class C fly ash, said fly ash containing compounds selected from the group consisting of calcium aluminate, calcium hydroxide and iron oxides, dry milled with 65 wt % to 75 wt % portland cement clinker, with an aggregate and water containing hydroxyl ions in an amount at least sufficient to increase the reactivity of the calcium aluminate at early stages of concrete hardening, wherein said sulfate resistant hardened concrete is substantially free of any calcium aluminate, calcium hydroxide and iron oxide compounds that react with sulfate ions from sulfate containing environments to form volume expanding compositions that lead to stress failure of the hardened concrete.

18. The sulfate resistant hardened concrete of claim 17, wherein the hydroxyl ions are present in the water at a concentration in the range of 1.5 wt % to 3.5 wt %.

* * * * *